United States Patent [19]

Tinkham et al.

[11] 3,998,095
[45] Dec. 21, 1976

[54] METHOD AND APPARATUS FOR QUICKLY EVALUATING ENGINE EXHAUST GAS EMISSIONS

[75] Inventors: Leland P. Tinkham, Desert Hot Springs; Edwin Lee Cline, Pasadena, both of Calif.

[73] Assignee: Clayton Manufacturing Co., El Monte, Calif.

[22] Filed: July 28, 1975

[21] Appl. No.: 599,934

Related U.S. Application Data

[63] Continuation-in-part of Ser. Nos. 306,815, Nov. 15, 1972, abandoned, and Ser. No. 431,299, Jan. 7, 1974, Pat. No. 3,938,377.

[52] U.S. Cl. .................................. 73/117; 73/23; 73/49.7
[51] Int. Cl.² .................................. G01M 15/00
[58] Field of Search ......... 73/117, 134, 116, 117.3, 73/49.7, 23

[56] References Cited

UNITED STATES PATENTS

| | | | |
|---|---|---|---|
| 2,220,007 | 10/1940 | Winther et al. | 73/134 |
| 2,716,339 | 8/1955 | Cline | 73/117 |
| 3,343,402 | 9/1967 | Hubner | 73/23 |
| 3,408,853 | 11/1968 | Hubner | 73/23 |
| 3,439,534 | 4/1969 | Pilgrim | 73/117 |
| 3,472,067 | 10/1969 | Chew | 73/116 |
| 3,603,155 | 9/1971 | Morris | 73/117 UX |
| 3,630,072 | 12/1971 | Traver | 73/117 UX |
| 3,864,964 | 2/1975 | Voelz | 73/116 |

Primary Examiner—Jerry W. Myracle
Attorney, Agent, or Firm—Jackson & Jones Law Corporation

[57] ABSTRACT

Modal test method and apparatus is described for use in automotive engine plants, vehicle inspection stations, diagnostic centers, etc., for quickly, accurately and repeatably measuring the principal air contaminants; i.e., carbon monoxide (CO) and hydrocarbons (HC) in engine exhaust gas emissions. Quantitive measurement of oxides of nitrogen ($NO_x$) and oxygen ($O_2$) may also be measured if desired. While $O_2$ is not an air contaminant, a measure of its concentration in the exhaust gas has diagnostic value. The engines are tested at prescribed modes of operation (usually three; high cruise, low cruise and idle) at which emission-related engine malfunctions, if they exist, are most likely to be exposed. CO and HC ($NO_x$ and $O_2$ if desired) evaluations are made at each test mode and may be recorded on a "report card." The measured test values of the air contaminants are compared at each test mode with prescribed permissible values either automatically or manually. For example, the measured values may be recorded on a report card which includes the permissible values. An excessive value of the measured air contaminants for any prescribed mode indicates an emission-related malfunction and warrants rejection. Adjustment or repair to correct malfunctions is facilitated by providing "truth chart" having a reject pattern matching that on the report card and a written statement of the probable defects and the recommended repair guidelines to enable a mechanic to quickly correct the malfunction.

128 Claims, 35 Drawing Figures

Fig. 2.
KEY MODE EMISSION EVALUATION
(BASIC INDEX = 30 HP AT 50 MPH)
 LARGE VEHICLE — 3800# & UP
48-50 MPH @ 27-30 HP
32-35 MPH @ 10-12 HP
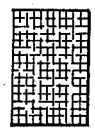 COMPACT — 2800# TO 3750# (INDEX 24HP @ 46 MPH)
44-46 MPH @ 21-24 HP
29-32 MPH @ 8-10 HP
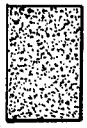 LIGHT IMPORT — 1800# TO 2750# (INDEX 15HP @ 38 MPH)
36-38 MPH @ 13-15 HP
22-25 MPH @ 4-6 HP
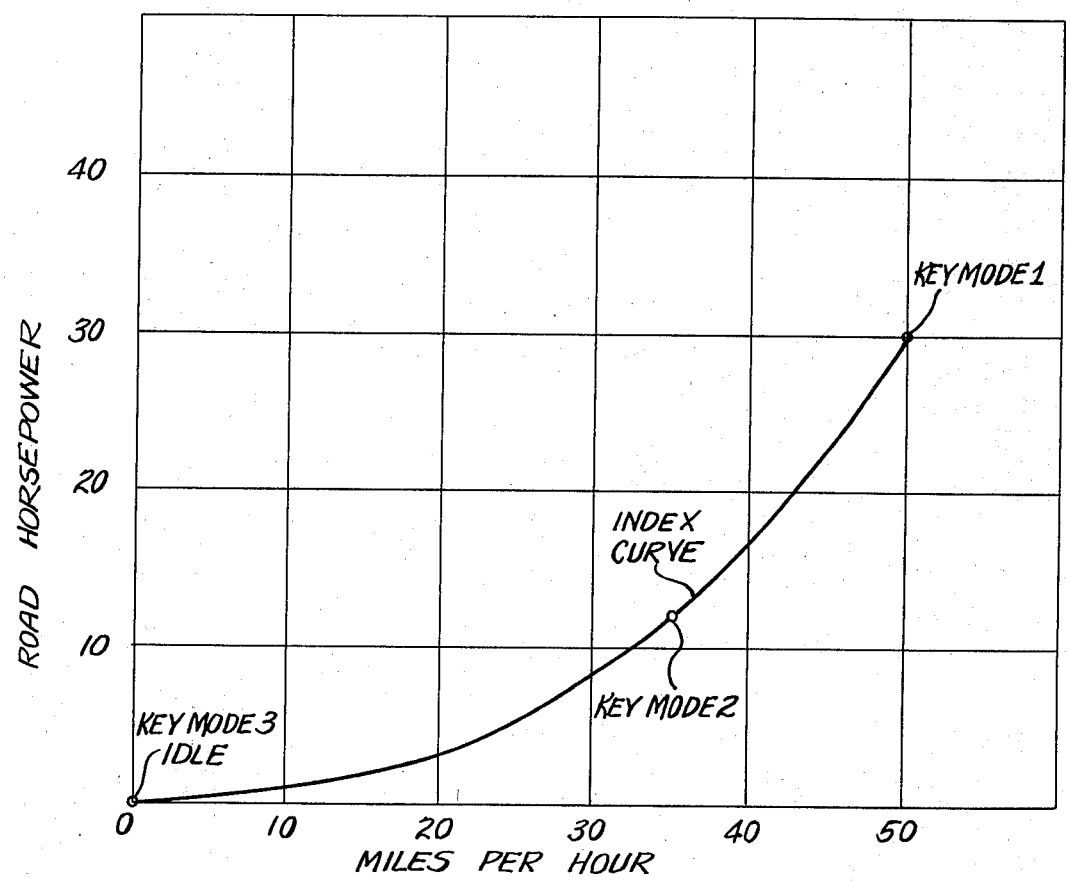

Fig. 8.

DATE: 10-17-72
NAME: John Q Public
P.O. ADDRESS: 15 Kent St.
CITY: Columbus
STATE: Ohio
ZIP: 45,102

VEHICLE: Chev, Impala, 4dr Sdn
WT: 4115   CYL. 8
IDENT. NO. 1M69H2Y136941
LIC. NO. Ohio ADK-957

|  | HIGH CRUISE | LOW CRUISE | IDLE |
|---|---|---|---|
| –CO– CARBON MONOXIDE | MAX. 2% .4 | MAX. 2.5% .6 | MAX. 3% 2.8 |
| –HC– UNBURNED HYDROCARBON | MAX. 220 PPM 1252 ✓ | MAX. 240 PPM 1350 ✓ | MAX. 290 PPM 1482 ✓ |

✓ = REJECT

Fig. 9.

DATE:
NAME:                         VEHICLE:

|  | HIGH CRUISE | LOW CRUISE | NOx CONTROL | IDLE |
|---|---|---|---|---|
| –CO– CARBON MONOXIDE | MAX. 2% .4 | MAX. 2.5% .6 | ✕ | MAX. 3% 2.8 |
| –HC– UNBURNED HYDROCARBON | MAX. 220 PPM 1252 ✓ | MAX. 240 PPM 1350 ✓ | ✕ | MAX. 290 PPM 1482 ✓ |
| –NOx– OXIDES OF NITROGEN | ✕ | AT LEAST A 35% DROP | | ✕ |

✓ = REJECT

Fig. 10.

| | HIGH CRUISE | LOW CRUISE | IDLE | FULL THROTTLE |
|---|---|---|---|---|
| -CO- CARBON MONOXIDE | MAX. 2% .4 | MAX. 2.5% .6 | MAX. 3% 2.8 | |
| -HC- UNBURNED HYDROCARBON | MAX. 220 PPM 1252 ✓ | MAX. 240 PPM 1350 ✓ | MAX. 290 PPM 1482 ✓ | |
| OPTIONAL REPEAT TEST FOR ADDED DIAGNOSTIC INFORMATION -CO- | | | | ✗ |
| -HC- | | | | ✗ |

✓ = REJECT

Fig. 11.

| | HIGH CRUISE | LOW CRUISE | NOx CONTROL | IDLE | FULL THROTTLE |
|---|---|---|---|---|---|
| -CO- CARBON MONOXIDE | MAX. 2% .4 | MAX. 2.5% .6 | ✗ | MAX. 3% 2.8 | |
| -HC- UNBURNED HYDROCARBON | MAX. 220 PPM 1252 | MAX. 240 PPM 1350 | ✗ | MAX. 290 PPM 1482 | |
| NOx OXIDES OF NITROGEN | ✗ | AT LEAST A 35% DROP | | ✗ | |
| OPTIONAL REPEAT TEST FOR ADDED DIAGNOSTIC INFORMATION -CO- | | | ✗ | ✗ | |
| -HC- | | | ✗ | ✗ | |

✓ = REJECT

*Fig.12.*

|  | HIGH CRUISE | LOW CRUISE | IDLE | ←98 |
|---|---|---|---|---|
| CO |  |  |  |  |
| HC | ✓ |  | ✓ |  |

ABNORMALLY HIGH HC AT IDLE AND HIGH CRUISE

|  | HIGH CRUISE | LOW CRUISE | IDLE | ←100 |
|---|---|---|---|---|
| CO | 100A | 100B | 100C |  |
| HC | ✓ | ✓ | ✓ |  |

ABNORMALLY HIGH HC IN ALL MODES OF OPERATION

USUAL CAUSES

The most probable cause is ignition misfire due to a failure of an ignition system component.

SERVICE STEPS

1. Probably the most common problem is a faulty spark plug; however, this should not be a conclusion without proper examination.

2. Check out the ignition system with a scope and associated instruments. If the scope does not clearly show a faulty spark plug, observe for the following:

a. Faulty ignition cables.
   b. Excessive point resistance or arcing.
   c. Cross fire, due to cracked or carbon-tracked cap or rotor.
   d. Moisture inside the distributor cap or on the cables.
   e. Extremely incorrect dwell angle or point gap.
   f. Low coil output voltage.
   g. Low primary voltage supplied to the coil.
   h. Loose wire connections such as distributor plate ground or coil to point wire connections.

ALWAYS MAKE THE BASIC IDLE ADJUSTMENTS OF IGNITION DWELL AND TIMING, IDLE SPEED AND AIR FUEL RATIO, TO COMPLETE THE REPAIR.

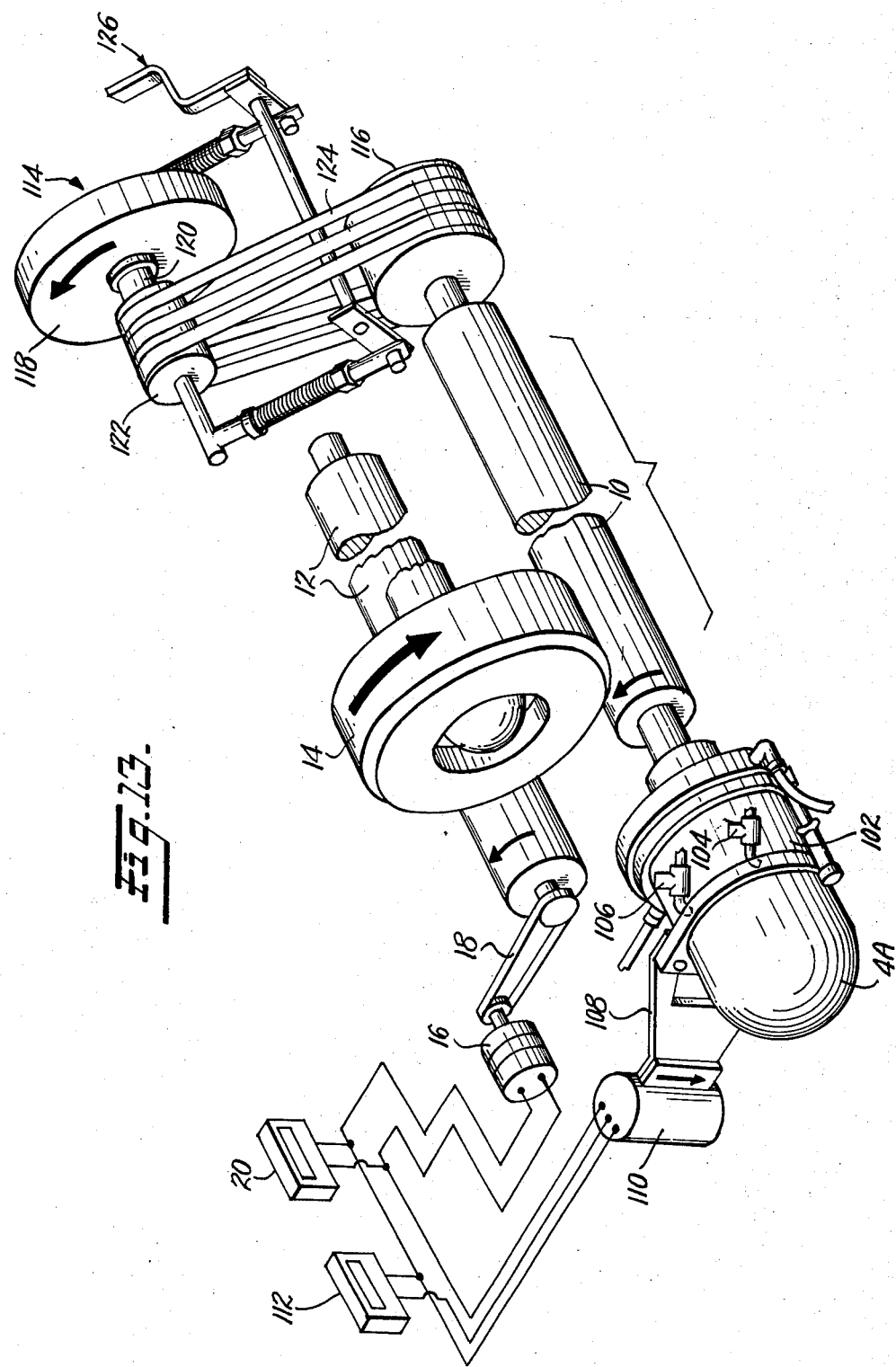

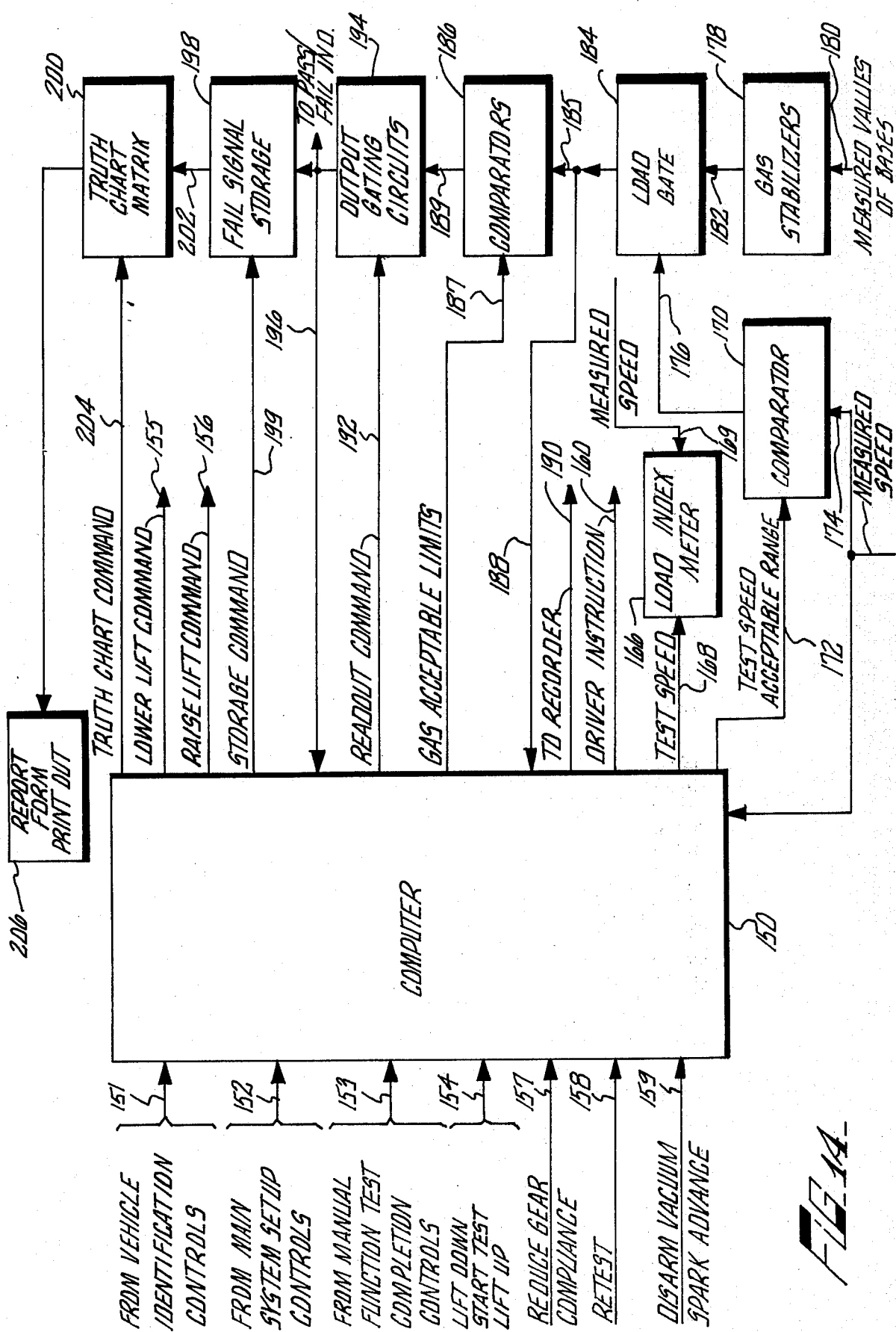

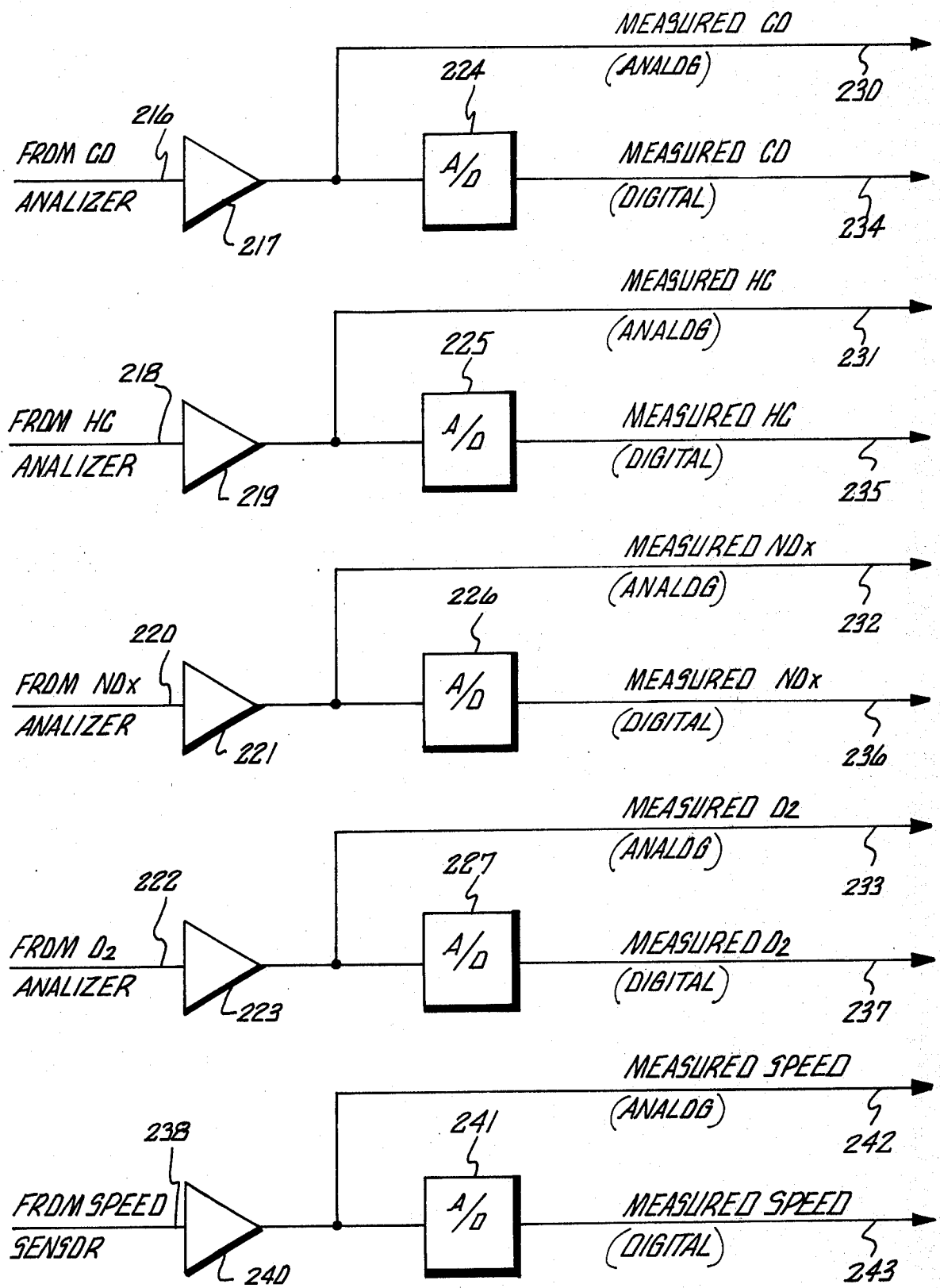
FIG_16_

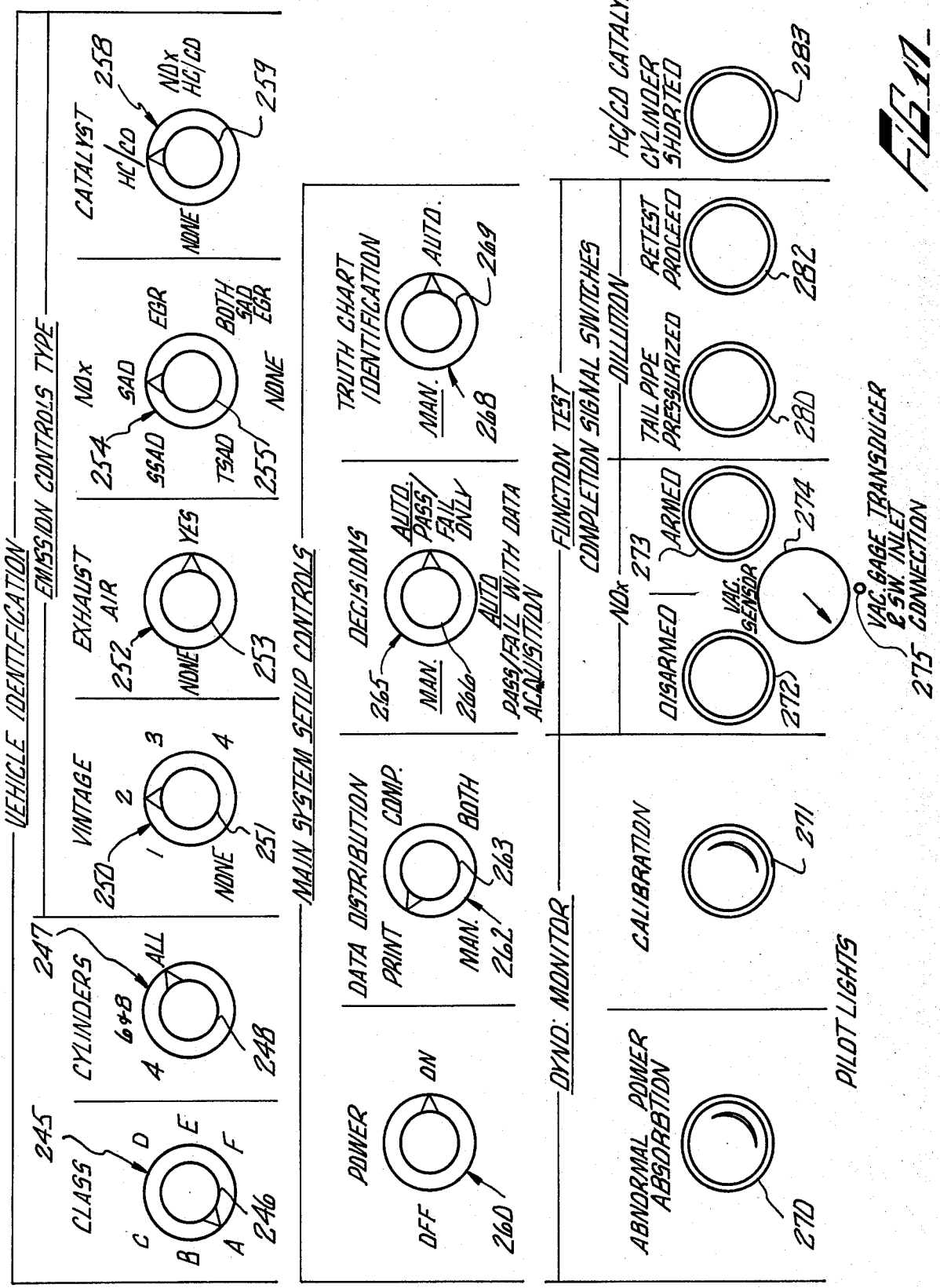

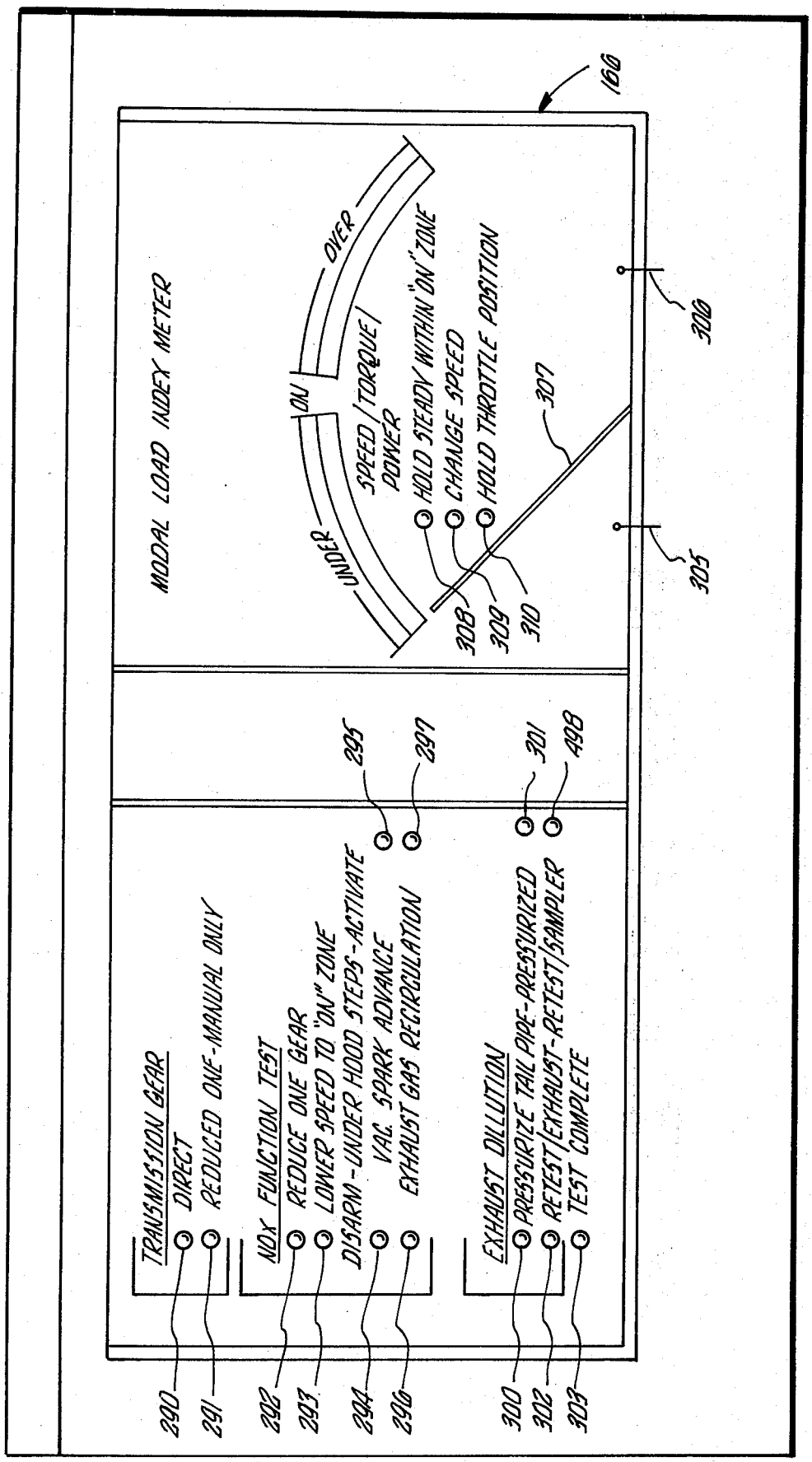

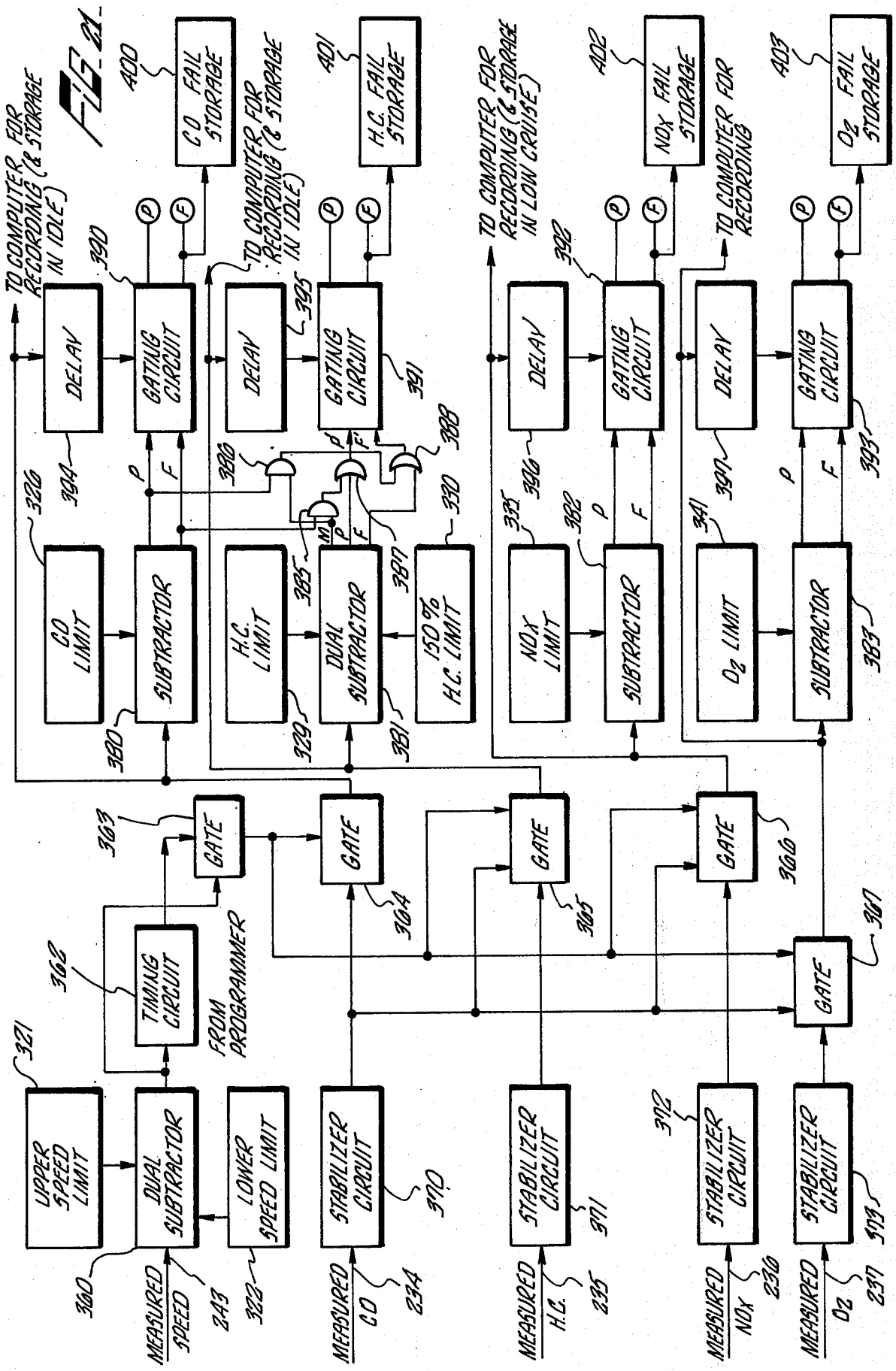

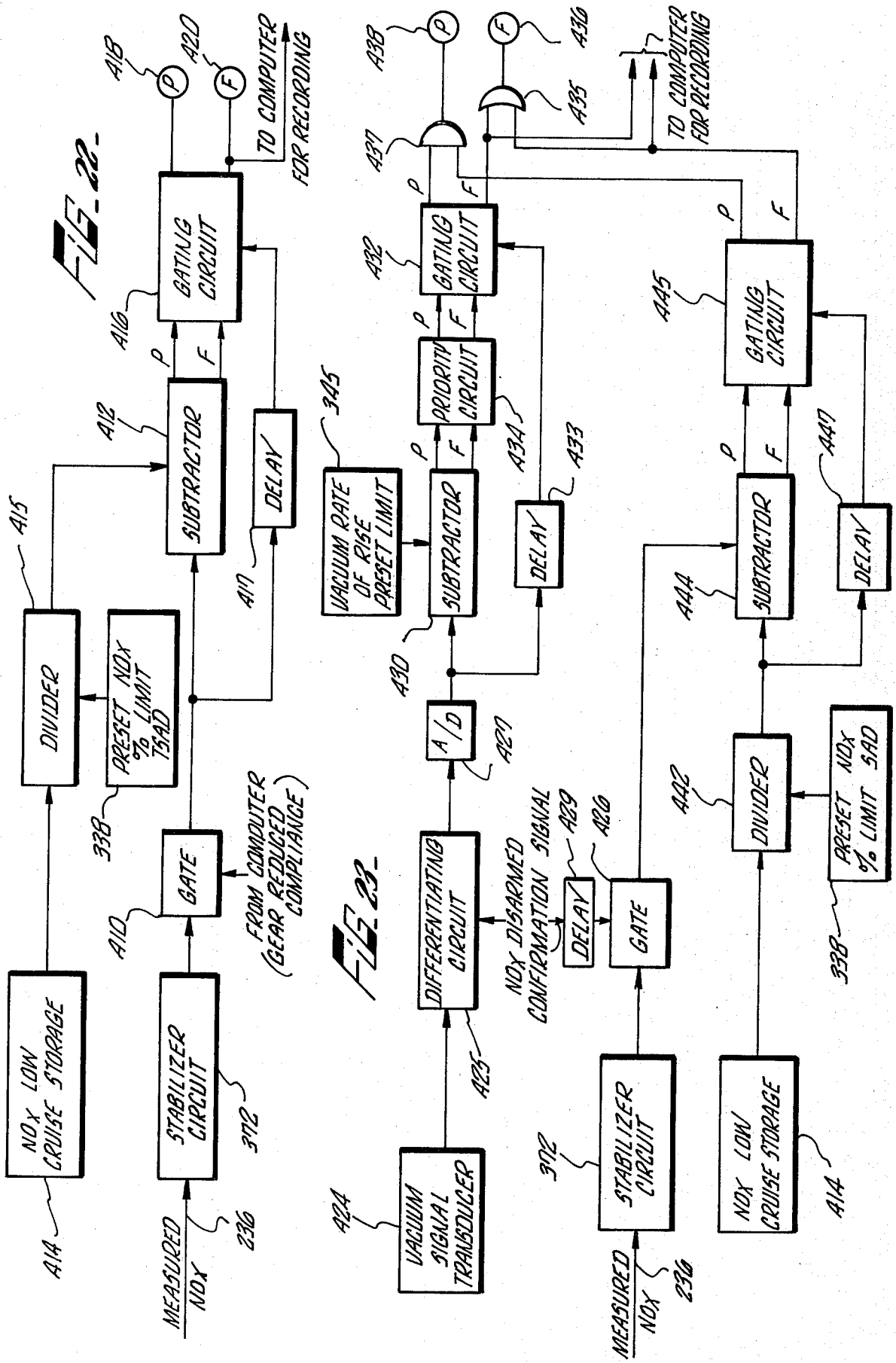

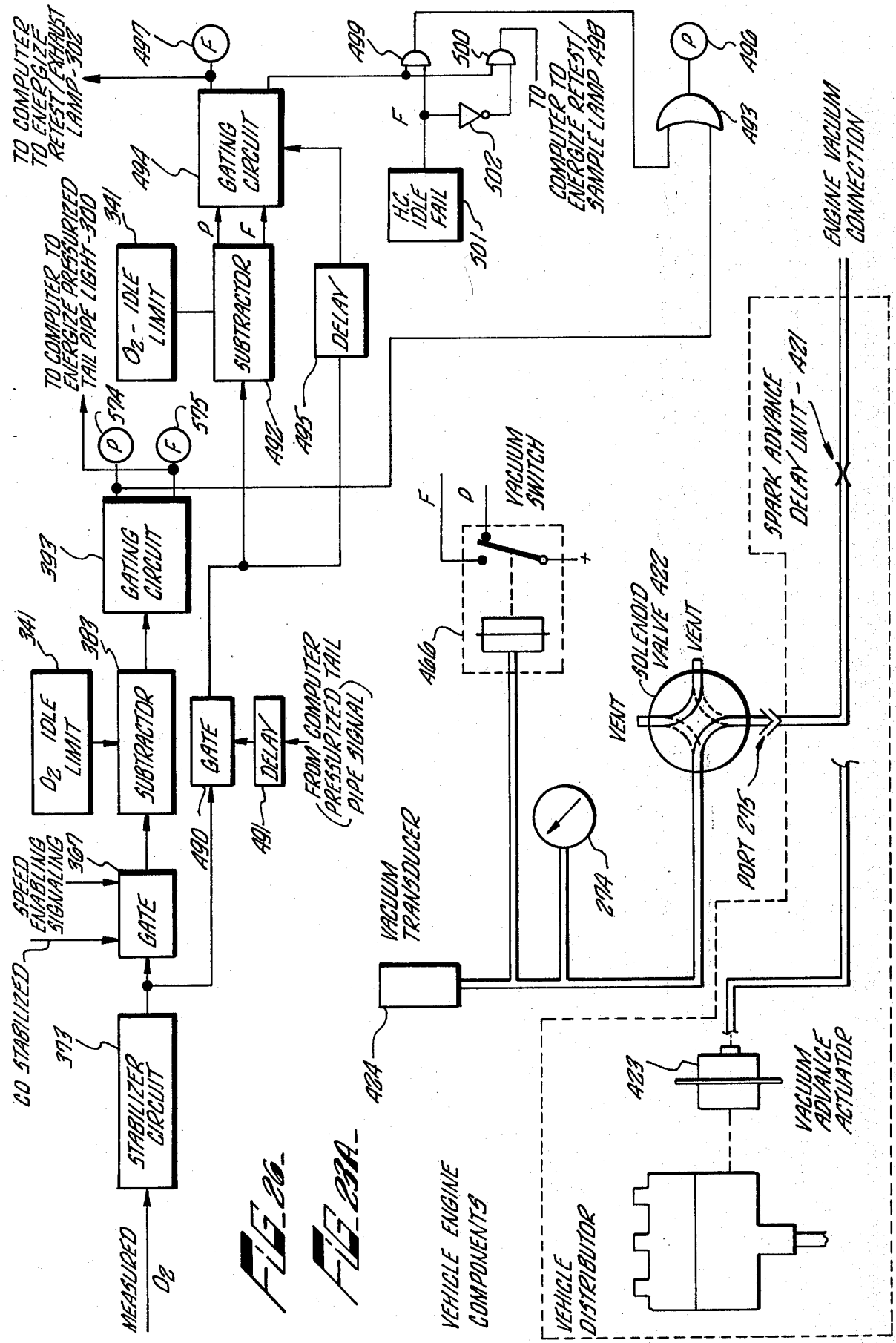

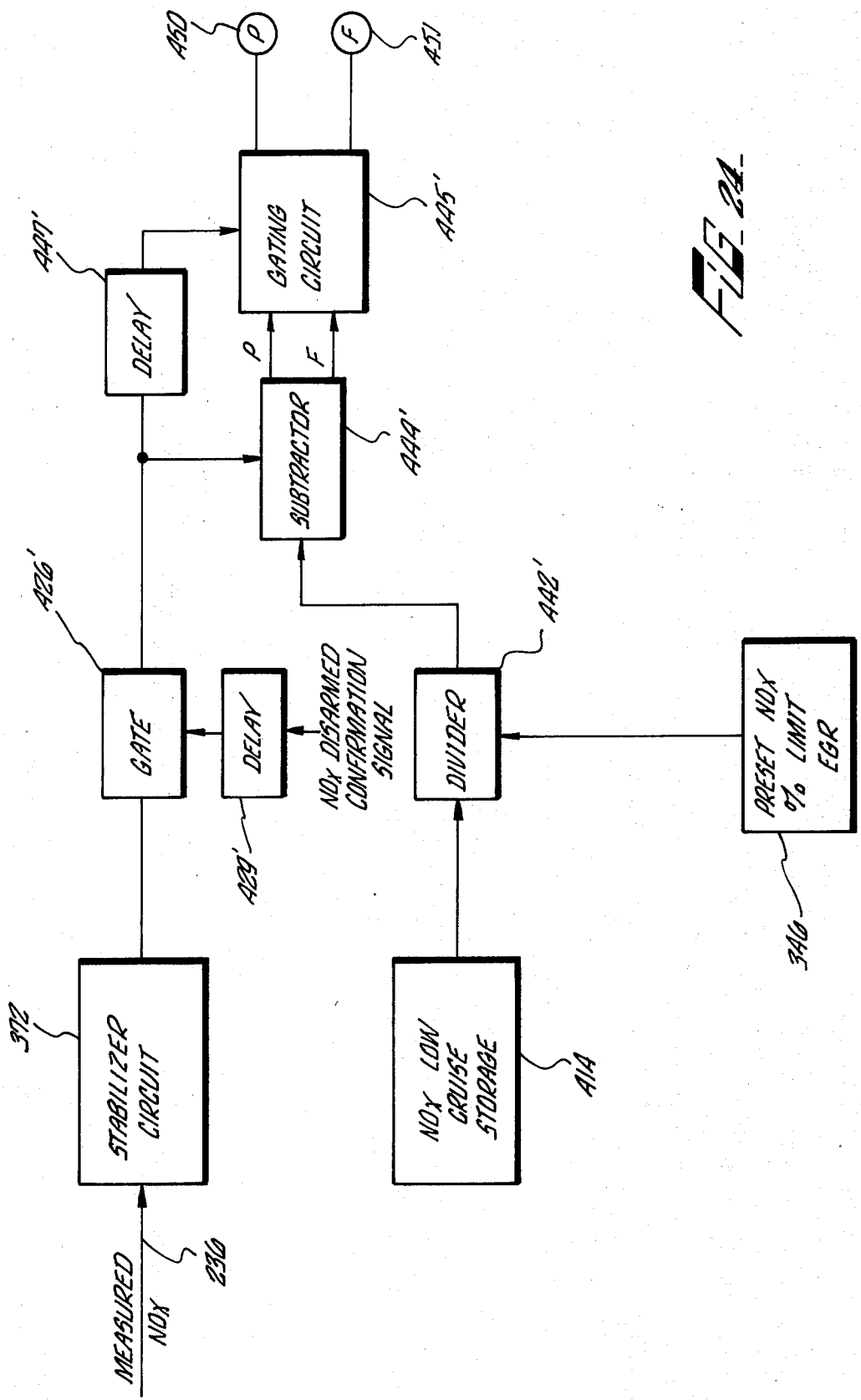

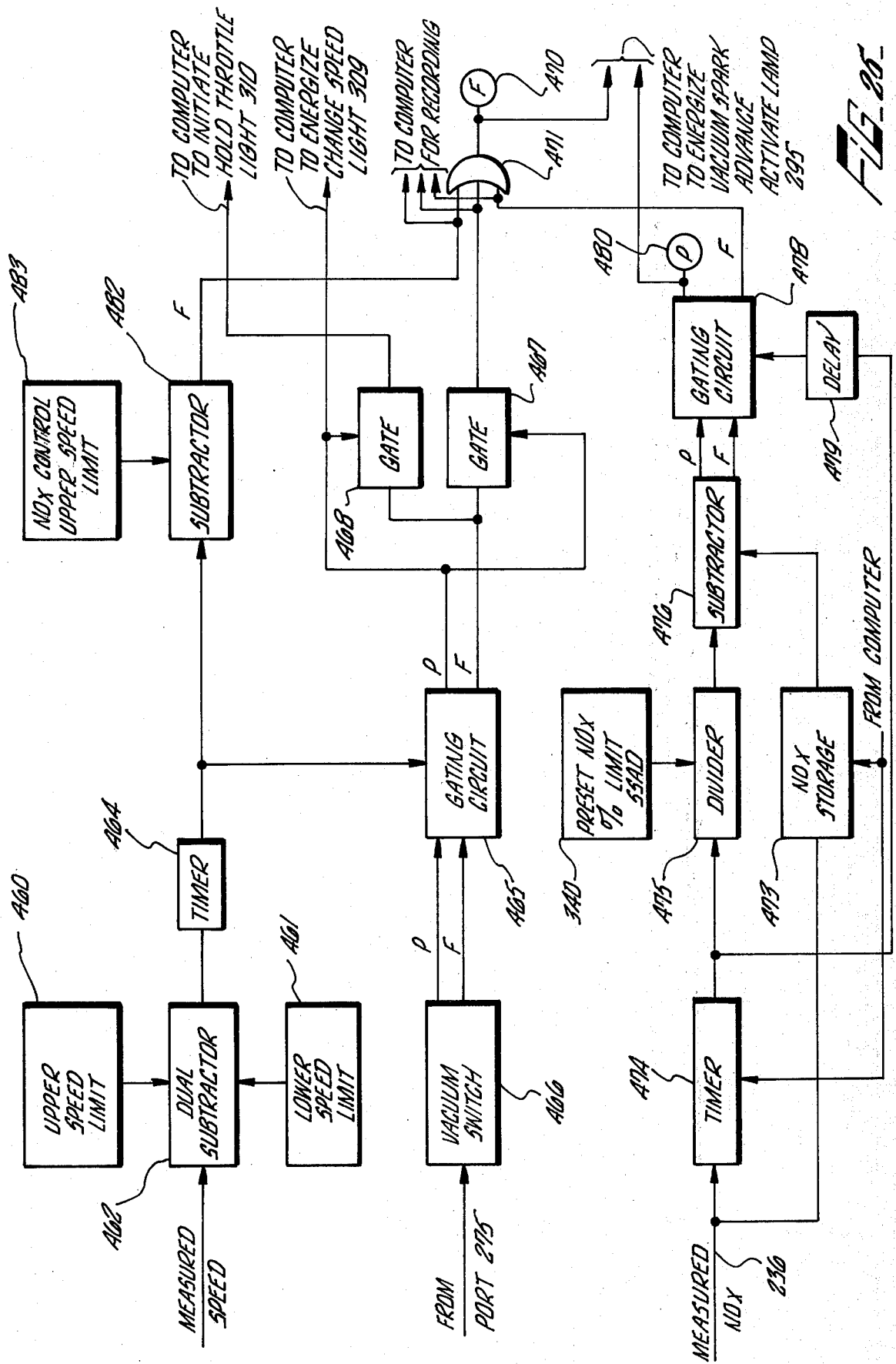

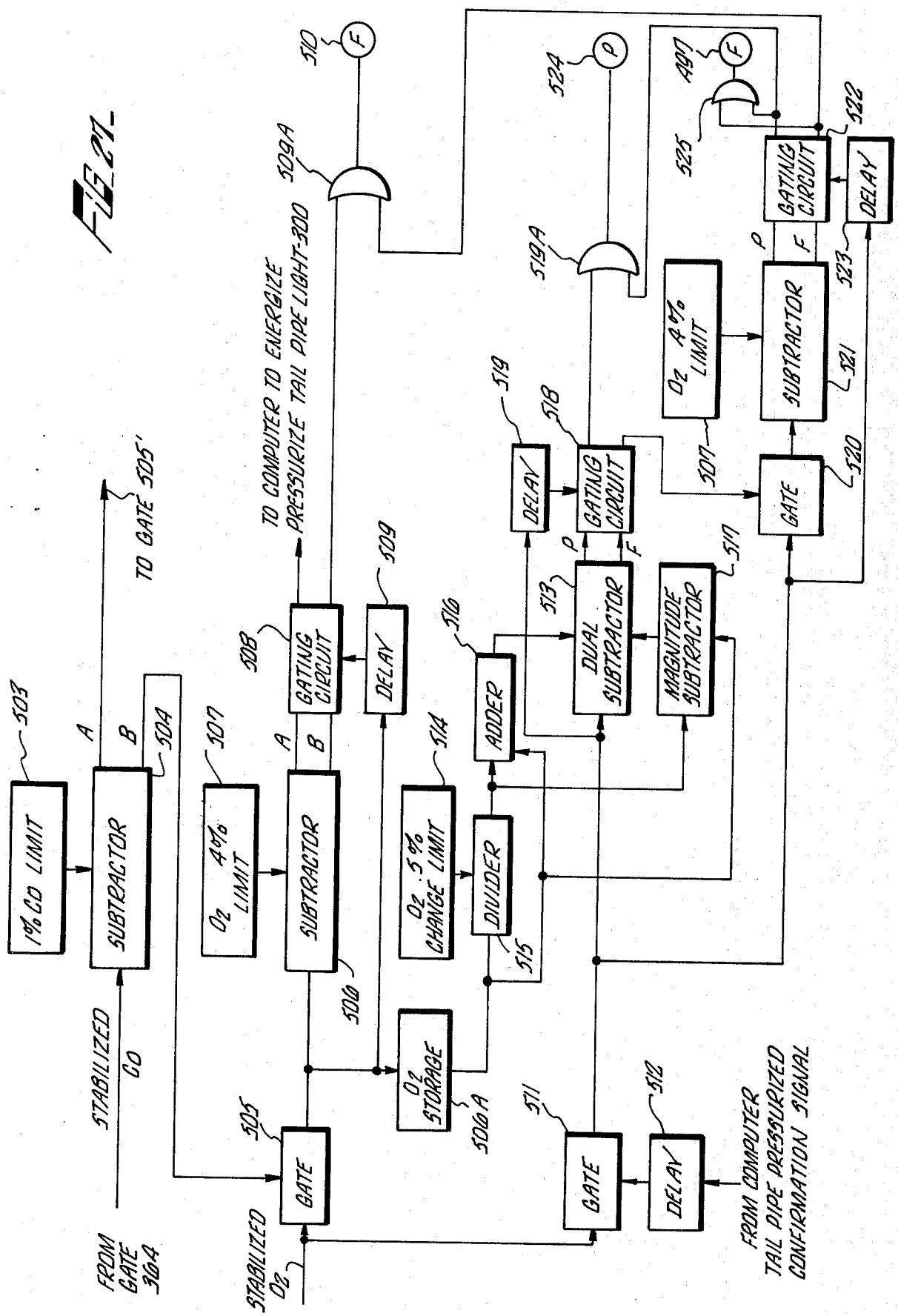

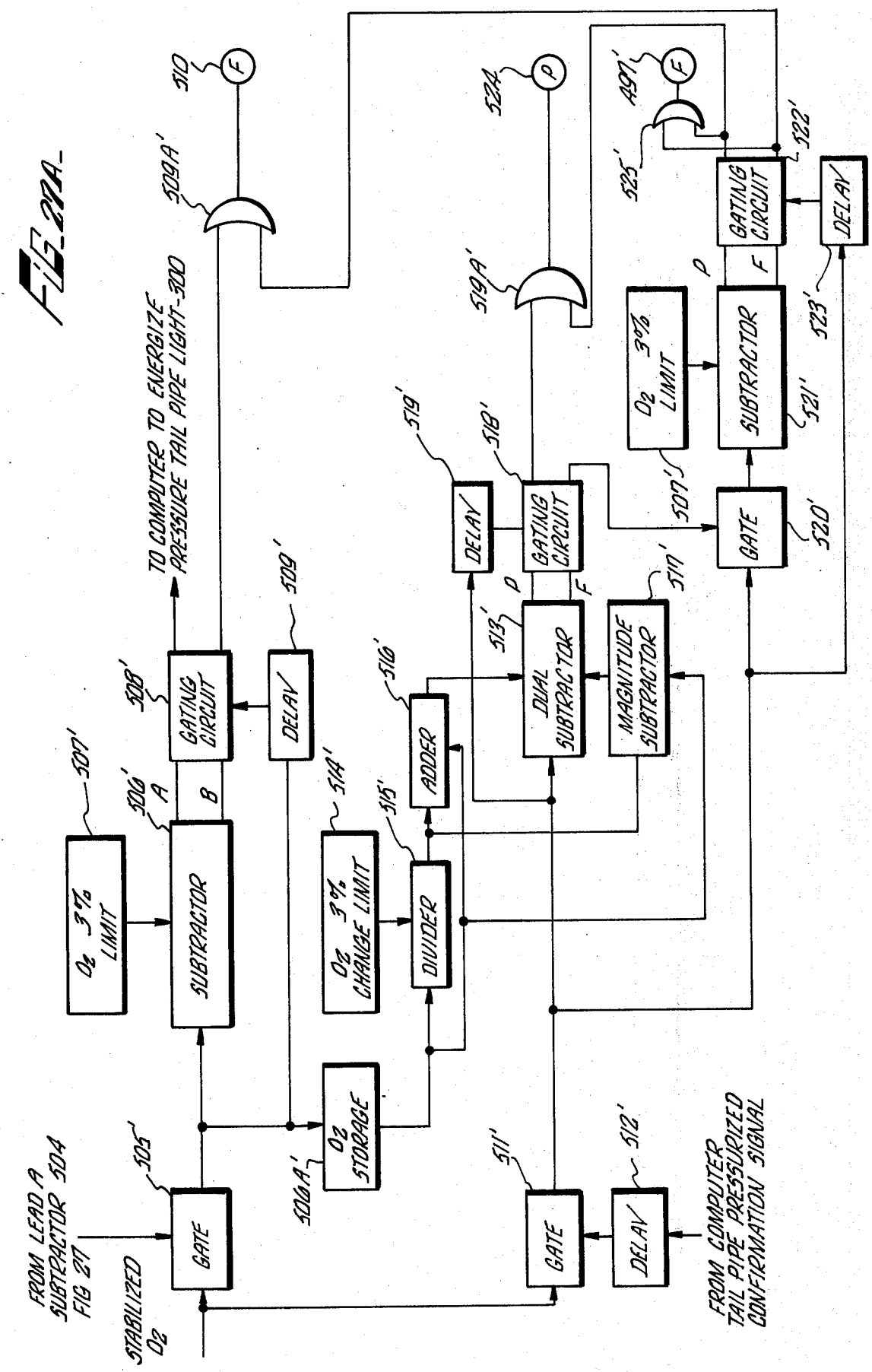

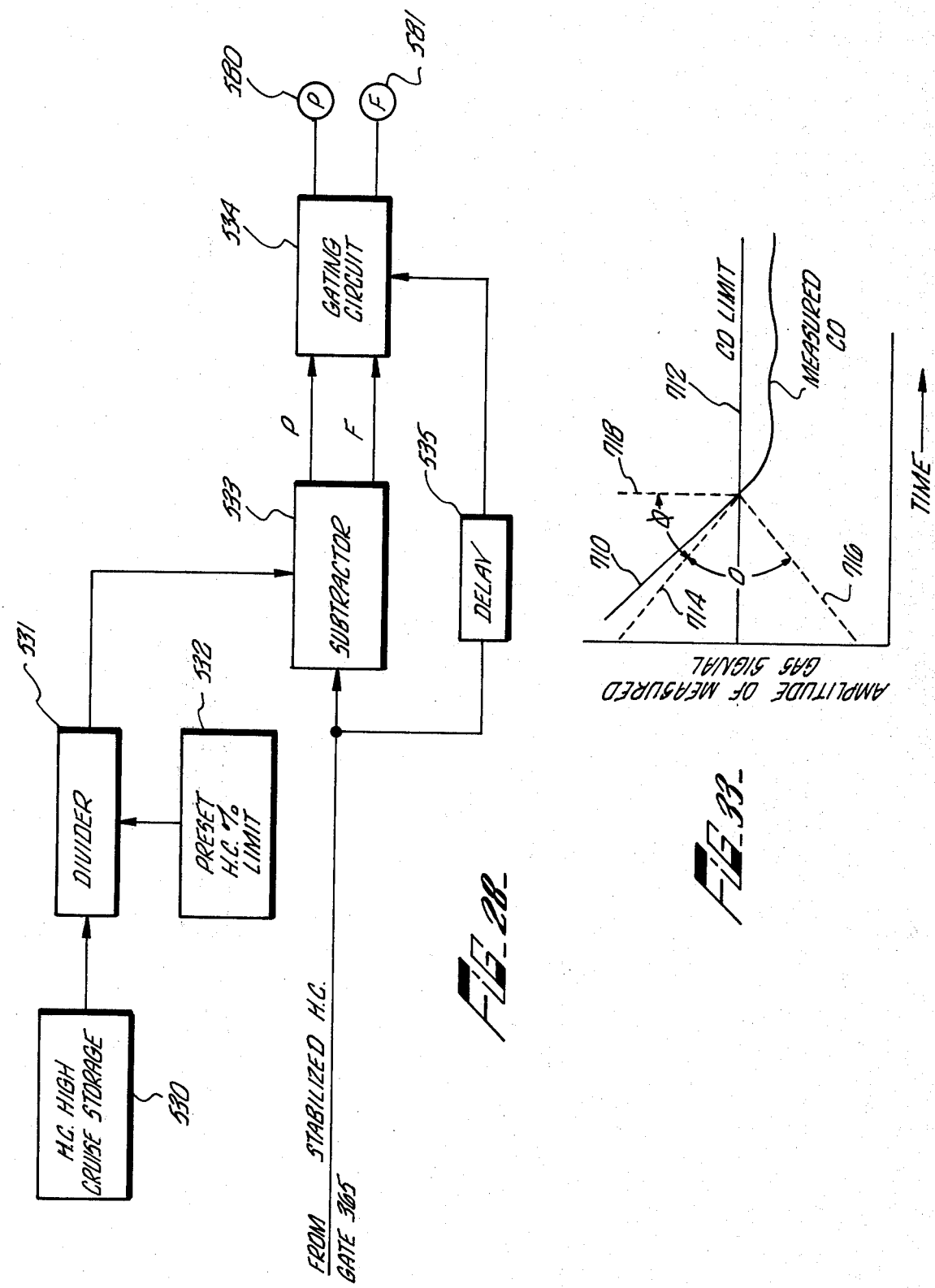

| TESTS | HIGH CRUISE | LOW CRUISE | IDLE | FULL THROTTLE |
|---|---|---|---|---|
| CO CARBON MONOXIDE | PASS 540 / FAIL 541 | PASS 542 / FAIL 543 | PASS 544 / FAIL 545 | PASS 546 / FAIL 547 |
| HC HYDRO-CARBONS | PASS 550 / FAIL 551 | PASS 552 / FAIL 553 | PASS 554 / FAIL 555 | PASS 556 / FAIL 557 |
| NOx OXIDES OF NITROGEN | PASS 560 / FAIL 561 | PASS 562 / FAIL 563 | PASS 564 / FAIL 565 | PASS 566 / FAIL 567 |
| O₂ OXYGEN | PASS 570 / FAIL 571 | PASS 572 / FAIL 573 | PASS 574 / FAIL 575 | PASS 576 / FAIL 577 |
| HC/CO CATALYST | PASS 580 / FAIL 581 | PASS 582 / FAIL 583 | PASS 584 / FAIL 585 | PASS 586 / FAIL 587 |
| NOx CONTROLS | PASS 418 75AD / FAIL 420 | PASS 436 SAD / FAIL 436 | PASS 480 5SAD / FAIL 470 | PASS 450 EGR / FAIL 451 |
| EXHAUST | PASS 524 / FAIL AIR INJ. 510 | PASS / FAIL LEAK 496 497 | | |

FIG. 29

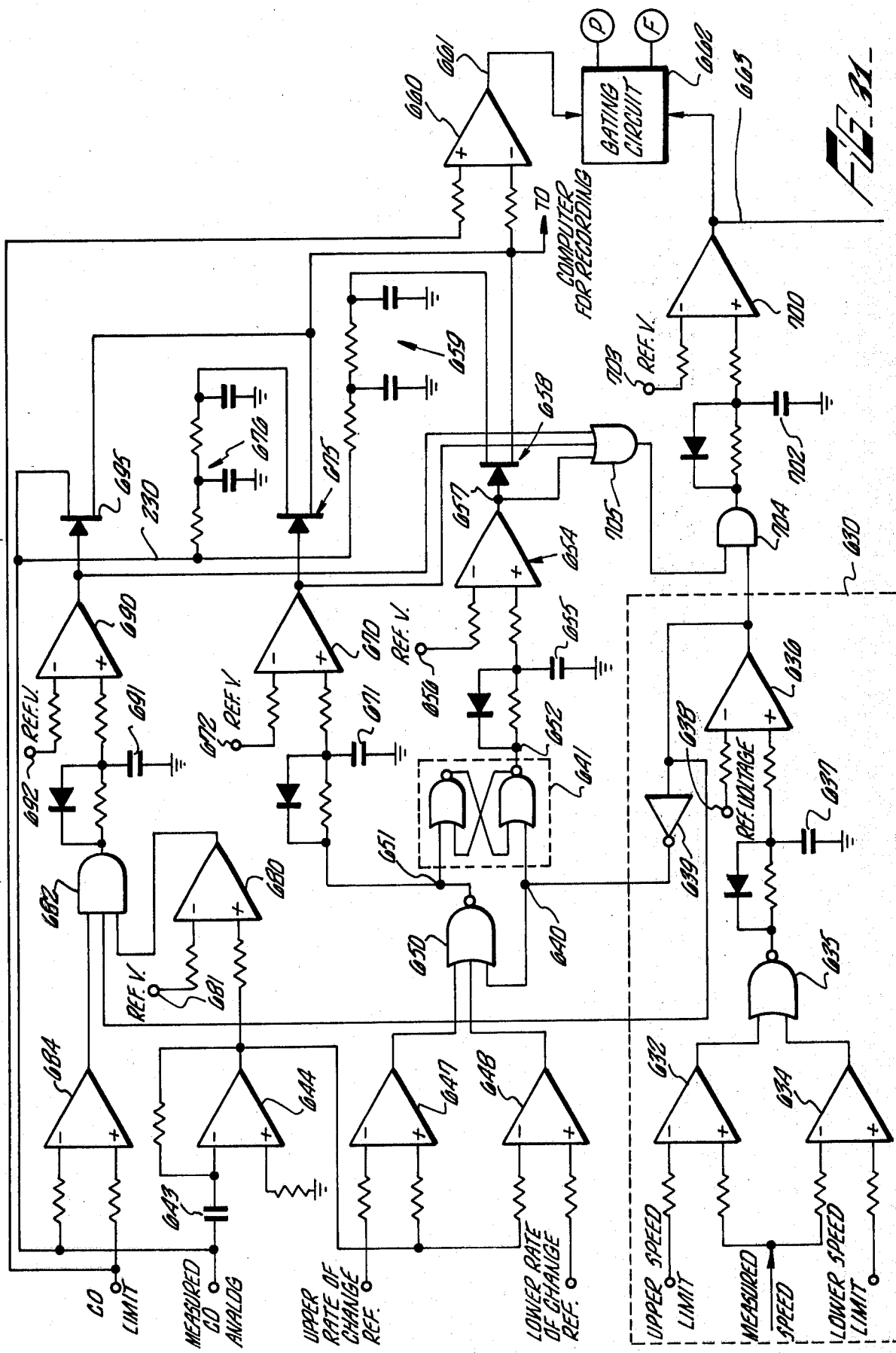

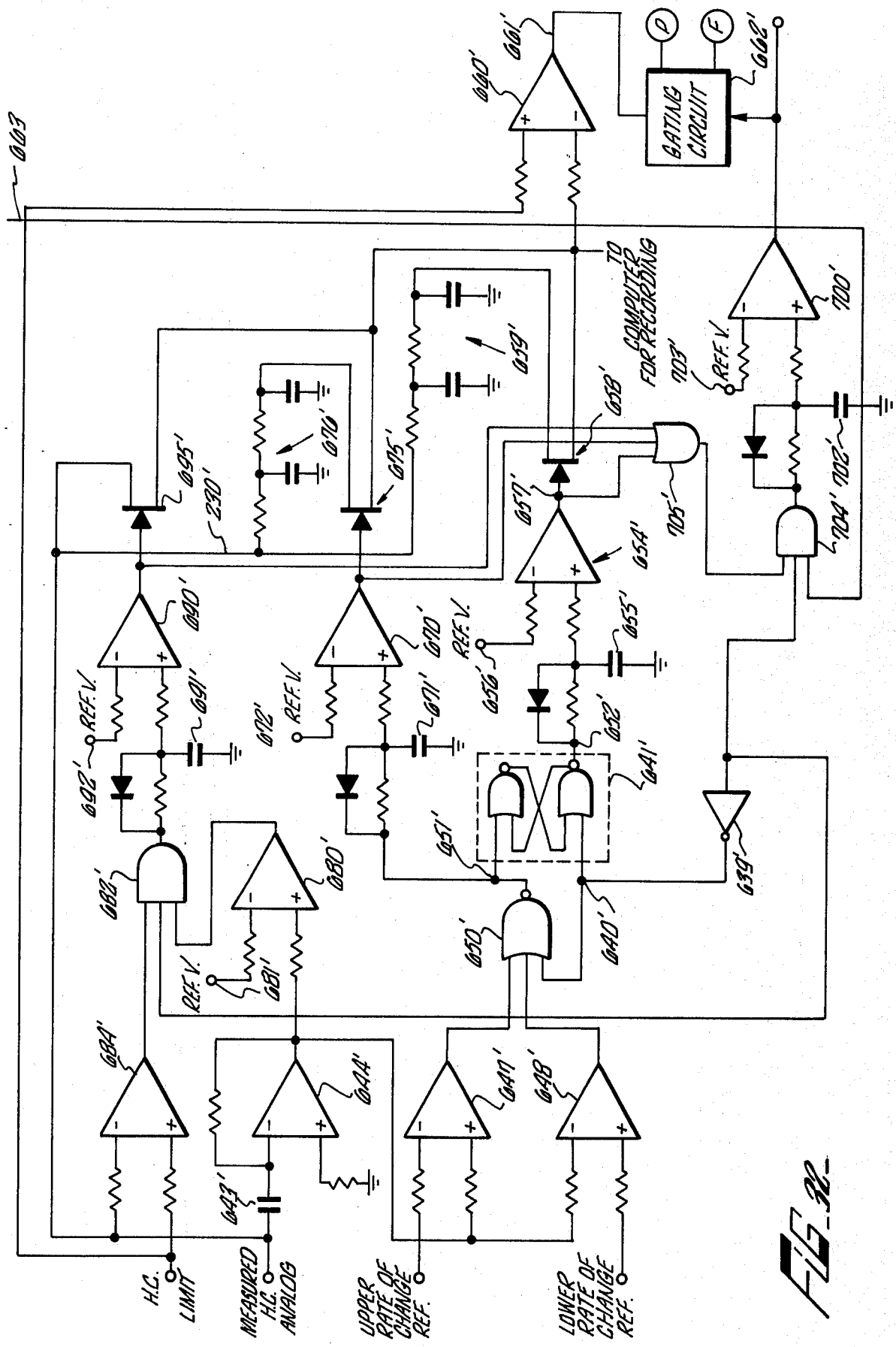

METHOD AND APPARATUS FOR QUICKLY EVALUATING ENGINE EXHAUST GAS EMISSIONS

BACKGROUND OF THE INVENTION

Reference to Copending Application

This is a continuation-in-part application of our copending application, Ser. No. 306,815 for "Method and Apparatus for Quickly Evaluating Engine Exhaust Gas Emissions" filed Nov. 15, 1972, now abandoned; and copending application Ser. No. 431,299 now U.S. Pat. No. 3,938,377 for "Method and Apparatus for Production Hot Testing of Engines Under Load" filed Jan. 7, 1974 in the names of Edwin L. Cline, Leland P. Tinkham and Vernon G. Converse III.

1. Field of the Invention

The present invention relates to a method and apparatus for making quick and accurate evaluations of the principal air contaminants in the exhaust gas emissions of internal combustion engines. It further relates to the preparation of diagnostic information on emission-related engine malfunctions and to the provision of guidelines for correcting the malfunctions.

2. Description of the Prior Art

It is well known that the exhaust gas from motor vehicles is considered a prime cause of air pollution. Accordingly, considerable activity has been and is now being directed to establishing prescribed standards of permissible emission levels of CO, HC, $NO_x$, and $O_2$, and to methods and apparatus for evaluating the emissions to determine whether they meet permissible values.

Among these activities, the Federal authorities have promulgated driving cycle tests for determining the presence of contaminants in engine exhaust emissions. Such tests are typical of urban driving by average motorists and are satisfactory for certification of new engines or engines in new vehicles. However, such tests require a great deal of time and are too complicated for mass vehicle inspection. In addition, they are not designed to produce data from which the cause of the malfunction of the engine can be readily ascertained. With the anticipated future mass motor vehicle inspection and a large percentage of rejections, existing repair facilities will be grossly inadequate to handle the situation. What is really needed, in order to enable the necessary repairs to be made for any given vehicle found to have emission-related engine malfunction, is a quick method and simple means for evaluating the contaminants in the engine emissions to thereby provide a reliable diagnosis of the existing engine malfunction that is causing excessive contaminants; and guidelines for enabling a repairman or mechanic to readily correct the malfunction by proper adjustment or repair.

Another objection to the Federal test cycles is that they are impractical for vehicle air pollution control use in Municipal, State and Federal vehicle inspection stations. A principal objection is that they take too long. A further objection is that they are difficult to perform. A still further objection is that, after the test has been made, no diagnostic information is provided that will enable a repairman or mechanic to go directly to the cause of the malfunction and correct it.

Various "short cycle" and "quick cycle" tests have also been proposed 8eretofore, but none of these has been found to be satisfactory because they require considerable skill to perform, lack repeatability, involve unnecessary initial and operating costs or are not sufficiently perceptive to single out abnormally high on-road emitting vehicles. None of the prior short, or quick, test methods evaluates the gas contaminants in the exhaust in a manner to enable accurate diagnosis and pin-pointing of the particular malfunction or malfunctions responsible for the presence of the excessive amount of contaminants. And none provides any assistance to a repairman who does not have his own dynamometer and other equipment for diagnosing emission-related engine malfunctions.

SUMMARY OF THE INVENTION

The foregoing objections are overcome by the present method for evaluating engine exhaust gas emissions, which provides a prescribed mode test method or system requiring only about one minute per vehicle, and the use of extremely simple apparatus. The prescribed mode test system is particularly valuable in mass vehicle inspection for detecting excessive contaminants in emissions and for providing diagnoses indicating the cause thereof. The method further includes the preparation of "report cards" indicating the value of the CO and HC contaminants in the gas emissions, and which card, in the case of formal inspection station rejection, is given to the vehicle owner so that he can take it along with the vehicle to a repair shop, or service station, to have the malfunction corrected. The prescribed mode method still further includes "truth charts" for suggesting causes for the malfunctions and remedies to aid the mechanic in correcting the malfunction.

As a result of testing the exhaust emissions of a great many vehicles representative of the U.S. vehicle population, and the repairs made thereto, and careful study and analysis of such test data, it has been determined that very satisfactory evaluation of exhaust gas emission of CO and HC can be made by testing the engines at certain modes of operation at which engine malfunctions are likely to occur; and that the values obtained can be used to substantially pin-point emission-related engine malfunctions.

Three prescribed modes of testing have been established according to the present invention for each of three different weight classes of vehicles because weight is used to classify vehicles during Federal emissions tests. Obviously, more or less than three weight classes or parameters such as engine displacement, number of cylinders, etc., can be used singularly or in combination to classify vehicles. The three modes are equally applicable to all weights or types of internal combustion engine powered vehicles, with appropriate variations in the load (horsepower) absorbed from the engine to compensate for classification. Accordingly, MODE 1 requires operation of the engine at a load (horsepower) simulating "high cruise," at which time the main carburetion and ignition systems of the engine are in full operation. MODE 2 requires operation of the engine at "low cruise," that is, a test made in the transition area between the engine idling mode and that point at which the main systems of carburetion and ignition come into full operation. MODE 3 requires testing at "idle" when the engine is operating with the carburetor throttle in normally closed position, that is, without the operator exerting any pressure upon the throttle. The testing at idle, as the third mode, is preferred because this test should be made at a time when the induction system has been purged of fall-out fuel, and stabilized temperature of engine components has been approached. The values of CO and HC are measured and compared with predetermined acceptable values at all test modes. The values of $NO_x$ and $O_2$ may also be measured and compared with acceptable values at one or more of the above or added test modes.

In contrast with the slow Federal test cycles, supra, the present method involving the conducting of emission tests at three selected modes can be made in one minute or less. Additive modes such as full throttle and/or those required to expand detail diagnosis or to test for the actual function of modulating or part time vehicle controls used to control gases such as $NO_x$, will require added time. This renders the method highly practical for mass emission tests at Municipal, State and Federal inspection stations, and highly desirable for use in vehicle diagnostic centers where tests in addition to exhaust emission are made, since the time required for exhaust emission tests by the prescribed test mode method is maintained at a minimum. An optional and sometimes desirable fourth mode of testing is at full carburetor throttle opening, when all systems of the engine are operating at or near maximum stress.

The present modal testing system of measuring exhaust gas emissions is applicable to engines, new and old, and whether or not they are mounted in a vehicle, but for the purposes of disclosing an exemplary, operative embodiment of the invention, the modal system will be described in connection with the use of a chassis dynamometer, which provides a simple way of testing engines while mounted in a vehicle at simulated vehicle road speeds. This is also the most popular usage to which the present modal method will be applied in practice. Any engine dynamometer or chassis dynamometer can be employed if the degree of power absorption (load) can be selected to match the prescribed power requirements at the prescribed speeds.

In the event that a prescribed emission test requires acceleraton and/or deceleration, a dynamometer must be employed that can absorb the vehicle power normally consumed in overcoming both wind resistance and the inertia of the vehicle mass on the road. This is readily accomplished, for example, by the use of a variable torque/speed power absorption device and flywheels.

The present modal testing system is also useful for indicating whether $NO_x$ control devices on the engine are operational.

A meter with special prescribed markings for different load ranges of high cruise and low cruise for the different weight classes of vehicles guide the test operator to appropriately position the vehicle throttle to arrive at the load prescribed for MODE 1 (high cruise), MODE 2 (low cruise) and MODE 3 (idle). The operator observes and records (on the report card) the values of CO and HC at each mode of operation.

Accordingly, the principal object of the invention is to provide a reliable and accurate, quick method and simple apparatus for testing new and old engines, and engines mounted in vehicles, to determine whether they are excessive polluters.

Another object is to provide a quick method of testing exhaust gas emissions whereby an engine can be "passed" or rejected in accordance with predetermined permissible CO, HC, $NO_x$ and/or $O_2$ exhaust gas emission levels.

Another object is to provide a simple apparatus and method for use in testing an engine by applying a series of predetermined key loads to the engine at predetermined key speeds at which emission-related malfunctions are most likely to occur.

Still another object is to provide a method of testing an engine by subjecting the same to a series of predetermined speeds and loads that fall on a given speed/power substantially cube curve.

Another important object is to provide a method and apparatus, as stated above, that is particularly useful in mass-testing of vehicle exhaust gas emissions at Municipal, State and Federal inspection stations, automotive diagnostic centers, etc., to determine compliance within predetermined permissible values of air contaminant emissions.

Another object is to provide a method and apparatus, as stated above, that will assure repeatability of a modal test cycle from test operator to test operator, and facility to facility, where large numbers of vehicles are inspected daily for possible air pollution violation.

Still another object is to provide a method and apparatus that will produce reliable test results of exhaust gas emissions, while greatly reducing the usual time involved in making a test, and incidentally reducing inspection costs.

A further object is to provide a rapid method and simple apparatus for accurately evaluating CO, HC, $NO_x$ and $O_2$ values in exhaust gas emissions, and for evaluating engine performance.

Still another object is to provide a simple and reliable method, as stated above, that can be carried out by persons having a minimum of test training and experience.

A still further object is to provide a method of testing engines that will greatly simplify mass inspection of vehicles and expedite the repair of malfunctioning engines, by furnishing to a mechanic a report card indicating reject values of excessive CO and/or HC emissions, and a truth chart having a matching reject pattern of malfunction(s) and suggested causes and remedies therefor, that will enable ready correction of the indicated malfunction(s).

Still another object is to provide a mechanic with diagnostic data on a malfunctioning engine, as indicated by excessive CO and HC emissions, and to provide the mechanic with simple guidelines or instructions for making adjustments or repairs to correct the particular malfunction.

A still further object is to provide a method of testing an engine in a vehicle by subjecting the same to predetermined modal loads related to the vehicle class, at high cruise, low cruise, and idle speeds and optionally full throttle, and measuring the CO and HC values in the exhaust gas at each mode.

Still another object is to provide a method of testing an engine equipped with an $NO_x$ control that will measure the $NO_x$ value in the exhaust gas and indicate whether the $NO_x$ control is operational.

Other and further objects and advantages of the invention will be apparent from the following description and accompanying drawings.

DESCRIPTION OF THE DRAWINGS

FIG. 2 illustrates a power/speed, or near cube, curve of the power absorption device of FIG. 1, with the speed and horsepower points of MODES 1, 2 and 3 indicated thereon.

FIG. 8 illustrates a typical report card showing permissible CO and HC values, with reject marks in the HC blocks for all modes of operation.

FIG. 9 is a view of a report card similar to that shown in FIG. 8, but including blocks for entering $NO_x$ readings.

FIG. 10 is a view of a report card similar to that shown in FIG. 8, but having additional blocks for recording emission values at full throttle operation.

FIG. 11 illustrates still another report card similar to FIG. 8 but including blocks for entering full throttle and $NO_x$ control values.

FIG. 12 illustrates an exemplary truth chart having a reject pattern matching the reject marks indicated on the report card of FIG. 8.

FIG. 13 is a diagrammatic view of another chassis dynamometer adapted for use in carrying out the present modal method of engine evaluation, and including means for simulating vehicle inertia loads during acceleration and deceleration.

FIG. 14 is a block diagram of an automatic control system in accordance with the present invention.

FIG. 16 is a block diagram of analog-to-digital converters for converting the analog signals from the gas analyzer into digital signals.

FIG. 17 is an elevational view of a manual control and dynamometer status display panel included in the control system.

FIG. 18 is an elevational view of another embodiment of a load indexing meter to guide the operator and an operator instruction panel incorporated in the control system.

FIG. 21 is a block diagram of a circuit for comparing the measured values of the gases under consideration with acceptable values.

FIG. 22 is a block diagram of a circuit for evaluating the operability of a TSAD $NO_x$ control device.

FIG. 23 is a block diagram of a circuit for evaluating the operability of a SAD $NO_x$ control device.

FIG. 23A is a schematic diagram of a vacuum sensing system for evaluating the engine vacuum controls associated with $NO_x$ control devices.

FIG. 24 is a block diagram of a circuit for evaluating the operability of an EGR $NO_x$ control device.

FIG. 25 is a block diagram of a circuit for evaluating the operability of a SSAD $NO_x$ control device.

FIG. 26 is a block diagram of a circuit for interpreting the levels of $O_2$ in the exhaust when the engine or vehicle is not equipped with an exhaust air injection system or a catalytic converter.

FIG. 27 is a block diagram of a portion of a circuit for interpreting the levels of $O_2$ in the exhaust when the engine or vehicle is not equipped with a catalytic converter but may or may not be equipped with an exhaust air injection system.

FIG. 27A is a block diagram of the remainder of the circuit of FIG. 27.

FIG. 28 is a block diagram of a circuit for evaluating the effectiveness of a catalytic converter.

FIG. 29 is an elevational view of a decision display panel incorporated in the automatic control system.

FIG. 31 is a schematic diagram of a portion of one load and gas signal stabilizing circuit that may be used in the circuit of FIG. 21.

FIG. 32 is a schematic diagram of the remaining portion of the load and gas signal stabilizing circuit of FIG. 31.

FIG. 33 is a graph illustrating the operation of the gas signal stabilizing circuits of FIGS. 31 and 32.

DESCRIPTION OF THE PREFERRED EMBODIMENTS

Manual Evaluation System

Figure 1:
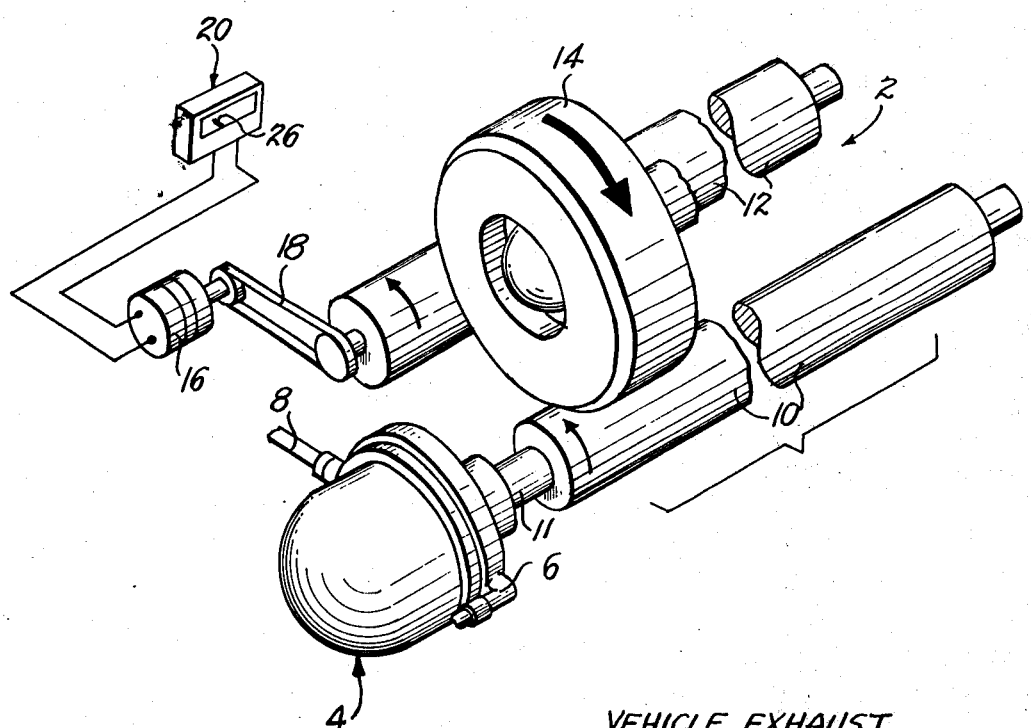
FIG. 1 is a diagrammatic perspective view of a simplified form of chassis dynamometer, including a fixed-fill power absorption unit that can be used in carrying out the modal method of evaluating engine exhaust gas emissions in accordance with the present invention.

Referring to FIG. 1 of the drawings, a chassis dynamometer is generally indicated by the numeral 2 and comprises a hydraulic power absorption device 4 for loading the vehicle engine (not shown). An inlet connection 6 admits water into the working circuit of the power absorption device 4 and an exhaust connection 8 permits the water to discharge, so that a continuous flow of water through the power absorption device occurs during the test. The customary air bleeders (not shown) are left open so that no air pockets are formed in the working circuit, thereby assuring that a constant speed/power relationship will be applied to the engine being tested.

As is shown in the drawing, a drive roll 10 is directly connected with the rotor shaft 11 of the power absorption device 4 and is disposed parallel with an idle or driven roll 12. It will be understood that the wheels 14 (one shown) of the vehicle being tested are cradled between the drive roll 10 and the driven roll 12. A tachometer generator 16 is driven by a belt 18 from the driven roll 12 and is connected with a speed meter 20 to indicate to the operator the simulated road speed of the vehicle that is being developed by the drive wheels 14. The power absorption device 4 automatically loads the engine to provide the proper load corresponding to a given engine speed.

Figure 4:
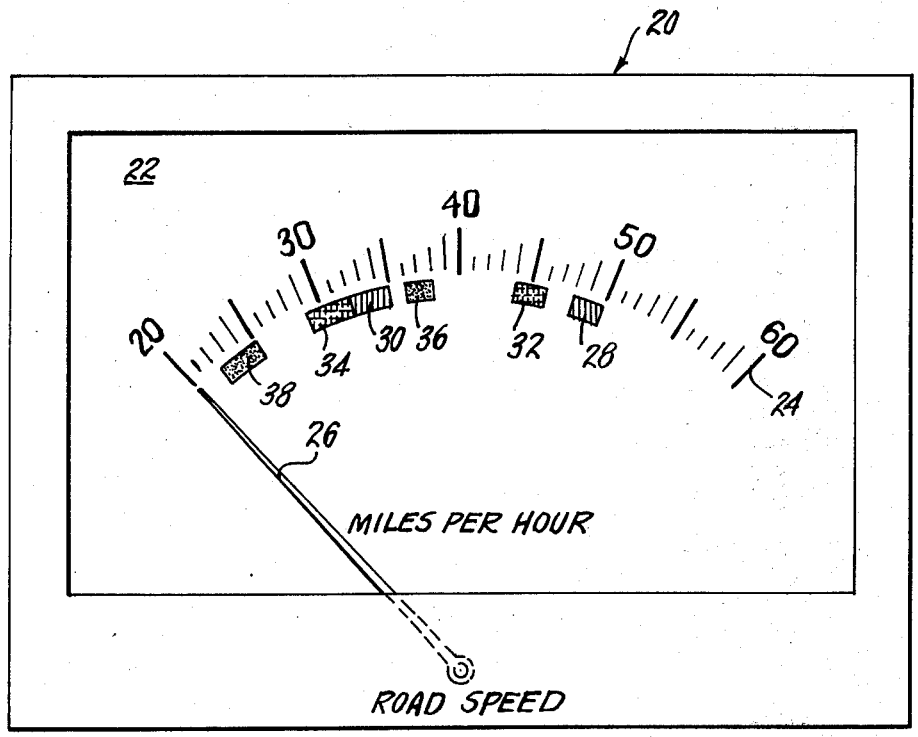
FIG. 4 is an enlarged view of one form of load index meter (illustrated as a speed meter) used to guide the operator in arriving at the prescribed modal loads.

The speed meter 20 is shown in further detail in FIG. 4. This meter has a dial 22 provided with calibrated graduations 24 corresponding to the road speed of the vehicle 14, and a pointer 26 that is actuated by the current being generated by the tachometer generator 16, and which current will vary with the speed of the driven roll 12. The dial 22 has two segments 28 and 30 thereon, colored red and corresponding to a weight class of large vehicles weighing 3800 pounds and up. The segment 28 spans a speed range of 48 to 50 mph and corresponds to the high cruise speed (MODE 1) for testing vehicles in that weight class; while the segment 30 spans a speed range of 32 to 35 mph and corresponds to the low cruise range for such vehicles (MODE 2).

Segments 32 and 34 on the dial 22 are colored yellow and correspond to a second weight class of vehicles ranging from about 2850 to 3750 pounds. The segment 32 spans a speed range of 44 to 46 mph and corresponds to high cruise speed; whereas segment 34 spans a speed range of 29 to 32 mph and corresponds to low cruise speed for such weight vehicles.

Segments 36 and 38 on the dial 22 are a mottled black and correspond to a third weight class of vehicles ranging from about 1800 to 2750 pounds. The segment 36 spans a speed range of 36 to 38 mph, corresponding to high cruise and the segment 38 spans a speed range of 22 to 25 mph, corresponding to low cruise for the stated vehicle weight class.

Figure 5:
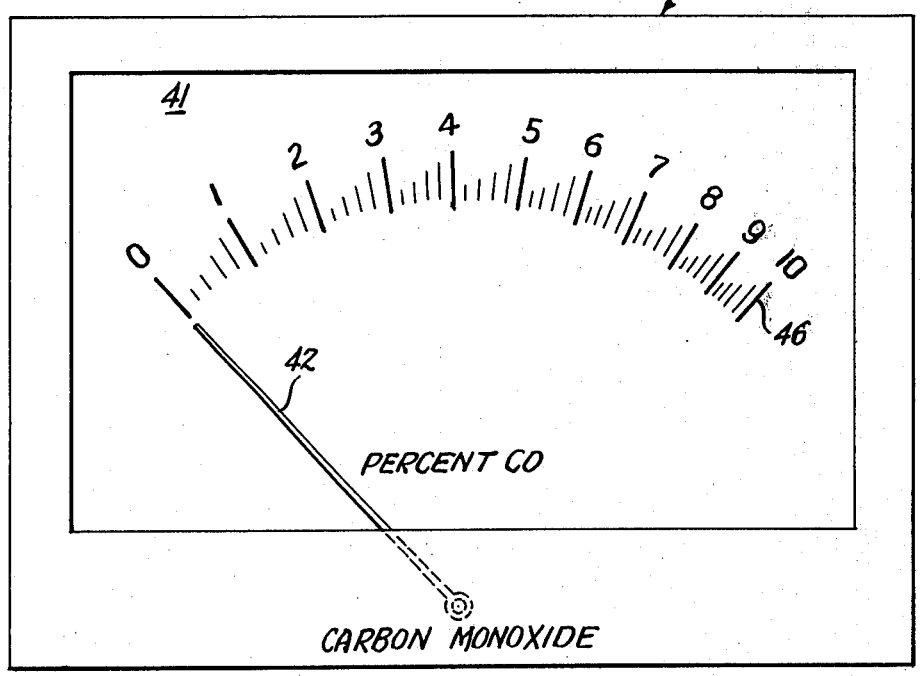
FIGS. 5, 6 and 7 are elevational views of the CO, HC and $NO_x$ meters, respectively.

FIG. 5 illustrates the CARBON MONOXIDE (CO) meter 40, which has a dial 41 and a pointer 42. The dial is graduated from 0 to 10 and indicates the percentage of CO in the exhaust gas.

Figure 6:
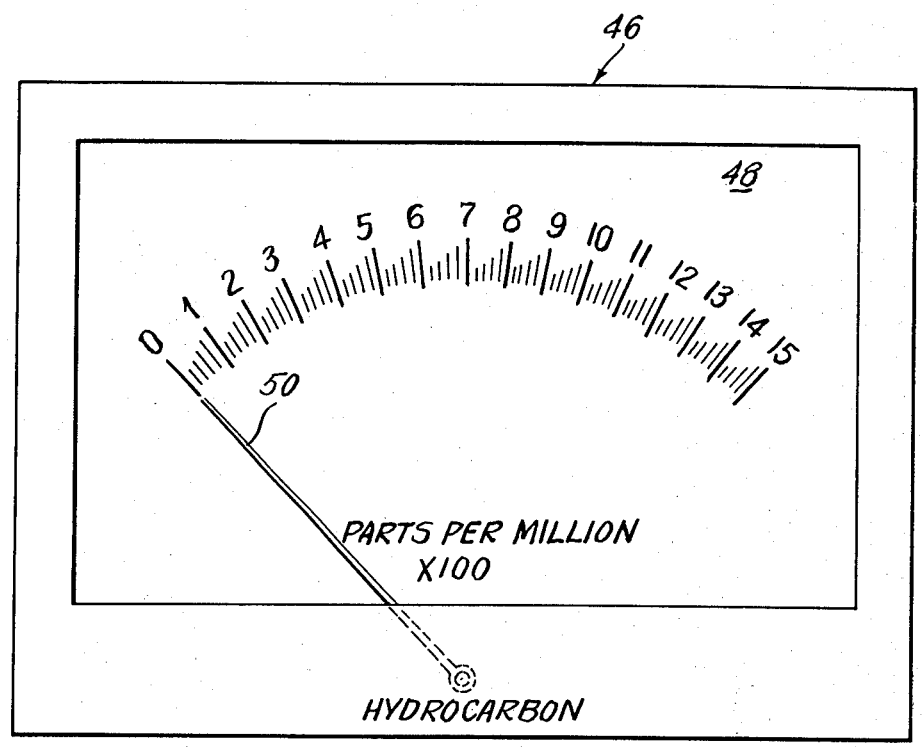

FIG. 6 illustrates the HYDROCARBON (HC) meter 46, which has a dial 48 and a pointer 50. The dial 48 has graduations ranging from 0 to 15 for indicating the HC parts per million $\times$ 100 in the exhaust gas.

Figure 7:
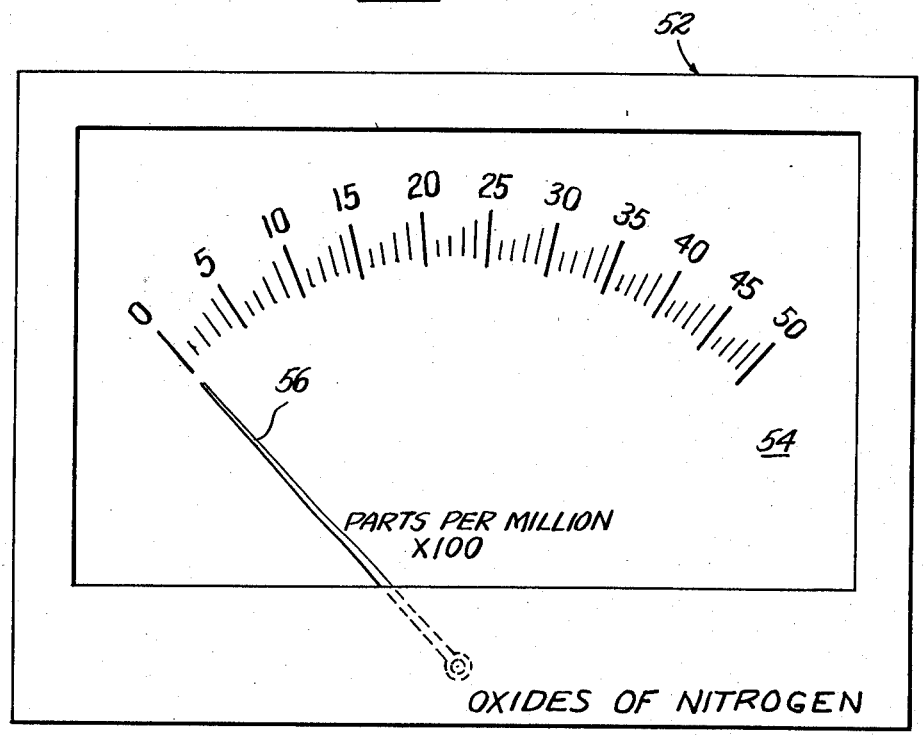

FIG. 7 illustrates the OXIDES OF NITROGEN ($NO_x$) meter 52, which has a dial 54 with graduations ranging from 0 to 50 and a pointer 56. The graduations indicate the $NO_x$ parts per million $\times$ 100 in the exhaust gases.

Figure 3:
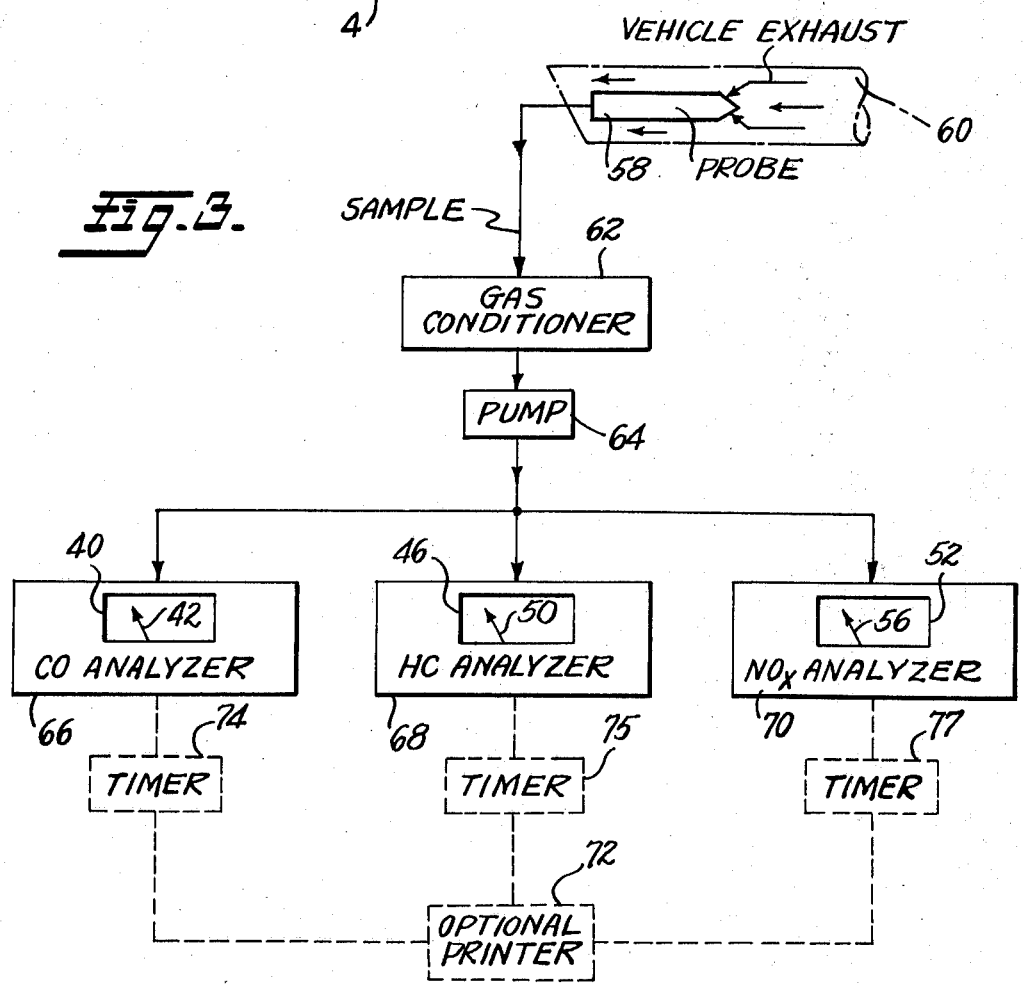
FIG. 3 is a diagrammatic view of the components of an exhaust gas analyzer and measuring system for evaluating exhaust gas emissions, including meters for measuring the values of CO, HC and $NO_x$, and an optional print-out device.

The CO meter 40, the HC meter 46 and the $NO_x$ meter 52 form parts of an exhaust gas analyzer system diagrammatically shown in FIG. 3. This apparatus includes a sampling tube or probe 58 that is normally inserted into the vehicle tail pipe 60 for continuously withdrawing a sample of exhaust gas. The gas sample is delivered to a gas conditioner 62 which conditions the gas and removes solid and liquid contaminants therefrom, and a pump 64 connected with the gas conditioner continuously drawing gas through the conditioner and delivering the gas to a CO analyzer 66, an HC analyzer 68 and optionally to an $NO_x$ analyzer 70.

An electronic print-out device 72 is conventional and is connected with the CO, HC and $NO_x$ analyzers, and is designed to automatically record the values of CO, HC and $NO_x$ that are indicated on the CO, HC and $NO_x$ meters 40, 46 and 52, respectively, after the readings have been stabilized. In order to make certain that the test operator maintains the prescribed modal loads for a sufficient time interval to enable the CO, HC and $NO_x$ meters, 40, 46 and 52 to become stabilized, a conventional electronic time delay device 74 is connected between the CO meter and the print-out device 72. Similar time delay devices 75 and 77 can be connected between the HC and $NO_x$ meters 46 and 52 and the print-out device 72.

FIG. 2 illustrates a power/speed curve for the power absorption unit 4, and is ideal for use in carrying out the present modal emission evaluation tests. As is shown, the speed in miles per hour is plotted as abscissas and the road horsepower as ordinates.

This substantially cubic power/speed curve passes through a point of 30 hp at 50 mph. The absorption characteristics of some variable control dynamometers inherently or automatically follow a curve whose power varies substantially as a cube of the speed when their absorption selection controls are fixed. When these are used, their degree of absorption may be established so that 30 hp is absorbed at 50 mph. When their controls are set to provide this basic load index point, they will closely follow the curve of FIG. 2 at other speeds. 30 hp a 50 mph, is suitable for testing large vehicles in the class weighing about 3800 pounds, and up, at the high cruise mode. For compact cars in the class weighing about 2800 pounds to 3750 pounds, a same curve may be established by indexing the dynamometer at 24 hp at 46 mph, which is suitable for testing such vehicles at the high cruise mode. The index for light import cars falling in the weight classification of about 1800 pounds to 2750 pounds is 15 hp at 38 mph, which is also applicable for testing at the high cruise mode. It will be recalled that the high cruise tests correspond to MODE 1 of the present invention. Values of loads and speeds for testing at MODE 2 (low cruise) and MODE 3 (idle) automatically follow the same curve, as will appear more fully hereinafter.

The selected modes relate to various engine operative phases or modes. One mode, for example, is at idle, where all engine systems are operating at fixed conditions as specified by the vehicle manufacturer. With the engine at idle, the ignition dwell, the ignition timing, the engine speed, and the carburetor idle air-fuel ratio are all prescribed by the vehicle manufacturer and are adjustable. The compression pressures and the combustion temperatures are low at idle engine speed, and are fixed in relation to the adjustments of timing, speed, temperature and air-fuel adjustment.

Above idle speed, and with the engine developing power to move loads, all of the above conditions, except dwell, vary from their idle mode parameters. As the throttle is opened to increase engine power and/or speed output, the air flow through the engine keeps increasing substantially. Signals generated by increased air flow and/or engine speed, cause automatic regulation of ignition timing and increased fuel flow. It is to be understood that during idle engine operation, fuel comes from the idle system of the carburetor. When the engine is required to develop power, the throttle is opened and the necessary additional fuel is provided from a main jet stream of the carburetor, which is separate from the idle stream. Higher compression pressures, engine combustion temperatures, fuel demand and electrical demand from the ignition system occur as a result of the increased throttle opening and the resultant increased air flow. Obviously, engines may operate successfully in one operation phase or mode, but not in another. To be practical, techniques for testing large numbers of vehicles must be short and this precludes testing and observing engine behavior except at key areas within its power/speed capacity. The selected modes of operation comprising the present method are steady state operating conditions of constant engine speed and load. The modes are the selected steady state modes of engine operation, within the power and speed range of interest, that most reliably stress the engine systems in a manner that causes faulty components in the systems to be exposed.

The number of modes employed is dependent on the intent of the test. Current legislation to control automotive emissions at time of vehicle design do not include the maximum speed and power ranges of most engines. Therefore, the modal test to evaluate emission performance need not exceed the engine powers and speeds required of the engine to negotiate the official emission certification test to which the vintage of vehicles were designed. Yet performance evaluation of the engine is served by testing in the upper areas of speed and power. As more emission controls are added to engines, they may require additional test points to examine function of controls, particularly those which respond to changes in vehicle speed and/or power. The $NO_x$ controls currently used on late model cars are a case in point and will be expanded upon later herein.

The present modal method of testing requires the use of a dynamometer, or any other suitable power absorbing means, for applying predetermined loads, at predetermined speeds, corresponding to vehicles falling in various classifications, the speed and load being carried out according to a fixed speed/load curve (FIG. 2) according to which the power absorbed varies substantially as the cube of the speed, modes deviations being permissible without impairment of the results.

Depending on type, variable control power absorption dynamometers can have different inherent power/speed characteristics with a given load index. For example, hydrokinetic power absorbers using liquid as a working fluid as disclosed in U.S. Pat. Nos. 2,452,550; 2,768,711 and 2,870,875 and hydrokinetic absorbers using gas as a working fluid, inherently possess substantially cubic power/speed absorption characteristics. These machines can be manually indexed at any point on the power/speed curve of FIG. 2 and the appropriate loading will occur at other speeds. The above hydrokinetic machines using liquid as a working fluid can retain their indexed load, thereby providing reasonable repeatability. The indexing, to establish the desired curve on such hydrokinetic absorbers, can also be automatically accomplished by adding apparatus such as disclosed in U.S. Pat. No. 3,818,754.

Electric or mechanical friction absorbers, on the other hand, do not inherently follow the preferred cubic power/speed characteristic and may require manual adjustment at each selected speed and power or torque for each modal test point. Alternately these absorbers may be equipped with automatic controls which force them to follow a repeatable power/speed curve after the curve level (or an appropriate index point) has been established. A further alternate is to employ so called constant speeding controls which seek to automatically maintain any selected speed regardless of power input. In this latter case, each test speed point must be selected and the vehicle throttle manipulated until the desired absorbed torque, force or power is achieved.

When the dynamometer operates on a known power/speed curve, the operator's guide instrument shown as the speed meter in FIG. 4 and as a speed/torque or power index meter in FIG. 18 (to be described) need only respond to one of the following parameters: power, speed, or function of torque.

It has been determined that the loads (combination of speed and torque or speed and power) required for the present modal emission evaluation method can be ascertained from a single power/speed curve. The degree of power absorption at any speed prescribed for the selected modes, tests all current spark ignition internal combustion engine equipped automobiles and light trucks on the same curve, e.g. FIG. 2.

The above single power/speed/absorption requirement is fortunate since it permits the use of power absorption devices operating in accordance with the single power/speed curve. These machines are usually lower in cost than those capable of load variation by the test operator, and do not require as much operating skill, nor any of the test operator's time in making adjustments to conduct a test at a selected load. Thus, they are ideal for optimum "indoor road testing" for emission evaluation. By operating the power absorption device with a fixed fill, that is, with the working circuit of the device completely filled with water or other fluid at all times, the desired power/speed curve for the present modal method of testing is inherently attained. The absorption characteristic cannot be changed through operator error or through malfunctioning automatic controls. Additionally, the power absorption device is not subject to excessive heating because there is a continuous flow of fluid through the same. Also, by using a fixed-fill power absorption device, conventional power absorber components, such as loading and unloading valves, torque arm, torque or force instrumentation, etc., can be eliminated, thereby reducing costs to a minimum. In the event that the power/speed curve should require a change, the power absorption device can readily be altered to conform to such curve merely by replacing the rotor by another designed to provide the requirements of the modified near cubic curve. However, it is to be understood that mechanisms other than fixed-fill power absorption devices can be used in carrying out tests according to the modal method of testing described herein.

Testing under the present modal method is greatly simplified by using a dynamometer which inherently absorbs the desired load at the preselected speed without the need for automatic controls or operator assistance. This enables the method to be carried out by an unskilled test operator, since the operator is required only to press on the accelerator pedal to open the carburetor throttle the proper amount to cause the engine to operate at specified modal loads prescribed for the different classes of vehicles, and to maintain operation of the engine at the prescribed loads for a period of time only long enough to allow the instruments indicating the value of the CO and HC in the exhaust gases to stabilize, and to record these values on a report card. The test operation and equipment is further simplified by providing the operator guide instrument in the form of a speed meter having a dial with graduations to represent road speed in mph and having, additionally, colored segments to guide the test operator in maintaining the proper speed (load) for each prescribed test mode.

FIG. 8 illustrates a typical report card 76 employed to record results of the modal tests. The card has a space 78 for recording the name of the vehicle owner, and full identification data of the vehicle being tested. The report card 76 has printed thereon three horizontal rows of blocks. The top row 80 comprises blocks containing the legends HIGH CRUISE, LOW CRUISE and IDLE, corresponding to the three modes of testing. These blocks are conveniently arranged, from left to right, in the preferred order in which the modal tests are conducted.

The second horizontal row 82 comprises a first block in which the legend - CO - CARBON MONOXIDE is printed, and additional blocks 82A, 82B and 82C directly below the respective legends. The blocks 82A, 82B and 82C have printed therein permissible maximum values such as 3% at idle, (block 82C).

The third horizontal row 84 comprises a first block in which the legend - HC UNBURNED HYDROCARBONS is printed, and additional blocks 84A, 84B, and 84C directly below the blocks 82A, 82B and 82C, respectively. The block 84A has printed therein a permissible maximum value of 220 ppm for HC emission at high cruise; the block 84B indicates a permissible maximum value of 240 ppm of HC at low cruise; and the block 84C indicates a permissible maximum value of 290 ppm at idle. A check-mark in any block indicates rejection because of excessive omission of the contaminant involved.

The report card 76 also indicates the results of test at loads and speeds prescribed for the particular class of vehicle involved. As is shown, the CO value at high cruise was 0.4; at low cruise, 0.6; and at idle, 2.8. All of these values are below the permissible values and acceptable. However, the HC value at high cruise was 1252; at low cruise, 1350; and at idle, 1482. All of these values far exceed the permissible values and warrant rejection of the vehicle as indicated by the check-mark in each of the blocks 84A, 84B and 84C.

FIG. 9 illustrates a report card 85 similar to that shown in FIG. 8, but including a column headed $NO_x$ CONTROL, and having a fourth row 86 of horizontal blocks, the first of which contains the legend - $NO_x$ - OXIDES OF NITROGEN. The third and fourth blocks, 86B and 86BB, provide space for recording $NO_x$ values, and these should show at least a 35% drop as the speed is slowed from low cruise to idle; otherwise, the $NO_x$ values would indicate that the $NO_x$ controls are not operating.

FIG. 10 illustrates a report card 88 similar to the report card 76, but including a column headed FULL THROTTLE above blocks 88D and 90D for CO and HC recordings at full throttle MODE 4. The card includes horizontal rows of blocks 92 and 94 for an optional repeat test for CO and HC, as indicated.

FIG. 11 illustrates a report card 96 that is a composite of cards 76, 85 and 88, and provides for recording of test data for all four MODES and $NO_x$ evaluations.

The use of a fixed load curve such as illustrated in FIG. 2 eliminates the necessity of changing the load imposed by the power absorption unit 4. Thus, extreme simplicity is achieved in conducting tests since the test operator need only observe the meter indicating the simulated speed in miles per hour that is being developed by the engine while the vehicle wheels are on the dynamometer rolls 10 and 12. When the engine is operating at the desired speed, the test operator holds the speed steady for a few seconds and observes the CO and HC meters 40 and 46 and records the readings thereof on a report card, such as shown in FIG. 8. This is done in connection with each of the modal tests at high cruise, low cruise and idle, in preferably that order.

Operation at high cruise corresponds to MODE 1 of the present emission evaluation method. The speed range for the high cruise is indicated on the speed meter 20 by the segment 28 colored red. The engine load automatically applied by the power absorption unit 4 would be about 27 to 30 hp.

After the test at high cruise has been completed, which requires only a matter of seconds, the test operator allows the carburetor throttle to partially close to make a test under low cruise conditions, which corresponds to MODE 2 of the present emission evaluation system. The speed range for low cruise is indicated by the segment 30 colored red on the dial 22 of the speed meter 20 and for the same vehicle classification. The load automatically applied is about 10 to 12 hp. The test operator holds the indicated speed steady for a few seconds while noting the readings on the CO and HC meters 40 and 46 and records the same on the report card.

The test operator next fully releases the carburetor throttle to perform a test under engine idle conditions, which corresponds to MODE 3 of the present emission testing method. The test operator observes the CO and HC readings under idle conditions and also records these in the appropriate spaces on the report card. The normal period of time required for testing emissions under MODES 1, 2 and 3 is less than a minute and a half and usually only about one minute. Thus, the present modal method provides an extremely rapid method for evaluating emissions of motor vehicle engines.

In making repairs or adjustments to correct engine malfunctions, the basic adjustments can only be made under idling conditions, and adjustments or repairs that are not overcome by making the idle adjustments, must be corrected in accordance with the final determination of the component or components of the system causing the engine malfunction.

FIG. 12 illustrates a typical truth chart having two sets of blocks 98 and 100, both depicting possible reject conditions due to abnormally high HC. The set of blocks 100 show reject marks in blocks 100A, 100B and 100C matching the reject blocks 84A, 84B and 84C of the report card 76. Accordingly, the indicated cause of excessive HC at the three modes would be applicable, namely, ignition misfire due to failure of an ignition system component. Thus, the truth chart, together with the report card 76, will enable a mechanic to quickly correct the malfunction, since the chart not only indicates the nature of the malfunction but explains the service steps for correcting the malfunction.

An abnormally high percent of CO is an indication of unnecessarily rich carburetion and that fuel is being wasted. Moreover, as is well known, CO is a poisonous gas. Small amounts entering the passenger compartment, due to minor exhaust system leaks, can cause drowsiness and retard driver response time. Prolonged inhalation or higher concentration can put a driver to sleep and eventually cause illness or death. Any reduction in excessive CO emission toward an acceptable value will promote both safety and economy of vehicle operation.

An abnormally high HC indicates that an unnecessary amount of fuel is passing through the engine without being burned. Abnormally rich carburetion will increase HC and waste fuel; however, near normal CO and excessive HC generally are due to ignition misfire or leaking exhaust valves that permit air and fuel to escape into the exhaust system without being subjected to combustion. Correction of the malfunction will result in fuel economy and a better running engine.

It is to be understood that the report cards and truth charts disclosed herein are typical and illustrate one condition of malfunction, that is, excessive HC at all modes and that in practice the report cards will indicate engine rejection for other malfunctions and that truth charts corresponding to such other malfunctions would be available to aid in correcting the malfunction.

The present modal method can also be employed for engine evaluation, in which event it is preferable to use a power absorption unit wherein the volume of water in the working circuit can be varied by the test operator to produce any desired load within the capacity of the unit at any desired speed, and to accurately repeat tests at the same load and speed. A chassis dynamometer having a cradled power absorption unit of the foregoing character is shown in FIG. 13. The parts thereof corresponding to those of the chassis dynamometer 2 shown in FIG. 1 have been identified by the same reference numerals. The unit 4A differs from the unit 4 shown in FIG. 1 in that it includes a heat exchanger 102 for cooling the liquid in the working circuit. It further differs in that it includes a loading valve 104 and an unloading valve 106 for varying the volume of liquid in the working circuit, at will. Accordingly, it will be understood that the capacity of the power absorption unit 4A will vary in accordance with the amount of water confined in its working circuit. In order to cool the confined water, it is necessary to circulate it through the heat exchanger, which itself is cooled by a continuous flow of water in contact with tubes (not shown) through which the liquid from the working circuit is circulated, as is well known in the art.

In the event that a test mode is included involving the acceleration or deceleration capabilities of the engine being tested, an inertia flywheel assembly 114 is arranged to be connected with the drive roll 10 of the dynamometer.

The inertia flywheel assembly 114 comprises a sheave 116 mounted on the shaft of the drive roll 10, a flywheel 118 mounted on a shaft 120 having another sheave 122 connected thereto and driven from the drive roll 10 by a series of belts 124. The inertia flywheel assembly 114 is optionally connectable to the drive roll 10 by a mechanism 126 that is actuated to tighten the belts 124 so that the flywheel 118 can be activated and deactivated at will.

A torque arm 108 is connected between the stator of the power absorption unit 4A and a force transducer 110 to provide a torque signal which when integrated with the speed signal from the tachometer 16 drives a horsepower meter 112.

The fourth mode, namely, that of testing the engine at full throttle for engine evaluation must be conducted with a dynamometer capable of applying various loads at various speeds, such as the chassis dynamometer FIG. 13. The dynamometer may optionally have associated therewith the flywheel 118 or other apparatus that will simulate the inertia effect of the various weight vehicles during acceleration and deceleration tests. However, for the purpose of emission evaluations from the standpoint of air pollution, or general improvement in engine operation, the three modal tests described herein are quite adequate.

The present modal emission evaluation method can also be used for determining oxides of nitrogen emissions, and particularly in connection with modern vehicles that include devices for controlling the exhaust emissions of $NO_x$. The $NO_x$ emission values would be recorded on report cards, such as shown in FIGS. 9 and 11. In addition, other modes and procedures can be effected where future control methods require and where special functions can be tested.

At present there are several devices that are being used to control the exhaust emissions of $NO_x$. Two of the devices utilize the same method based on the principle of retarding the ignition system spark advance when the vehicle is operating at low speeds. According to one of these systems, a speed sensing device is used which signals for spark retardation below a predetermined speed, such as approximately 20 miles per hour. The other system includes the use of a transmission switch which signals for spark retardation when the transmission is in a lower than top gear. All that a short emission test procedure need do with respect to $NO_x$ emissions is to verify whether or not the controls are in operation. Quantitative measurements of NO alone may be sufficient for an evaluation of the control devices. The term $NO_x$ refers to NO or NO plus $NO_2$ as used herein.

In order to incorporate the $NO_x$ test into the modal emission evaluation and repair system, an $NO_x$ control mode identification block appears on the report card. The test operator would follow a specific procedure for testing the particular type of control device provided on the vehicle, when he comes to that point in the cycle at which the $NO_x$ test can most practicably be made.

For speed sensitive $NO_x$ controls, the test operator would take an $NO_x$ reading from the $NO_x$ meter 52 at low cruise and another reading just below the predetermined speed where spark retardation should normally occur. If the $NO_x$ control means on the engine is functioning properly, the $N_x$ value should drop by at least 35% between low cruise and the lower speed described above. If such decrease does not occur, it indicates that the $NO_x$ control devices are not functioning as they should.

For testing vehicles with the transmission switch-actuated $NO_x$ control, the operator observes the $NO_x$ meter 52 at low cruise, then with fixed engine throttle position he would place the vehicle transmission in a gear lower than top gear. The $NO_x$ value should drop by at least 35% following the transmission shift. If such decrease does not occur, it indicates that the $NO_x$ control devices are not functioning as they should.

As has been indicated hereinbefore, the present modal system of measuring exhaust gas emissions is applicable to engines, new and old, and whether or not they are mounted in a vehicle. In testing such new or old engines, they are operated at engine speeds corresponding to the speeds at which they would be operated if installed in a vehicle operating at high cruise, low cruise or idle. For example, to simulate high cruise condition, the engine would be run at about 1700 to 2200 (or 3200 with high speed engines) rpm with the engine developing about 35 to 60% (or up to 75% with small engines) of its maximum torque capability. To simulate low cruise conditions the engine would be run at a speed greater than 40% (and preferably 60 to 70%) of its high cruise speed and at less than 50% (and preferably 30 to 50%) of its high cruise power (load).

A criteria for the high cruise loading is to approximate the maximum power/speed output by the engine while it is negotiating the applicable Federal test. The speeds and torques which will accommodate all vehicles necessitates broad ranges because of the wide variety of engine displacement/vehicle weight combinations. For example, the 170 cubic inch displacement (CID) engine works very hard compared to a 440 CID engine in the same weight vehicle. Some small engines will reach full throttle momentarily during the rate of acceleration in the Federal test, but preferably should not do so in the modal test to avoid failure for high CO with normal carburation. The loads for all vehicles in the low cruise mode are chosen to significantly reduce the air flow through the engine compared to that experienced at high cruise.

Automatic Evaluation System

Referring now to FIG. 14, there is illustrated an automatic control system for measuring and comparing the principal air contaminants in the exhaust gas emissions of an internal combustion engine with acceptable values. The system further provides a print out sheet in the form of a report card indicating the engine malfunctions, if any, and a guide line to enable a mechanic to make the proper adjustments or repair.

The automated system is designated to provide optimum speed for the prescribed test modes with minimum operator skill and experience. The control system is an electronic system which includes a mini computer 150. The computer receives appropriate signals on lead 151 from the vehicle identification control section such as vehicle weight class, type of emission control devices installed on the vehicle, etc.

The computer also receives signals on lead 152 from the main system set up controls section, i.e. data distribution format, automatic or manual pass/fail decisions and manual or automatic truth chart identification. Signals representing function test completions such as the arming, disarming of vehicle $NO_x$ control devices and so forth are supplied to the computer 150 via lead 153. A start test signal which may be a manually operated switch is applied to the computer via lead 154. A fluid powered lift mechanism of the type shown in FIG. 11 of the copending application, Ser. No. 382,538 now U.S. Pat. No. 3,899,916, filed on July 25, 1973 in the name of Edwin L. Cline may be positioned between the dynamometer rollers 10 and 12 to lift the vehicle driven wheels off of the rollers in the raised position and lower the wheels onto the rollers in the lowered position. Such a lift mechanism permits the vehicle to be readily driven on and off of the rollers. In response to the lift down signal on line 154, the computer issues a lower lift command signal on lead 155 to cause the lift mechanism to lower the vehicle wheels onto the dynamometer rollers 10 and 12 (FIG. 13) to couple the vehicle wheels to the power absorption unit 4A. In response to a start test signal on line 154 the computer initiates the test sequence. In response to a lift up signal on line 154 the computer issues a raise lift command signal on line 156 at the end of the test to raise the vehicle wheels off of the rollers 10 and 12.

A reduce gear compliance signal is applied to the computer via lead 157 for testing the operability of transmission sensitivity $NO_x$ control devices. A retest signal is applied to the computer by lead 158 to permit the operator to repeat a particular test mode. A disarmed vacuum spark advance signal is received by the computer on lead 159 to permit vacuum activated $NO_x$ control devices to be tested.

The computer 150 supplies appropriate driver instruction signals to a driver's instruction panel (FIG. 18) via lead 160 to inform the vehicle operator of the tasks that he is to perform as will be explained in more detail. A modal load index meter 166 receives a test speed signal on lead 168 from the computer 150 and a measured speed signal on lead 169. Alternately, the above speed signal can be a function of torque or power absorbed as explained earlier. The load index meter informs the vehicle operator whether the actual load is too high, too low or within the proper range. The measured speed signal is also supplied to the computer 150 to enable the computer to inform the operator to change speed, if necessary. A load signal comparator 170 receives a test speed range input signal on line 172 and a measured speed signal representing vehicle speed on lead 174. The measured speed signal may be provided by tachometer generator 16. The comparator 170 provides a load enabling signal on output lead 176 when the measured value of the speed falls within the particular range of speeds (loads) selected by the computer 150 for the test under consideration, e.g. high cruise, low cruise or idle.

Signals representing the measured values of the gases under consideration (e.g., CO, HC, $NO_x$ and $O_2$) are applied to gas stabilizer circuits 178 via input lead 180. The gas stabilizer circuits provide output signals on line 182 which represent the stabilized values of the gases being measured. A load gate 184 transfers the stabilized gas signals via output lead 185 to gas signal comparators 186 in response to a load enabling signal from the load comparator 170. The stabilized gas signals are also applied to the computer 150 via lead 188 for recording via lead 190. The computer or external circuit component may apply a read-out command signal on lead 192 to gating circuits 194 in response to the receipt of the stabilized gas signals.

The gas signal comparators 186 compare the stabilized gas signals with signals applied to input 187 which represent the acceptable limits of the gases under consideration. The comparators 186 provide a pass or fail output signal on output 189 when the measured values of the gases under consideration are below or exceed the acceptable values respectively. Gating circuits 194 transfer the output signals via lead 196 from the gas signal comparators to pass or fail indicators and to storage elements 198 in response to read-out command signals from the computer 150 on lead 192. The storage elements 198 store the fail signals for each gas (CO, HC, $NO_x$ and $O_2$) at each prescribed test mode in response to a storage command signal on lead 199. A truth chart matrix circuit 200 receives the fall signals on lead 202 from storage element 198 at the end of the testing sequence. In response to a truth chart command signal on line 204, the matrix actuates a report form printout selector 206 to cause the appropriate report form to be printed out or a preprinted form identified, thereby informing the vehicle operator of the engine malfunctions, if any, and the appropriate repair or adjustment guidelines, as will be explained in more detail.

It should be noted that a separate gas stabilizer 178, load gate 184, gas signal comparator 186 and output gating circuit 194 is provided for each gas to be measured and compared with pre-established limits as will be discussed in more detail.

Figure 15:
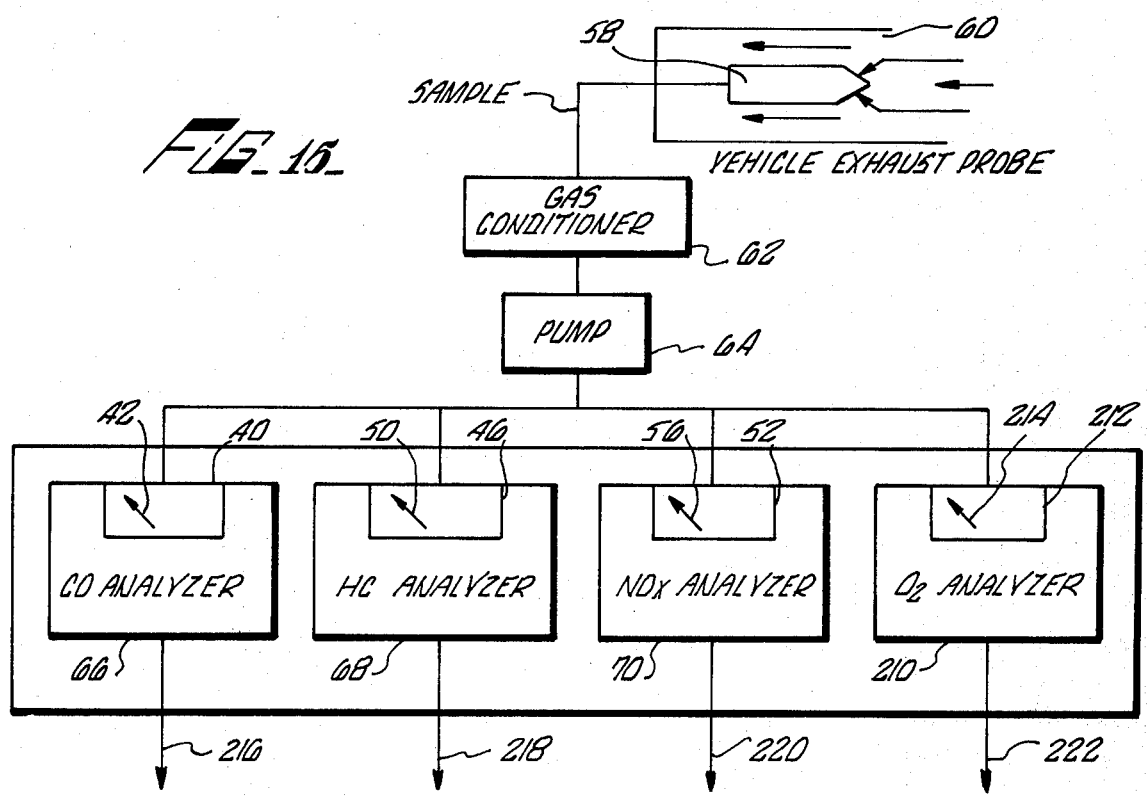
FIG. 15 is a diagrammatic view of the components of an exhaust gas analyzer for measuring CO, HC $NO_x$ and $O_2$.

Referring now to FIG. 15, an exhaust gas analyzer is illustrated which includes CO, HC, $NO_x$ and $O_2$ analyzers 66, 68, 70 and 210 respectively. The oxygen analyzer 210 includes a meter 212 having a pointer 214 which moves across a suitable scale with graduations ranging from 0 to 25 indicating the percent volume of oxygen in the exhaust gas. The remaining portions of the exhaust gas analyzer e.g., CO, HC and $NO_x$ analyzers bear the same numerals as the numerals given to the corresponding components in FIG. 3. The exhaust gas analyzer provides output signals on leads 216, 218, 220 and 222 which represent the quantitive measurements of the CO, HC $NO_x$ and $O_2$ in the exhaust gas emissions respectively.

The output signals from the exhaust gas analyzer are converted to digital signals by the circuits illustrated in FIG. 16. The CO, HC, $NO_x$ and $O_2$ signals are amplified by amplifiers 217, 219, 221 and 223 and applied to analog-to-digital converters 224, 225, 226 and 227 as shown. Analog signals representing the measured values of CO, HC $NO_x$ and $O_2$ are supplied on leads 230, 231, 232 and 233, respectively. Digital signals representing the measured values of CO, HC, $NO_x$ and $O_2$ are supplied on leads 234, 235, 236 and 237, respectively. Analog signals from the speed sensor or tachometer generator 16 are applied on lead 238 to an amplifier 240 and an analog-to-digital converter 241. An analog signal representing the measured value of the speed of the vehicle is supplied on lead 242 and a digital signal representing such measured speed is supplied on lead 243.

Referring now to FIG. 17, vehicle identification controls, setup controls and function test completion controls are provided to permit the operator to supply information to the computer concerning the particular dynamometer load to be supplied for each test mode, acceptable limits of air pollutants, etc. The vehicle identification controls include a vehicle class selector in the form of a six-position rotary switch 245 having a manually controlled rotatable knob 246. The vehicle class selection is preferably by vehicle weight but may be by engine displacement, or other suitable characteristics, if desired. The vehicle identification selector 245 informs the computer of the particular dynamometer load for each prescribed test mode of engine operation other than idle. As discussed previously, the power absorption unit 4 or 4A provides a load which varies substantially with the cube of speed. Thus, in preferred embodiments, the proper dynamometer load is set by controlling the speed of the driven roll. For testing vehicles under present standards, only four positions of the class selector 245 need be used, which positions corresponds to the vehicle weights set forth in the following Table A:

TABLE A

| Selector Positions | Vehicle Weight Pounds | Vehicle Class |
|---|---|---|
| A | Over 3800 | U.S. Regular/Heavy U.S. and Imports |
| B | 2800 – 3800 | U.S. Compact/Medium Imports |
| C | Under 2800 | U.S. Subcompact/Small Imports with Automatic Transmission |
| D | Under 2800 | U.S. Subcompact/Small Imports with Manual Transmission |

E and F Extra positions for categories not now required.

The preselected speeds which correspond to each vehicle weight category in the above Table A will be discussed in more detail in reference to the load index meter at FIG. 18.

A three-position rotary switch 247 with a manually rotatable knob 248 permits the operator to distinguish between 4 and 6 or 8 cylinder engines. The switch includes 3 positions—one designating 4 cylinder, one designating 6 or 8 cylinders and one designating all engines.

A five-position rotary switch 250 including a manually rotatable knob 251 permits the operator to select the proper vintage of the vehicle being tested. This selection informs the computer of the proper set of acceptable gas values to be used in evaluating the vehicle's performance. For example, the switch position "NONE" indicates that the vehicle has no emission controls, for example pre-1966 model vehicles in California and pre-1968 vehicles in the other states of the United States. Position 1 of the selector 250 represents vehicles which are equipped with the first generation vehicle emission controls, for example 1966 through 1970 models in California and 1968 through 1970 models in the rest of the United States. Switch positions 2 and 3 represent the second and third generation emission controls as will be described in more detail. Switch position 4 may be used for vehicles equipped with future generations of emission control devices.

A two-position rotary switch 252 with rotatable knob 253 permits the operation to inform the computer of whether the vehicle to be tested is equipped with a pump for injecting air into the exhaust stream (position YES). The position designated NONE represents those vehicles which do not employ any means to inject air into the exhaust manifold. Vehicles equipped with an exhaust air injection pump normally require a lower standard for exhaust gas emissions in the idle mode due to the resultant dilution of the exhaust sample.

A six-position rotary switch 254 with knob 255 permits the operator to select the particular type of oxides of nitrogen control device which has been installed on the vehicle to be tested. The position designated "NONE" is representative of vehicles which do not have $NO_x$ controls, e.g. pre-1971 model vehicles sold in California and pre-1973 vehicles sold in the rest of the United States. The position marked "TSAD" represents vehicles equipped with a transmission activated spark advance delay device, e.g. those vehicles in which the spark advance is delayed in gears other than high gear. The position marked SSAD represents those vehicles which have a road speed activated spark advance delay device. The position marked SAD represents those vehicles which have a spark advance delay device which is not responsive to the transmission gear or road speed, per se. The position marked EGR represents those vehicles which are equipped with an exhaust gas recirculation system and the position designated BOTH SAD AND EGR represent vehicles which are equipped with both a spark advance delay and an exhaust gas recirculation system. The function of the $NO_x$ selector switch 254 is to provide input signals to the computer for testing the particular $NO_x$ control device as will be described in more detail.

A three-position rotary switch 258 with a knob 259 permits the operator to provide input information to the computer concerning the type of catalytic converter, if any, with which the vehicle under test is equipped. The position marked "NONE" represents vehicles which do not have a catalytic converter. The position marked HC/CO represents a first generation of vehicles equipped with catalytic converter for reducing hydrocarbons and carbon monoxides. The position marked $NO_x$/HC/CO represents a second generation of catalytic converter equipped vehicles for reducing each of these gases.

The main system setup controls for the computer illustrated in FIG. 17 include an on/off power switch 260. A data distribution rotary switch 262 with knob 263 permits the operator to control the computer so that (1) in position marked MAN the data is only read manually on the gas analyzer meters; (2) in the position marked PRINT the measured and acceptable values of each of the gases under consideration will be printed out for each test mode; (3) in the position designated COMP the data derived from the gas analyzers is supplied to the computer for automatic comparison with acceptable values, etc. and (4) in the position marked BOTH the data is printed and supplied to the computer.

A three-position rotary switch 265 including knob 266 permits the operator to program the computer to provide an automatic comparison of the measured and acceptable gas values and provide pass or fail output signals for each gas at each test mode in the position marked AUTO PASS/FAIL ONLY. In the position marked AUTO PASS/FAIL WITH DATA ACQUISITION the computer provides pass or fail output signals and the actual values of the gases at each test mode are acquired for recordation, etc. In the position marked MAN the switch 265 programs the computer for manual data acquisition and comparison with acceptable values.

A two-position rotary switch 268 with a knob 269 permits the operator to program the computer for manual (MAN) or automatic (AUTO) truth chart identification.

Pilot light 270 illustrated in FIG. 17 informs the operator whether or not the dynamoter is absorbing the desired power. Light 271 indicates when instrument parameters are being calibrated and tests should not be undertaken.

The function test completion signal panel in FIG. 17 includes a disarmed push button switch 272 and an armed push button switch 273 to permit the operator to inform the computer by actuation of the appropriate switch as to whether or not the $NO_x$ control device of the vehicle has been disarmed or armed, respectively. A vacuum system of FIG. 23A is arranged to be connected to the vehicle vacuum system under test by means of a vacuum port 275 of FIG. 17.

To test vehicles for exhaust system leakage or exhaust gas dilution, a push button switch 280 is provided for permitting the operation to inform the computer that the tail pipe has been pressurized by blocking a portion of its outlet as will be described in more detail. A retest proceed switch 282 is provided to permit the operator to inform the computer that the previous test is to be repeated to obtain gas measurements without dilution. A cylinder shorted switch 283 permits the operator to inform the computer that a cylinder has been shorted to test the effectiveness of a catalytic converter.

Referring now to FIG. 18, an operator or driver instruction panel is illustrated which includes pilot lights 290 and 291 to inform the operator (when illuminated) that the vehicle should be in the direct drive (high gear) and in a reduced gear, respectively. The panel includes pilot lights 292, 293, 294, 295, 296, and 297 which relate to the $NO_x$ function test. Pilot light 292 informs the operator that he is to reduce one gear in the transmission. Lamp 293 informs the operator that he is to reduce the throttle to bring the moving indicator 307 into the ON zone of the load index meter 166. Lights 294 and 295 (when energized) inform the operator that he is to disarm and activate the vacuum spark advance, respectively. Lights 296 and 297 (when energized) inform the operator that he is to disarm and arm the exhaust gas recirculation system, respectively. Pilot lights 300, 301, 302 and 498 relate to the exhaust gas dilution tests. Pilot light 300 informs the operator that he is to pressurize the tail pipe. Light 301 informs the operator that the tail pipe has been pressurized. Pilot light 302 informs the operator that he is to retest because the vehicle exhaust system has a leak and light 498 informs the operator that he is to repair the exhaust analyzer sampler train leak and retest. Light 303 informs the operator that all tests are completed.

The load index meter 166 of FIG. 18 is of the center zero D'Arsonval type with a pair of input terminals 305 and 306. The meter responds to d.c. signals proportional to speed, torque or power. In the preferred embodiment, signals proportional to speed are used. The pointer 307 of the meter is centered when the magnitude of the signals applied to the input terminals 305 and 306 are equal. When the input signal applied to terminal 306 is larger than the input signal applied to terminal 305, the meter pointer moves to the right in the zone marked OVER, and when the signal applied to terminal 306 is less than the input signal applied to terminal 305, the pointer moves to the left in the zone marked UNDER. A d.c. signal proportional to vehicle speed from tachometer generator 16 is applied to meter terminal 306, and a d.c. signal proportional to the desired speed is supplied from the computer on line 168 to terminal 305. Thus, when the measured speed equals the desired speed for the particular test mode, the meter pointer will be within the central zone designated ON. This zone may represent any desired speed range, for example 3 MPH.

When the meter pointer is within the ON zone a pilot light 308 is energized by the computer informing the operator to maintain constant speed. A pilot light 309 (when energized) informs the operator that he is to change speed to center the meter pointer and a pilot light 310 (when energized informs the operator that he is to hold his present throttle position independently of speed.

Table B below illustrates typical speeds to be used with a power absorption unit having a horsepower speed characteristic as illustrated in FIG. 2 for three categories of vehicles at high cruise and low cruise test modes, etc.

TABLE B

| Vehicle Class Pounds | MPH High Cruise | MPH Low Cruise | MPH $NO_x$ SSAD | Idle |
|---|---|---|---|---|
| Over 3800 | 49 | 34 | 15 | Zero |
| 2800 – 3800 | 45 | 31 | 15 | Zero |
| Under 2800 | 37 | 24 | 15 | Zero |

The speeds set out in Table B are by way of illustration only. The particular speed for a given test mode will depend upon the power absorption unit and the desired engine loading.

At Idle, the vehicle brakes are to be applied by the operator to keep the dynamometer rolls from turning with the automatic transmission in the drive range. With no bucking voltage applied to meter terminal 305 in the Idle mode, the pointer would be out of the ON zone above 1½ MPH. This is considered satisfactory since brakes will either be applied or not. If not, the speed meter pointer will be in the OVER range, thereby reminding the operator to apply brakes.

Figure 19:
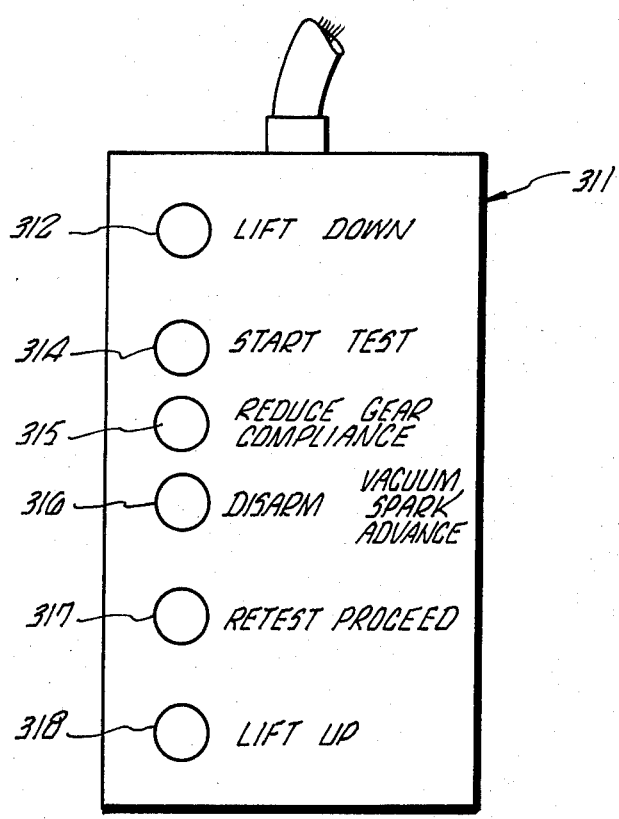
FIG. 19 is an elevational view of a portable control unit for use by the vehicle operator while seated within the vehicle.

Referring now to FIG. 19, there is illustrated a portable control unit which the operator may use while he is seated in the vehicle and controlling the throttle. The control unit 311 includes a push button switch 312 which the operator actuates to inform the computer 150 on line 154 to send a lower lift command signal on line 155 to lower the lift which place the powered wheels of the vehicle on the dynamometer rollers. A push button switch 314 is actuated by the operator to apply a signal on line 154 to the computer 150 to start the tests. A switch 315 is provided for actuation by the operator during tests on the $NO_x$ control devices to inform the computer 150 by a signal on line 157 that the transmission gear has been reduced. A switch 316 may be actuated by the driver to illuminate the vacuum spark advance disarm light 294 of FIG. 18. A switch 317 is actuated by the operator to inform the computer that he is ready to proceed with any retest procedure he may deem necessary. In response to the actuation of switch 317 the computer repeats the last test. A switch 318 is actuated by the operator after the tests are completed to cause the computer to apply a raise lift command signal on line 156 to raise the lift thereby permitting the operator to drive the vehicle off the dynamometer rollers.

Figure 20:
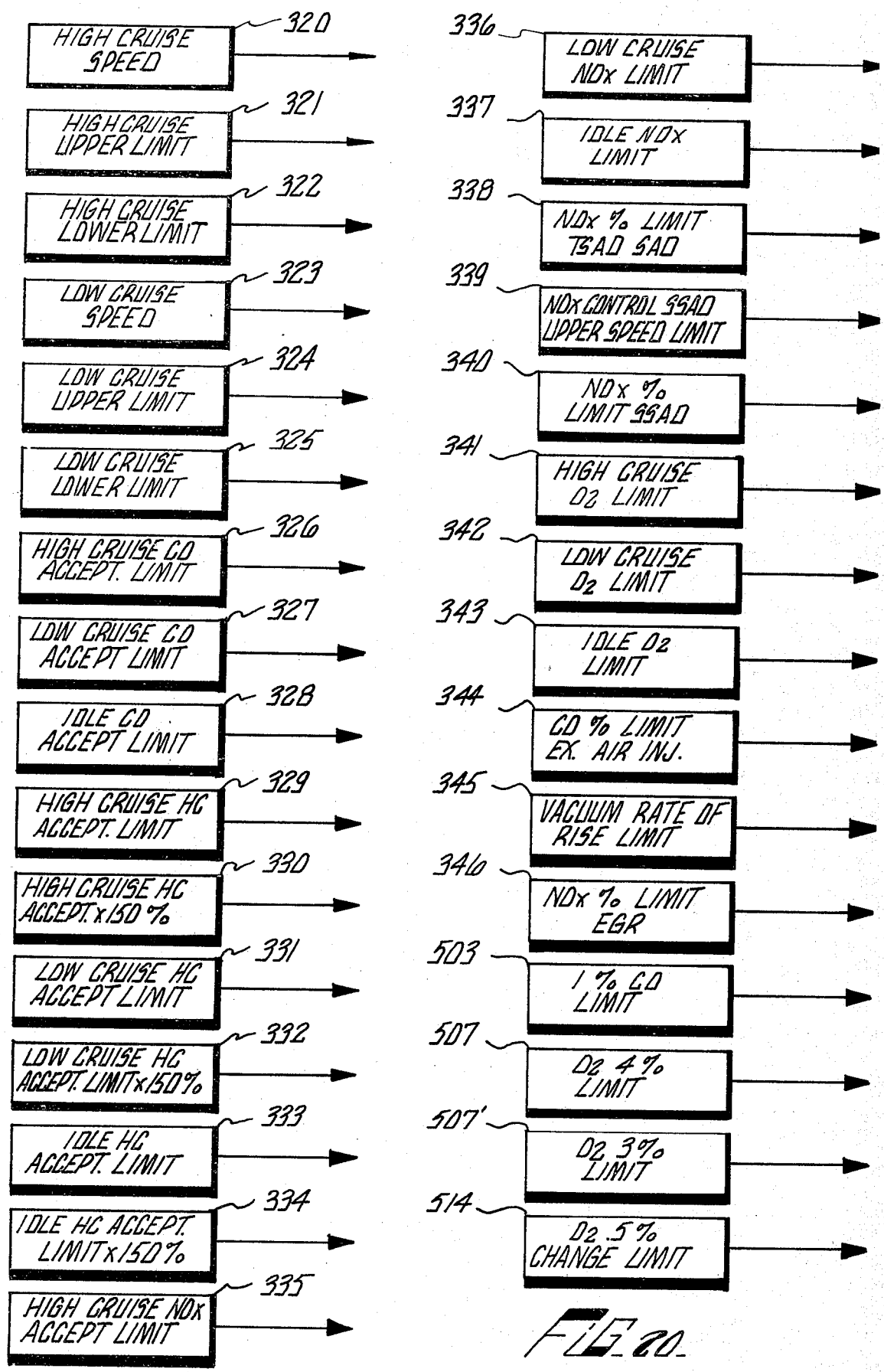
FIG. 20 is a block diagram of storage elements for storing the acceptable values of the gases under consideration.

Referring now to FIG. 20, there are illustrated storage elements 320 through 346, 503, 507, 507' and 514 which are included in the computer storage facilities. Storage elements 320, 321 and 322 provide output signals representing the high cruise speed and the high cruise upper limit and lower limit speeds, respectively for the particular class of vehicle undergoing the tests.

acceptable limit times a predetermined amount such as 150% at the high cruise, low cruise and idle values, respectively. Elements 335, 336 and 337 produce output signals representing high cruise, low cruise and idle $NO_x$ acceptable limits, respectively. Storage elements 338, 339 and 340 provide output signals representing the $NO_x$ % limit (for TSAD and SAD test) $NO_x$ control upper speed limit (for SAD test) and $NO_x$ acceptable limit (for SSAD test), respectively. The high cruise, low cruise and idle $O_2$ limits are provided by storage elements 341, 342 and 343, respectively. Storage element 344 provides signals representing the CO % limit for vehicles equipped with an exhaust air injection pump. Element 345 provides a signal representing the vacuum rise % limit for vehicles equipped with SAD controls. Element 346 provides a signal representing the $NO_x$ % limit for vehicles equipped with $NO_x$ ERG control devices. Element 503 represents a preset % of CO for providing an indication of expected $O_2$ due to engine operation relative to stoichiometric. Elements 507, 507' and 514 relate to $O_2$ % limits and $O_2$ % change limits, discussed in reference to FIGS. 27 and 27A.

It should be noted that the particular values of acceptable limits for the air contaminants in the exhaust gas emissions is dependent upon the standard set by governmental agencies and will change from time to time. Furthermore, under present proposed standards, the allowable air pollutants of any automobile, for example, are determined by the model year. Listed below are Tables C, D and E which disclose proposed standards for HC, CO and $NO_x$ for three separate groups of model year automobiles.

STANDARDS PROPOSED FOR INITIAL IMPLEMENTATION
IN A TEST FACILITY IN CALIFORNIA FOR MANDATORY
EXHAUST EMISSION INSPECTION OF LIGHT DUTY VEHICLES

TABLE C
1965 and Earlier Model Year Vehicles

| IDLE | | LOW CRUISE | | | HIGH CRUISE | |
|---|---|---|---|---|---|---|
| HC | CO | HC | CO | $NO_x$ | HC | CO |
| 1300 | 9.5 | 1000 | 6.0 | 2500 | 1000 | 5.0 |

TABLE D
1966 Through 1970 Model Year Vehicles

| IDLE | | LOW CRUISE | | | HIGH CRUISE | |
|---|---|---|---|---|---|---|
| HC | CO | HC | CO | $NO_x$ | HC | CO |
| 700 | 7.5 | 500 | 5.0 | 2500 | 500 | 4.5 |

TABLE E
1971 Through 1974 Model Year Vehicles

| NO. OF CYLINDERS | IDLE HC | | IDLE CO | | LOW CRUISE | | | HIGH CRUISE | |
|---|---|---|---|---|---|---|---|---|---|
| | AI | OTHERS | AI | OTHERS | HC | CO | $NO_x$ | HC | CO |
| 4 | 400 | 500 | 4.5 | 6.0 | 350 | 3.5 | 2500 | 350 | 3.0 |
| 6 and 8 | 250 | 350 | 4.0 | 5.0 | 250 | 2.5 | 2500 | 250 | 2.0 |

Storage elements 323, 324 and 325 provide output signals representing the low cruise speed and the low cruise upper and lower limit speeds, respectively. The specific values of the signals provided by the storage elements 320 – 325 will depend upon the classification of the vehicle being tested. Storage elements 326, 327 and 328 provide output signals representing the high cruise CO acceptable limit, low cruise CO acceptable limit and the idle CO acceptable limit, respectively. Storage elements 329, 331 and 333 provide output signals representing the high cruise HC acceptable limit, low cruise HC acceptable limit and idle HC acceptable limit, respectively. Storage elements 330, 332, and 334 provide output signals representing the HC The values set out in the above tables are parts per million (ppm) for HC and $NO_x$ and % for CO of the total exhaust gas stream. As is indicated by the above tables, the values of the acceptable limits for air contaminants are determined by the computer in accordance with the settings of the controls identified under emission controls type and perhaps number of engine cylinders discussed previously in connection with FIG. 17. The notation AI in Table E refers to those vehicles equipped with exhaust air injection systems.

OPERATION OF AUTOMATIC EVALUATION SYSTEM

In preparation for the test of any vehicle, the operator sets the vehicle identification controls illustrated in FIG. 17 to correspond to the vehicle being tested. The operator also sets the appropriate system setup controls to provide data acquisition by the computer, automatic comparison of the air contaminants with acceptable values, a record of the actual values for each test mode and so forth. Assume that the vehicle identification controls are set to correspond with the vehicle to be tested and that main system setup controls are arranged to provide (1) data distribution to the computer and to the printout unit, (2) automatic pass/fail decisions with data acquisition, and (3) automatic truth chart identification. The operator is now ready to test the vehicle. The test vehicle is driven onto the dynamometer rollers and the lifts lowered by actuation of switch 312 on the control pendant, FIG. 19. The gas analyzers are then connected to receive a sample of the vehicle exhaust gases as is illustrated in FIG. 15. The driver/operator actuates the test switch 314 on the driver pendant. The computer, in response to the appropriate signal, energizes the appropriate pilot light in the transmission gear section of the driver instruction panel at FIG. 18 to inform the operator whether he is to test in direct drive or reduce the gear by one.

The operator starts the vehicle wheels turning by controlling the vehicle throttle. The computer, in response to the vehicle class selector switch 245, selects the appropriate speed for the high cruise test, i.e. the proper signal output from the high cruise speed storage element 320, FIG. 20, and applies this signal to input 305 of the load index meter 166, FIG. 18. At this time, the computer energizes pilot light 309 informing the operator to change speed. The operator manipulates the throttle until the movable pointer of meter 166 is within the band marked ON. The computer then turns off lamp 309 and turns on lamp 308 informing the operator to hold steady within the ON zone. The vehicle is now in the high cruise mode.

Referring now to FIG. 21, the circuit components for comparing the measured values of CO, HC, $NO_x$ and $O_2$ with acceptable values is illustrated. The circuit components of FIG. 21 may be used to provide a pass or fail signal for each gas under consideration with or without data acquisition of measured values at each prescribed test mode of operation. Circuits for testing the operability of $NO_x$ controls will be described later. If governmental standards do not require an evaluation of the quantities of $NO_x$ or $O_2$ in the gas emissions at high cruise, low cruise and idle then the pertinent portions of the circuit of FIG. 21 would not be used during those tests.

The measured speed (load) signal from tachometer generator 16 on lead 243 is compared with an upper and lower speed (load) limit signal in a dual subtractor 360 which produces an output signal (i.e., high level) when the measured signal has a value between the upper and lower speed limit signals. The dual subtractor 360 may be of the type described in copending application, Ser. No. 382,538 now U.S. Pat. 3,899,916 filed July 25, 1973 in the name of Edwin Cline where the output lead to the timing circuit 362 corresponds to the output M in the copending application. The inputs of the subtractor 360 which are connected to the storage elements 321 and 322 are sometimes referred to collectively as the reference speed or load range input. The output signal from the subtractor 360 is applied to a timing circuit 362 and a gate 363. The timing circuit enables the gate 363 only after the subtractor 360 has continuously produced an output signal for a predetermined time interval, i.e. 1 – 5 seconds. The gate 363 when enabled transmits the output signal from the subtractor 360 to a CO speed gate 364 to enable the gate to transfer the input signal thereto to the output. The output signal from the gate 363 is sometimes referred to as the speed or load enabling signal. The speed enabling signal is also applied to HC, $NO_x$ and $O_2$ speed gates 365, 366 and 367, respectively.

The measured CO, HC, $NO_x$ and $O_2$ signals are applied to stabilizer circuits 370, 371, 372 and 373, respectively. The stabilizer circuits transmit the measured gas signals to the respective speed gates only after the signals have ceased fluctuating within certain limits over a prescribed time interval to insure that the signals represent a reliable quantitive measurement of the respective gas in the exhaust emissions. An example of one such stabilizer circuit is illustrated in FIGS. 31 and 32 to be discussed later.

The stabilized gas signals from the stabilizer circuits 370, 371, 372 and 373 applied to subtractors 280, 381, 382 and 383 respectively via gates 364, 365, 366 and 367, as shown. The gate 364 is enabled by the speed (load) enabling signal to transmit the stabilized CO signal to the subtractor 380. The gates 365, 366 and 367 are enabled by the occurrence of both the speed (load) enabling signal and the stabilized CO signal to transmit the HC, $NO_x$ and $O_2$ signals to the respective subtractors. Thus, before any of the gas signals are compared with the acceptable limits, the speed as measured by the tachometer generator 16 must remain within the preset range, (for example 3 MPH) for a given time interval, (e.g. 2 or 3 seconds) and the CO signal must have stabilized. The subtractors 380, 382 and 383 each include a pair of output leads marked P and F. The subtractors may be of the type illustrated in copending application, Ser. No. 382,538 supra, by reference 693, FIG. 34. The subtractors 380, 382 and 383 compare the respective stabilized gas signals with the preset acceptable limits as stored in storage elements 326, 335 and 341, respectively. Each subtractor provides an output signal (high level) (a) on output lead P when the measured value of the gas is below the acceptable limit represented by the signal from the respective storage element and (b) on output lead F when the measured gas signal is above the acceptable limit.

The subtractor 381 is referred to as a dual subtractor and may be of the same type as dual subtractor 360 with the exception that it includes three output leads marked P, M and F. An output signal is provided on lead P when the stabilized HC signal is below the acceptable limit represented by the signal from storage element 329. An output signal is produced on line M when the measured HC signal is greater than the acceptable limit but less than an intermediate value (i.e. 150% of the HC limit) as represented by the signal from storage element 330. An output signal is produced on line F when the measured HC signal exceeds the signal from storage element 330.

The M output signal from the subtractor 381 is applied along with the P and F output signals from the subtractor 380 to a pair of AND gates 385 and 386 as shown. The output signals P and F from the subtractor 381 are applied to OR gates 387 and 388, respectively. The outputs of the OR gates 387 and 388 are marked P' and F' respectively and represent the input signals to a gating circuit 391. A high level signal will appear on lead P' when the measured value of HC is (1) below the acceptable limit (storage element 329) or (2) over the acceptable limit but less than the preset increase (i.e. 150%) as determined by storage element 330 and the measured value of CO has exceeded its acceptable limit. A high level signal will appear on lead F' when the measured value of HC is (1) between the acceptable limit and the preset increase (storage element 330) and the measured value of CO is below its acceptable limit, or (2) over the acceptable limit and the preset increase.

Gating circuits 390, 391, 392 and 393, when enabled by signals supplied through delay networks 394, 395, 396 and 397 sample the output signals from the subtractor and energize respective pass or fail indicating lamps (marked P and F) in response to a high level signal on the P or F lead from the respective subtractor.

The pass and fail indicating lamps for each gas and each test mode of operation including full throttle are illustrated and given specific reference numerals in FIG. 29 to be described later. The delay networks 394 through 397 receive the respective stabilized gas signal from the gates 364, 365, 366 and 367 and enable the corresponding gating circuit a short time after the stabilized gas signal has been applied to the respective subtractor to insure that the output signals from the subtractors represent an accurate comparison of the respective gas with its acceptable limit. The gating circuits 390, 391, 392 and 393 may be of the type illustrated in copending application, Ser. No. 382,538, supra, as for example gate 446, FIG. 18.

The fail signals from the gating circuits are applied to the computer for storage in storage elements 400, 401, 402 and 403. The actual values of the stabilized gas signals are also supplied to the computer for providing a printing record.

The procedure for measuring and comparing CO and HC ($NO_x$ and $O_2$, if desired) with acceptable limits and providing pass/fail decisions indicating which of the gases have exceeded the acceptable limits is repeated with the apparatus of FIG. 21 at the low cruise test mode and the idle mode. If desired, these gases may also be checked at full throttle. In the low cruise mode the speed (load) range signal supplied to the dual subtractor 360 will bracket the speed (load) appropriate for the particular vehicle class as is illustrated in Table B. If the vehicle is equipped with an $NO_x$ control device then the operability of the device may be tested as will be explained later before proceeding to the idle mode. In the idle mode the speed should be zero as the operator will apply the brakes to prevent the dynamometer rollers from turning. The dual subtractor 360 in the idle mode will be supplied range reference signals which represent a speed of zero to 1 or 2 miles per hour.

In the low cruise and idle modes the measured values of $NO_x$ and CO may be stored for use in evaluating the effectiveness of the $NO_x$ controls with which the vehicle may be equipped and oxygen tests as will be explained. The pass/fail signals are stored for each test mode of operation and used at the completion of the tests in a truth chart matrix 200 (FIG. 14) to provide a printed report form informing the operator of the malfunctions and providing repair and/or adjustment guidelines as will be discussed in more detail in reference to FIG. 30.

EVALUATION OF $NO_x$ CONTROLS

Althouth the apparatus described herein permits $NO_x$ values to be accumulated in each mode used and vehicles to be passed or failed according to a pre-established standard, it should be understood that $NO_x$ can be higher than a critical standard for reasons other than malfunctioning $NO_x$ controls. When $NO_x$ controls are operating properly, the correction of CO and/or HC related malfunctions and/or misadjustments returns the individual vehicles to their near design capability for the emission of all three gases, and nothing further should be routinely undertaken by the average vehicle repairing agency to reduce $NO_x$. However, if the $NO_x$ controls are not functioning properly, their correction can be routinely undertaken. The time and equipment required for a repairing agency to routinely determine the state of maintenance of $NO_x$ controls is inordinately high for many vehicles. It is probable, therefore, that they will be neglected.

On the other hand, where periodic testing of vehicles is undertaken to control overall exhaust emissions, the determination of $NO_x$ control function can be undertaken by the method and apparatus described immediately below. Because of the several variations of $NO_x$ controls, the aggregate explanation is necessarily complex. However, from a practical point of view, it is to be understood that a given vehicle is only tested for the kind of $NO_x$ controls it employs.

VEHICLES EQUIPPED WITH TSAD CONTROL

Referring now to FIG. 22, a circuit for evaluating the effectiveness of a transmission activated spark advance delay (TSAD) $NO_x$ control is illustrated in FIG. 22. With the selector 254 of FIG. 17 rotated to the TSAD position the computer, after the completion of the low cruise test, de-energizes the pilot lamp 308 and energizes the pilot lamp 310 informing the operator to hold throttle position. At this time the computer also energizes pilot lamp 292 of FIG. 18 informing the operator to reduce one gear. After the operator has performed the gear reduction, he actuates the compliance switch 315 on the control pendant 311 at FIG. 19. The computer then, after a short time delay to accommodate the sampling response time of the analyzer, enables a gate 410 in FIG. 22 to thereby transmit the measured $NO_x$ signal to a subtractor 412. The subtractor 412 compares the stabilized $NO_x$ signal measured after the gear reduction with a preset percentage (e.g. 65%) of the $NO_x$ signal stored in storage element 414 during the low cruise test mode. The stored $NO_x$ signal is multiplied in divider 415 by a preset $NO_x$ percentage limit (e.g. 65%) in storage element 338. The divider 415 may be of the type shown in FIG. 17 of copending application, Ser. NO. 382,538, supra.

The subtractor 412 provides an output signal on lead P when the measured $NO_x$ signal is less than the $NO_x$ signal stored at low cruise multiplied by the preset $NO_x$ percentage limit indicating that the $NO_x$ gas has decreased as a result of the gear reduction by the predetermined percentage, i.e. 35%. The subtractor 412 provides an output signal on lead F when the measured $NO_x$ signal exceeds the output signal from the divider 415. A gating circuit 416 is enabled by the output signal from the gate 410 after a short time delay via delay circuit 417 and energizes (1) a pass indicating lamp 418 in response to an output signal on line P or (2) a fail indicating lamp 420 in response to an output signal on line F.

Upon completion of the decision, the computer will advance to the next test mode (usually Idle) by advice to the operator through FIG. 18. Lamp 292 will be cancelled and lamps 290 and 309 illuminated to inform the operator to change gears and speed.

VEHICLES EQUIPPED WITH SAD CONTROL

Referring now to FIG. 23, there is illustrated a circuit for evaluating the operability of a vehicle equipped with a spark advance delay (SAD) to reduce the oxides of nitrogen. When the $NO_x$ selector 254 (FIG. 17) is in the position marked SAD, the computer, after the low cruise test, illuminates the (a) hold throttle position lamp 310, and (b) the vacuum spark advance disarm lamp 294 in FIG. 18. The operator disconnects the vacuum hose to the distributor spark advance actuator (sometimes referred to as the ignition timing regulation means) downstream of the vacuum delay unit and connects the engine vacuum source to the vacuum gauge inlet port 275 (FIG. 17) to measure the rate of vacuum rise. The operator, upon completion of the disconnect operation, depresses the $NO_x$ disarmed switch 272 of FIG. 17.

Referring now to FIG. 23A a vacuum signal transducer 424 is connected internally through a solenoid value 422 to the port 275. The transducer 424 generates an analog signal proportional to the vacuum present in the engine vacuum hose which is normally connected to the distributor advance actuator.

The solenoid valve 422 in the form of two position valve which is in the de-energized position (shown in the dotted lines) connects the port 275 and the engine vacuum hose to atmosphere. In response to the operation of the disarmed switch 272 of FIG. 17 the computer energizes the valve 422 and connects transducer 424, vacuum gauge 274, and a vacuum switch 466 to the vehicle vacuum hose via port 275. The internal volume of the line connecting the port 275 to engine vacuum hose and the components 424, 274, and 466 including the connecting lines should approximate the internal volume of the typical engine advance system between the vacuum delay unit 421 and the vacuum actuator 423. It should be noted, however, that discrepancies between such volumes may be compensated for by the use of an appropriate delay or vacuum rate of rise limit value in the circuit of FIG. 23. The rate of vacuum change at the transducer 424 should approximate the rate of vacuum change normally present at the distributor vacuum advance actuator.

The vacuum switch 466, to be described in more detail in reference to FIG. 25, includes a double pole single throw switch. The movable contact of the switch 466 is connected to a positive bias source and actuated by a diaphragm coupled to the vacuum line as shown. The switch 466 includes output leads marked P and F and provides a high level output on lead P or F when vacuum is not or is present at port 275, respectively.

Referring again to FIG. 23, the signal from the transducer 424 is supplied to a differentiating circuit 425. In response to the operation of a disarmed switch 272 (FIG. 17) the computer provides a $NO_x$ disarmed confirmation signal, which (1) energizes the solenoid valve 422 to connect the transducer 424 to the vehicle vacuum source, (2) enables the differentiating circuit 425, and (3) through a time delay 429 to accommodate gas sampling response time, enables a gate 426. The differentiated vacuum signal is converted to a digital signal via an analog-to-digital converter 427 and compared via subtractor 430 with a signal stored in element 345 representing a maximum preset limit of rate of vacuum rise. The subtractor 430 provides an output signal on (1) lead P when the rate of vacuum rise is less than the preset limit, and (2) lead F when the vacuum rise is greater than the preset limit.

Figure 30:
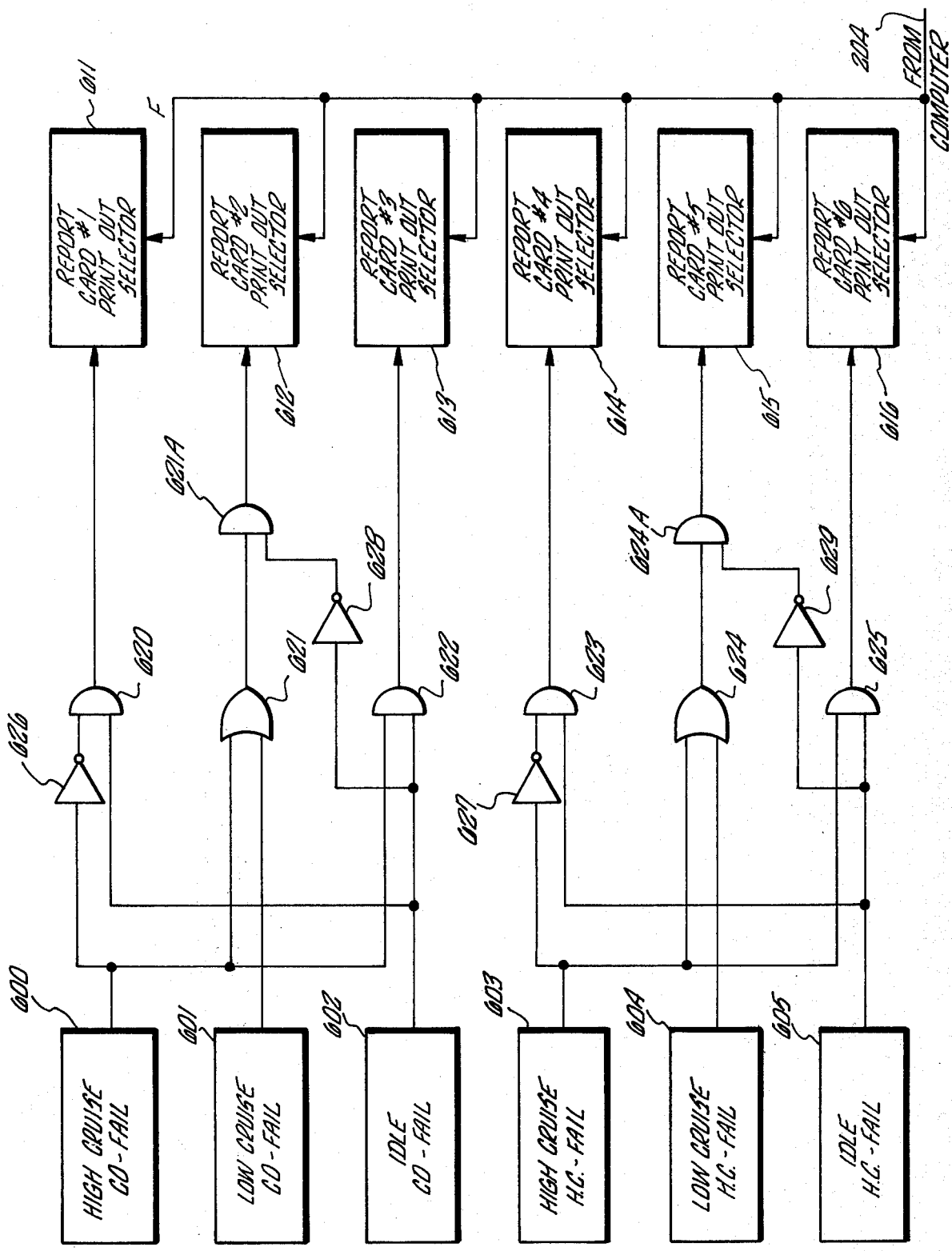
FIG. 30 is a block diagram of a circuit for providing a written indication of engine malfunction and guidelines for adjustment or repair in accordance with excessive CO and HC measurement.

A storage and priority circuit 434 which may be of the type disclosed in FIG. 30 of copending application Ser. No. 382,538 supra is connected between the subtractor 430 and an output gating circuit 432. The storage and priority circuit 434 provides an output signal on output lead F in response to an output signal on lead F of the subtractor 430 at any time. Thus, a high level signal will be provided on lead F from the storage and priority circuit 434 to the gating circuit 432 when the maximum rate of rise of the measured vacuum signal exceeds the preset limit in storage element 345. An output signal on lead F of the gating circuit 432 is applied to an OR gate 435 and energizes a fail indicating lamp 436 indicating that the SAD $NO_x$ control is inoperative.

An output signal on lead P of the gating circuit 432 is applied to one input of an AND gate 437. The SAD control will pass only if the minimum rate of vacuum rise is less than the preset amount and the $NO_x$ signal decreases by a preset amount as will be explained.

During the time that the rate of vacuum rise is being compared with the preset limit, the measured $NO_x$ signal is compared with the $NO_x$ signal during low cruise and stored in element 414 to determine whether or not the $NO_x$ gas has decreased by a preset percent, e.g. 35%. To accomplish this comparison, the $NO_x$ signal stored during low cruise is multiplied by the preset $NO_x$ percent limit (i.e. 65%) stored in element 338 by a divider 442. The output of the divider 442 is compared with the current $NO_x$ signal in a subtractor 444. The subtractor 444 applies an output signal on line P when the current value is less than the preset percent (i.e. 65%) of the $NO_x$ value at low cruise and provides an output signal on line F when the current $NO_x$ value exceeds the present percent of the stored $NO_x$ value. A gating circuit 445 is enabled after a short time delay via delay 447 and provides (1) an output signal on line P to the AND gate 437 in response to an output signal on lead P of the subtractor 444, and (2) an output signal on line F to OR gate 435 in response to an output signal on lead F of the subtractor. An output signal (high level) on leads P from each gating circuit 432 and 445 energizes a pass indicating lamp 438 via AND gate 437. Thus the SAD $NO_x$ control device is indicated as functioning properly only when the rate of vacuum rise is less than the preset limit and the $NO_x$ value decreases from the low cruise value by a preset amount, e.g. 35%. The fail signals from gating circuits 432 and 445 are supplied to the computer for recording so that the specific cause of the SAD control device failure may be provided.

Upon completion of the decision, the computer will cancel lamps 294 and 310 of FIG. 18 and illuminate lamp 295, requesting that the vehicle SAD control be activated. This is accomplished by reconnecting the vehicle vacuum source to the distributor vacuum spark advance actuator. Upon completing the above reconnection, the operator advises the computer that he has complied by pressing the armed switch 273 of FIG. 17.

The computer will then extinguish lamp 295 and advance to the next programmed mode.

VEHICLES EQUIPPED WITH EGR CONTROL

When the $NO_x$ selector switch is in the position marked EGR indicating the engine is equipped with an exhaust gas recirculation system (EGR), the $NO_x$ control device is tested by the circuit of FIG. 23 and the operations are as described in connection with the SAD control, except that the pilot lights 296 and 297, FIG. 18 relating to exhaust gas recirculation are selectively energized by the computer instead of the vacuum spark advance lamps, and the storage element 346 (FIG. 20) is substituted by the computer for element 338. This circuit is illustrated in FIG. 24. The engine vacuum control hose normally connected to the EGR valve is disconnected and the engine vacuum source is plugged. In this test the engine vacuum source need not be connected to the vacuum gauge inlet connection 275 (FIG. 23A).

When the engine vacuum source is plugged, the operator presses the $NO_x$ disarmed switch 272 (FIG. 17), confirming to the computer that the vacuum source has been disconnected from the EGR valve. The computer supplies an $NO_x$ disarmed confirmation signal through delay network 429', sufficient to accommodate the sampling system response time of the analyzer, to a gate 426' to enable this gate and transfer the current $NO_x$ signal to one input of a subtractor 444'. The $NO_x$ signal at low cruise as stored in element 414 is multiplied by a preset $NO_x$ percent limit as stored in element 346 by a divider 442'. The resultant signal is applied to the other input of a subtractor 444'. In this case, the preset $NO_x$ limits is greater than 100%, for example 120%, since $NO_x$ will increase rather than decrease with the exhaust gas recirculation system disarmed. A gating circuit 445' samples the output leads from the subtractor 444' and energizes pass or fail indicating lamps 450 or 451 when the current $NO_x$ signal has increased the preset amount over the stored $NO_x$ signal at low cruise or has remained below such value.

Upon completion of the decision, the computer will cancel lamps 296 and 310 of FIG. 18 and illuminate lamp 297 requesting that the engine EGR control be activated. This is accomplished by reconnecting the engine vacuum source to the EGR valve. Upon completing the above reconnection, the operator advises the computer that he has complied by pressing the armed switch 273 of FIG. 17. The computer will then extinguish lamp 297 and advance to the next programmed mode.

VEHICLES EQUIPPED WITH BOTH EGR AND SAD CONTROLS

When the $NO_x$ selector 254 is positioned to indicate that the engine is equipped with both EGR and SAD the tests discussed with respect to SAD and EGR controls are performed separately.

VEHICLES EQUIPPED WITH SSAD CONTROL

A circuit for testing the operability of a speed actuated spark advance delay (SSAD) $NO_x$ control is illustrated in FIG. 25. This test is normally conducted after the completion of the low cruise test. With the $NO_x$ selector 254 in the SSAD position, a tee is inserted in the engine vacuum hose leading to the distributor spark advance actuator inlet and the branch of the tee is connected to the vacuum inlet connection 275 of the computer interface panel, FIG. 17. The computer, after completion of the low cruise test, changes the test speed signal applied to the load index meter 166 to a suitable value, for example, equivalent to a 15 MPH. The computer also energizes pilot lamp 309, FIG. 18, informing the operator to change speed. The measured speed signal is compared with an upper speed limit signal in storage element 460 and a lower speed limit signal in storage element 461 in a dual subtractor 462. The dual subtractor applies an output signal to an output timer 464 when the measured speed is within the desired speed range, for example 15 MPH ± 1-½ MPH. The timer 464 applies an enabling signal to a gating circuit 465, a predetermined time (e.g., 5 seconds) after receiving an output signal from the dual subtractor 462 to permit the output signals to stabilize. A vacuum switch 466 produces an output signal (high level) on lead F indicating that distributor advance vacuum is present. A high level signal is present on output lead P of the vacuum switch 466 when no distributor advance vacuum is present. The output signals from the switch 466 are applied to a gating circuit 465.

The gating circuit 465 includes output leads P and F, and when enabled the circuit provides a high level signal on lead F when distributor advance vacuum is present and a high level signal on lead P when the distributor advance vacuum is absent. A high level signal on lead F from the gating circuit 465 is indicative of the fact that the vehicle speed sensing circuit of its $NO_x$ control is inoperative. This signal is supplied to the computer through a normally enabled gate 467 and an OR gate 471 to provide energization of the vacuum spark advance activate lamp 295 (FIG. 18). The output signal on line F of gating circuit 465 is also supplied to a SSAD fail indicating lamp 470. The test is completed and the tee is to be removed from the engine vacuum line.

If no distributor advance vacuum is present the high level output signal from gating circuit 465 on lead P is applied to gate 476 to disable the same and to a gate 468 to enable this gate. The high level signal on lead P from the gating circuit 465 is also supplied to the computer to (a) initiate the change speed command signal via lamp 309, FIG. 18, and (b) supply a voltage to terminal 305 of the load index meter 166 (FIG. 18) which represents a rate of change of approximately ½ mile per hour per second. Thus, the driver is informed he must change speed at the rate of approximately ½ MPH per second. This desired speed signal is continually applied to terminal 305 of the load index meter until a speed of approximately 40 MPH is reached or until the vacuum switch 466 produces an output signal on lead F indicating that distributor advance vacuum is present, whichever condition occurs first.

Where no distributor advance vacuum is present when the vehicle speed has reached the $NO_x$ upper speed limit (i.e. 40 MPH) then the $NO_x$ control is deemed inoperative and the circuit for making this decision will now be described. A subtractor 482 compares the measured speed signal with the $NO_x$ control upper speed limit as stored in element 483 and produces an output signal on lead F if the measured speed reaches the upper speed limit. The output signal from the subtractor is applied to the fail indicating lamp 470 via OR gate 471 and to the computer to energize vacuum spark advance activate lamp 295. The test is completed and the vacuum tee is to be removed.

If the distributor advance vacuum is present before reaching the $NO_x$ upper speed limit when the vacuum switch 466 produces an output signal on lead F which is supplied to the computer via gating circuit 465 and gate 468 to energize the hold throttle position light 310 on the load index meter 166. The computer at this time also supplies a storage command signal to a $NO_x$ storage element 473 which stores the current $NO_x$ signal. Due to the inherent instrument sampling system lag, the value of the $NO_x$ stored in element 473 will represent engine operation where no distributor vacuum advance has been applied. A timer 474 which provides a suitable time delay, for example 10 seconds, is also activated by the computer at this time. The timer 474 at the end of the predetermined time delay supplies the current $NO_x$ signal to a divider 475 which multiplies the current $NO_x$ signal by preset $NO_x$ percent limit contained in storage element 340. Such preset limit for example may by 57%. The current $NO_x$ value multiplied by the preset percent limit (element 340) is compared with the stored $NO_x$ signal from storage element 473 in subtractor 476. If the output signal from the divider 475 is greater than the output signal from the storage element 473, an output signal is provided on lead P of the subtractor 476. If the output signal from divider 475 is less than the signal from element 473 the subtractor provides an output signal on lead F. A gating circuit 478 is enabled by an enabling signal from a delay network 479 a short time after the timer 474 has transmitted the current $NO_x$ signal to the divider 475. The gating circuit 478 in response to an output signal on the lead P from the subtractor energizes a pass indicating lamp 480 and in response to an output signal on lead F from the subtractor energizes a fail indicating lamp 470 through OR gate 471. The pass or fail signal is supplied to the computer to energize the vacuum spark advance activate lamp 295 of FIG. 18 to remind the operator to remove the tee from the engine vacuum line.

Thus, the SSAD fail indicating lamp 470 will be energized (1) if there is no distributor vacuum advance present when the vehicle is operated in the speed range determined by the signals from memory elements 460 and 461, (2) if the value of $NO_x$ with distributor vacuum advance present does not exceed the value of $NO_x$ with the distributor vacuum advance absent by a preset amount (e.g. 50%), or (3) if the distributor vacuum advance is not present at the upper speed limit (e.g. 40 MPH) as determined by storage element 483. The fail signals to the OR gate 471 are also supplied to the computer for recording so that the specific cause of the SSAD control device failure may be provided. The operator in response to the illumination of lamp 295, FIG. 18 is to restore the engine vacuum system to normal and depress the $NO_x$ armed switch 273 (FIG. 17) allowing the computer to advance to the next test.

DIAGNOSTIC VALUE OF OXYGEN MEASUREMENTS

The oxygen content in the exhaust gas can be useful in exposing the presence of vehicle exhaust system leaks which (1) can by a hazard to the occupants of the vehicle and (2) dilute the exhaust gas and, therefore, discredit the measured values of exhaust gas content during previous tests, particularly at Idle, where the total exhaust volume is low. Because of engine pumping pulsations, particularly at Idle, ambient air can be drawn into the exhaust system even through subtle leaks or at the end of tail pipes connected with a small number of cylinders where air can be drawn into the analyzer sampling probe if the latter is not placed well up into the tail pipe. In addition, oxygen content can be useful to determine function of air injection pumps. Therefore, the following tests may be performed to validate exhaust gas measurements provide knowledge of any exhaust air system leaks, and determine the operability of the vehicle exhaust air injection system.

EVALUATION OF $O_2$ WITH NON-AIR INJECTED AND NON-CATALYST EQUIPPED VEHICLES

A circuit for evaluating $O_2$ in the exhaust gas emissions with vehicles that are not equipped with an air injection pump or a catalytic converter is illustrated in FIG. 26. With the exhaust air selector switch 252 (FIG. 17) rotated to the NONE position and the catalyst switch 258 (FIG. 17) rotated to the NONE position, the computer in the idle mode only compares the $O_2$ value with the acceptable value by the apparatus illustrated in FIG. 26. The components of FIG. 26 which correspond to the components of FIG. 21 are given the same reference numerals.

If the acceptable $O_2$ level is not exceeded then gating circuit 393 energizes the associated $O_2$ pass indicating lamp 574 and lamp 496 via OR gate 493 which indicates that the exhaust system does not have a leak. The test is then completed. If the acceptable value of $O_2$ is exceeded, an $O_2$ fail lamp 575 is energized. Excessive $O_2$ also informs the operator that the CO, HC and $NO_x$ values obtained in the idel mode may be invalid and should not be accepted.

A fail signal from the gating circuit 393 indicating that $O_2$ exceeds acceptable value at idle is supplied to the computer to energize the pressure tail pipe lamp 300, FIG. 18. The operator in response to this instruction restricts the outlet area of the tail pipe without removing the analyzer sampling probe. When the tail pipe has been pressurized, the operator actuates the switch 280 on the control panel at FIG. 17. The computer now illuminates the pressurized tail pipe lamp 301, FIG. 18, and enables a gate 490, via a delay 491, FIG. 26, to accommodate gas sampling time response. The measured $O_2$ signal with the tail pipe pressurized is then compared with the idle $O_2$ acceptable limit in a subtractor 492. If the $O_2$ signal with the tail pipe pressurized (1) exceeds the $O_2$ idle acceptable limit, an output signal is provided on lead F, or (2) is below the acceptable limit, an output signal is provided on lead P. A gating circuit 494 is enabled via delay network 495 and in response to an output signal energizes on lead P from the subtractor 492 a fail indicating lamp 497 and transmits a signal to the computer which energizes the retest/exhaust lamp 302, FIG. 18, to instruct the operator to retest the emission values at idle with the tail pipe pressurized modestly. The operator then actuates the retest proceed switch 282 on the test panel of FIG. 17 and the computer in response thereto compares the measured values of CO, HC and $NO_x$ with the acceptable limits via the circuit of FIG. 21.

Usually because of high mass flow through exhaust systems at high and low cruise, a serious rupture of the exhaust system would be required to invalidate the tests at these modes. However, if desired, these modes could also be rerun with the exhaust system pressurized.

The gating circuit 494 in response to an output signal on lead F from the subtractor 492 applies a high level signal to a pair of AND gates 499 and 500. An HC idle fail storage element 501 is also sampled at this time and its output signal is applied directly to AND gate 499 and the inverted output is applied to AND gate 500 via inverter 502. A high level output signal from element 501 is indicative of the fact that the HC acceptable limit has been exceeded in the Idle mode and a low level output signal from element 401 indicates that the acceptable limit has not been exceeded.

AND gate 499 and OR gate 493 energize the exhaust system leak pass indicating lamp 496 when (a) the $O_2$ signal remains above the Idle limit with the tail pipe pressurized, and (b) the HC signal at Idle (without tail pipe pressurization) has exceeded its acceptable limit. AND gate 500 transmits a signal to the computer to energize the retest/sampler lamp 498 when (a) the $O_2$ signal remains above the Idle limit and (b) the HC signal at Idle did not exceed its acceptable limit. In the latter case, the exhaust analyzer sampler train must be repaired to eliminate the air leakage and the test rerun.

OXYGEN TEST AT IDLE WITH EXHAUST AIR INJECTION AND NON-CATALYST EQUIPPED VEHICLES

Referring now to FIGS. 27 and 27A, there is illustrated a circuit for evaluating the oxygen content of the exhaust gas stream of vehicles equipped with an air injection system and without a catalytic converter. The circuit of FIGS. 27 and 27A provides information concerning the operability of the vehicle air injection system and the integrity of the vehicle exhaust system.

The levels of $O_2$ and CO that are normally present in the exhaust of an internal combustion engine are dependent upon whether the engine is operating leaner or richer than stoichiometric. The $O_2$ level will be higher and the CO level will be lower when the engine is operating leaner than stoichiometric. For this reason the CO signal must be compared initially with a preset limit for example 1% to determine where the engine is operating before the level of $O_2$ is evaluated to diagnose the operability of the vehicle air injection system and the integrity of the exhaust system.

Referring now to FIG. 27 the stabilized CO signal from the gate 364 in the Idle mode is compared in subtractor 504 with the predetermined 1% CO limit in element 503. Where the measured value of CO is above the 1% CO limit the subtractor 504 supplies an output signal on lead designated A and where the measured value of CO is below the 1% CO limit the subtractor 504 supplies an output signal on lead marked B.

An output signal on lead marked B from the subtractor 504 (indicating that the engine is operating leaner than stoichiometric) is applied to a gate 505 to enable this gate and transmit the stabilized $O_2$ signal to a subtractor 506 and an $O_2$ storage element 506A. The subtractor 506 compares the $O_2$ signal with a preset percent limit, e.g. 4%, stored in element 507 and provides an output signal on leads A and B when the measured $O_2$ signal is above or below the 4% limit, respectively. A gating circuit 508 when enabled via delay 509 energizes an air injection fail indicating lamp 510 via OR gate 509A when the measured $O_2$ signal is below the 4% limit thereby informing the operator that the air injection system has failed.

In response to an output signal on lead A of the subtractor 506, a gating circuit 508 supplies a signal to the computer to energize the pressurized tail pipe light 300, FIG. 18, because the measured $O_2$ signal is above the 4% limit. In response to the energized tail pipe light the operator proceeds to restrict the outlet area of the tail pipe without removing the analyzer sampling probe and then actuates switch 280, FIG. 17, to inform the computer than the tail pipe has been pressurized. In response to this signal the computer transmits a tail pipe confirmation signal to a delay network 512 which in turn enables a gate 511 after an appropriate time delay to accommodate the gas analyzer sampling response time.

The gate 511 transmits the stabilized $O_2$ signal to a dual subtractor 513. The dual subtractor 513 compares the measured $O_2$ signal with the $O_2$ signal stored in element 507 plus and minus an appropriate percentage, e.g. ½% to determine if the $O_2$ signal has changed since tail pipe pressurization. The $O_2$ signal stored in element 507 is multiplied by the preset percentage change limit, e.g. ½%, stored in element 514 via divider 515. The preset percentage of the $O_2$ stored signal, e.g. ½%, is added to the $O_2$ stored signal in adder 516 and subtracted from the $O_2$ signal in magnitude subtractor 517. Thus, the inputs to the dual subtractor from the components 516 and 517 represent the stored $O_2$ signal plus and minus ½%.

The dual subtractor 513 provides an output signal on lead P when the measured value of $O_2$ with tail pipe pressurized has not exceeded the original value of $O_2$ by ½%. The subtractor 513 provides an output signal on lead F when the $O_2$ signal with the tail pipe pressurized has changed by more than ½%. A gating circuit 518 when enabled via delay network 519 samples the output signals from the dual subtractor 513 and energizes an air injection system pass lamp 524 via OR gate 519A in response to an output signal on lead P from the dual subtractor 513.

The gating circuit 518 enables a gate 520 in response to an output signal on lead F from the subtractor 513 indicating that the $O_2$ signal has changed by more than the preset amount of ½%. The gate 520 when enabled transfers the measured $O_2$ signal to a subtractor 521 which compares the measured $O_2$ signal (tail pipe pressurized) with the $O_2$ 4% limit signal in storage element 507. The subtractor 521 provides an output signal on lead P or lead F when the measured value of $O_2$ (tail pipe pressurized) is below or exceeds the 4% limit, respectively. A gating circuit 522 when enabled via delay 523 samples the output leads from the subtractor 521 and energizes the air injection pass indicating lamp 524 via OR gate 519A and the exhaust system fail indicating lamp 497 via OR gate 525 in response to an output signal on lead P from the subtractor 521. The gating circuit 522 in response to an output signal on lead F from the subtractor 521 energizes the exhaust fail indicating lamp 497 through OR gate 525 and the air injection fail indicating lamp 510 via OR gate 509A.

When the engine is operating richer than stoichiometric (CO signal greater than 1%) in element 503 the circuit of FIG. 27A is employed to evaluate the vehicle air injection and exhaust system. The circuit components of FIG. 27A are identical to the circuit components of FIG. 27 (with the exception of the % $O_2$ limit in element 507) and are, therefore, given the same reference numerals primed. An output signal on lead A from subtractor 504 of FIG. 27 indicating that the engine is operating richer than stoichiometric is applied to gate 505 primed to enable the same and render the circuit of FIG. 27A operative. The operation of the circuit of 27A is identical to the operation of the circuit of FIG. 27 just described with the exception that the percentage $O_2$ limits stored in element 507 primed is lower, e.g. 3%.

Where the measured $O_2$ signal falls below the 3% limit the air injection fail indicating lamp 510 is energized. Where the measured $O_2$ signal exceeds the 3% limit the computer instructs the operator to pressurize the tail pipe as discussed above. The measured $O_2$ signal with the tail pipe pressurized is compared with the stored $O_2$ signal (tail pipe unpressurized) to determine whether or not the $O_2$ value has changed within preset limit, e.g. ½%. If the $O_2$ signal has not changed beyond these limits, lamps 524 and 496 are energized indicating that the air pump is operative and that the exhaust system is not leaking. Where the measured $O_2$ signal with the tail pipe pressurized has decreased below the preset ½% limit but still remains above the 3% limit (storage element 507') lamps 524 and 497 are illuminated indicating that the air pump is operative but that the exhaust system is leaking. Where the measured $O_2$ signal has decreased beyond the preset limit and is below the 3% limit lamps 497 and 510 are illuminated indicating that the air injection system is not operative and that the exhaust system is leaking.

When the computer energizes the exhaust system leak lamp 497 it also energizes the retest/exhaust lamp 302, FIG. 18, to instruct the operator to retest the CO, HC and $NO_x$ values at Idle with the tail pipe pressurized modestly. The operator then actuates the retest proceed switch 282, FIG. 17, and the measured values of CO, HC and $NO_x$ compared with the acceptable values via the circuit of FIG. 21.

The circuit of FIGS. 27 and 27A may also be used to test for exhaust system leaks in non-air injected vehicles with an appropriate selection of $O_2$ limits.

TEST FOR VEHICLES EQUIPPED WITH CATALYTIC CONVERTERS

When a vehicle is equipped with a catalytic converter, the selector switch 258 of FIG. 17 is rotated to the HC/CO position. The $NO_x$/HC/CO switch position is provided should future vehicles be also equipped with $NO_x$ reducing catalysts.

The purpose of catalytic converters is to reduce the exhaust emissions from the engine per se before they reach the tail pipe outlet. Sampling and analyzing the exhaust gas at the tail pipe is valid to ascertain the level of emissions being expelled therefrom while the engine is idling and in the power modems such as low cruise, high cruise and optionally full throttle. These values are routinely obtained during the basic modal test by the circuit of FIG. 21 and serve to pronounce the vehicle as an acceptable or unacceptable emitter at time of test. However, since an active catalyst reduces the content of CO and HC leaving the engine per se the values of these gases downstream of the catalyst (from the tail pipe) may not relate to the CO and HC emissions from the engine. Therefore, the significant contribution to engine diagnosis offered by the modal emission signatures from the engine per se is clouded or obscured by an active catalyst. The significance of this circumstance is:

1. A vehicle which passes an emission test sampled at the tail pipe, may have misadjustments and/or malfunctions, which (a) increase its fuel consumption, and/or (b) overload the now active catalyst with abnormally high emissions thereby reducing the ongoing life of the catalyst with attendant unsatisfactory emissions to the atmosphere in an inordinately short period of road operation.

2. A vehicle which fails an emission test sampled at the tail pipe, may do so because of either catalyst or engine malfunction or both. Lack of positive diagnosis of the cause or causes can result in (a) replacement of catalysts which if associated with an over-emitting engine will reduce the life of the replacement catalyst even though an emission retest to confirm repair finds the tail pipe emissions as acceptable; (b) lack of knowledge as to the cause of engine malfunction may result in over or under repair thereof and in either case would not be cost-effective.

To address these problems one vehicle manufacturer, has provided a port between the engine and the catalytic system to permit sampling of emissions from the engine as well as from the tail pipe. This port will be referenced as the Engine Exhaust Sampling Port hereinafter.

TESTS FOR VEHICLES EQUIPPED WITH CATALYSTS AND ENGINE EXHAUST SAMPLING PORTS

Preferably the CO and HC evaluation tests are performed while sampling exhaust gas both from the tail pipe and from the engine exhaust sampling port instead of from the tail pipe only.

Because of the relatively few catalytic equipped vehicles now fitted with engine exhaust sampling ports, the apparatus of the present invention requires that the exhaust sampling from the two locations be obtained by repeating the basic modal test (high cruise, low cruise, idle) using the same gas analyzer train and comparing the two sets of data to determine the effectiveness of the catalyst. A first modal test is performed while sampling either from the tail pipe or the engine exhaust sampling port and a second modal test while sampling from the point not used in the first modal test. While sampling from the engine exhaust port the acceptable limits for all gases are those applicable to an engine without catalyst and therefore the vintage selector switch 250 of FIG. 17 should be positioned accordingly, for example, 1973 – 1974 model years. (Note Table E, supra.)

The pass/fail gas signals derived while sampling from the tail pipe are used to pronounce the vehicle as having acceptable or unacceptable emissions. The pass/fail gas signals derived while sampling from the engine exhaust port will provide information as to the state of the engine and the nature of malfunctions just as in non-catalytic equipped vehicles previously described. The difference between the HC/CO levels between the first and second test determine the effectiveness of the HC/CO catalyst. Likewise, should vehicles of the future be equipped with catalysts to reduce $NO_x$, the difference in $NO_x$ levels between the first and second tests determine the effectiveness of the $NO_x$ catalyst.

TEST FOR CATALYTIC EQUIPPED VEHICLES AND NO ENGINE EXHAUST SAMPLING PORT

The selector switch 258 of FIG. 17 is to be in the HC/CO position. Although the disadvantages of not being able to obtain engine modal emission signatures, as previously described, are not resolved, the gross operability of the HC/CO portion of the converter may be tested in accordance with the circuit of FIG. 28. To test the operability of the HC/CO portion of the catalytic converter, the operator, after completion of the modal tests, shorts out one of the firing cylinders of the engine and actuates shorted cylinder switch 283 (FIG. 17). The vehicle is then operated in at least one of the prescribed power modes (i.e., high cruise or low cruise) and optionally in all modes. The HC signal without deliberate shorting during the particular mode undergoing test (e.g., high cruise) has been previously stored in storage element 530. The stored value of the HC signal is multiplied in divider 531 with a preset HC percentage limit from storage element 532, e.g. 150%.

The stabilized HC signal from gate 365 is compared with the output of divider 531 in a subtractor 533. If the measured value of HC with one cylinder shorted is less than the output of divider 531 indicating that the HC has increased by not more than the preset percentage over the HC value previously stored, the subtractor will provide an output signal on line P. If the HC value with one cylinder shorted exceeds the value of the output of the divider 531, the subtractor provides an output signal on line F indicating that the catalytic converter is ineffective. A gating circuit 534 when enabled via a delay network 535 in resonse to an output signal on line P or F from the subtractor 533 energizes a pass indicating lamp 580 or a fail indicating lamp 581, respectively.

Upon completion of the tests dictated by the position of the controls of FIG. 17, the computer will advise the operator that the programmed test, decisions and data acquisition are complete by illuminating the Tests Complete Lamp, 303 of FIG. 18. The signal to Lamp 303 will permit the computer to act upon a signal caused by the actuation of switch 318 of FIG. 19 by the operator to raise the lift. Thus, not until the computer has advised that the whole program is complete will it apply a raise lift command signal on line 156. This prevents the operator from removing the vehicle from the dynamometer until the test program has been completed. With the dynamometer assembly is a mechanical means for raising the lift by supervisory personnel only, thereby permitting removal of a vehicle before its test program is complete should it become necessary.

DECISION DISPLAY PANEL

Referring now to FIG. 29 there is illustrated a decision display panel for the control system in which the test modes (i.e. high cruise, low cruise, etc.) are arranged in columns and the measured gases are arranged in rows. The $NO_x$ control operability test and exhaust system test are not related to all test modes as was discussed previously. The lamps for indicating that the measured values of CO are acceptable or unacceptable are designated 540 through 547 as illustrated. Indicating lamps 550 through 557 are provided for informing the operator of whether or not the measured values of HC are acceptable, as shown. Indicating lamps 560 through 567 and 570 through 577 are provided to inform the operator of the pass or fail indication for $NO_x$ and $O_2$, respectively. The operability of the catalytic converter HC/CO are indicated by pass-/fail lamps 580 through 587. The operability of the TSAD $NO_x$ control is shown by lamps 418 and 420 as was discussed previously in reference to FIG. 22. The operability of the SAD $NO_x$ controls is indicated by lamps 436 and 438, see FIG. 23. The operability of SSAD $NO_x$ controls is indicated by the lamps 480 and 470, see FIG. 25. The operability of $NO_x$ controls with EGR equipped vehicles is indicated by lamps 450 and 451, see FIG. 24. The operability of the air injection system for vehicles so equipped is indicated by lamps 524 and 510, see FIG. 27. Exhaust system leaks is indicated by lamps 496 and 497, see FIG. 26.

TRUTH CHART MATRIX FOR PROVIDING AUTOMATIC READOUT OF ENGINE MALFUNCTION AND SUGGESTED REPAIR GUIDELINES

Referring now to FIG. 30 there is illustrated a truth chart matrix shown as element 200 of FIG. 14 for providing a diagnosis of engine malfunction, etc., by reading out the CO and HC fail signals which have been recorded during the high cruise, low cruise and idle tests. A high level output from the storage elements represents a fail signal and a low level output represents a pass signal. On the basis of the particular failure pattern the circuit of FIG. 30 selects the appropriate report form or forms which are then identified or printed by the computer to enable the motorist to have the vehicle repaired or adjusted with minimum expense.

The CO and HC fail signals are recorded by the computer in storage elements 600, 601 602, 603, 604 and 605 for the high cruise, low cruise and idle modes, as shown. An AND gate 620 actuates selector 611 in response to a CO fail signal in the idle mode and a CO pass signal in the high cruise mode via inverter 626, to identify or print out report form no. 1. An OR gate 621 and an AND gate 621A actuates a selector 612 to identify or print out report form no. 2. in response to a CO fail signal in the high or low cruise modes and a CO pass signal in the idle mode via inverter 628. An AND gate 622 actuates a selector 613 to print out report form no. 3 in response to a CO fail signal in both the high cruise and idle modes. An AND gate 623 actuates a selector 614 to print out report form no. 4 in response to a HC fail signal in the idle mode and a CO pass signal in the high cruise mode via inverter 627. An OR gate 624 and an AND gate 624A actuates a selector 615 to print out report form no. 5 in response to a HC fail signal in the high or low cruise modes and a HC pass signal in the idle mode via inverter 629. An AND gate 625 actuates selector 616 to print out report form no. 6 in response to a HC fail signal in both the high cruise and idle modes.

The report form numbers 1 through 6 are set forth below.

| REPORT FORM NO. 1 | | | |
|---|---|---|---|
| | IDLE | LOW CRUISE | HIGH CRUISE |
| CO | FAIL | PASS/FAIL | PASS |
| HC | | | |

USUAL CAUSE

1. Gross error in carburetor idle air fuel mixture adjustment.
2. Rarely high idle CO carries over into Low Cruise, as shown in the second example.

SERVICE STEPS

1. Inspect the PCV system to insure it is clean and operating correctly. A PCV system malfunction can cause erratic idle operation.
2. Make basic engine idle adjustments of ignition dwell and timing, idle speed and air fuel ratio.

CAUTION: After making the basic idle adjustment, accelerate the engine at least three times and let it return to idle. Observe the stability and repeatability of idle condition.

3. In rare cases that idle adjustments cannot be made correctly, due to excessive amounts of varnish or foreign deposits in the carburetor idle passages, it may be necessary to replace or repair the carburetor.

| REPORT FORM NO. 2 | | | |
|---|---|---|---|
| | IDLE | LOW CRUISE | HIGH CRUISE |
| CO | PASS | FAIL and/or | FAIL |
| HC | | | |

USUAL CAUSE

The most common cause is a main system carburetor malfunction. This problem cannot be corrected by an Idle adjustment only.

SERVICE STEPS

1. Check carburetor air cleaner for abnormal restriction.
2. Check to see that choke is not stuck partially closed.
3. If the air cleaner and choke are satisfactory, remove the carburetor and replace or repair according to factory specifications.
4. Always make the basic idle adjustments of ignition dwell and timing, idle speed and air fuel ratio to complete repair.

NOTE: If carburetor rebuild is undertaken, the following items must be checked:
1. Check for faulty power enrichening valve.
2. Check to be sure that all vacuum passages controlling the power enrichening valve are open and unobstructed.
3. Observe for loose main jet(s) and/or power enrichening valve.
4. Check for pitted or cracked main jet seat or seat gasket.
5. Check for worn jets and/or metering rods. A slight amount of wear can cause a grossly higher CO reading.
6. Examine the float for abnormal damage or leaks.
7. Check for a damaged or loose float valve.
8. Check the venturi cluster and cluster gasket for damage or cracks.
9. Thoroughly inspect the entire body of the carburetor for cracks and to see that all lead plugs are securely in place.

| REPORT FORM NO. 3 | | | |
|---|---|---|---|
| | IDLE | LOW CRUISE | HIGH CRUISE |
| CO | FAIL | PASS or FAIL | FAIL |
| HC | | | |

USUAL CAUSE

A combination of a malfunctioning carburetor main system and a maladjusted idle air fuel ratio.

SERVICE STEPS

1. Refer to Chart No. 2. The main system malfunction should obviously be corrected first.
2. Idle CO will be corrected when basic adjustments are made.
3. Always make the basic idle adjustments of ignition dwell and timing, idle speed and air fuel ratio to complete repair.

| REPORT FORM NO. 4 | | | |
|---|---|---|---|
| | IDLE | LOW CRUISE | HIGH CRUISE |
| CO | | | |
| HC | FAIL | PASS or FAIL | PASS |

USUAL CAUSES

1. Vacuum leaks into the intake manifold causing a lean mixture and subsequent misfire in some cylinders.
2. Idle circuits on 2 and 4 barrel carburetors highly imbalanced or adjusted too lean.
3. Intermittent ignition misfire is possible but not probable.
4. Grossly advanced basic ignition timing.
5. Modest compression leak through one or more exhaust valves.
6. Excessively high CO at idle can caust moderately high HC at idle (adjust idle CO first, then determine whether further repair is necessary).

SERVICE STEPS

1. Note idle CO on Report Card and determine that idle is not adjusted too lean (less than 1.0% CO).
2. Ignition misfire at idle and not in the power modes is uncommon; however, simplicity of oscilloscope check-out suggests this be observed next.
3. Determine that basic ignition timing is not grossly advanced.
4. Check for balanced idle adjustments if 2 or 4 barrel carburetor.
5. Check for vacuum leaks into the intake manifold.
6. If above steps do not locate the source of trouble, make a cylinder compression check. Burned exhaust valves can cause up to four times normal HC at Idle, with little increase in the Cruise modes.
7. Always make the basic idle adjustments of ignition dwell and timing, idle speed and air fuel ratio to complete repair.

| REPORT FORM NO. 5 | | | |
|---|---|---|---|
| | IDLE | LOW CRUISE | HIGH CRUISE |
| CO | | | |
| HC | PASS | FAIL | and/or FAIL |

USUAL CAUSES

Ignition misfire under higher compression pressures of power operation, due to a failure of an ignition system component.

SERVICE STEPS

1. Probably the most common problem is a faulty park plug; however, this should not be a conclusion without proper examination. 2. Check out the ignition system with a scope and associated instruments. If the scope does not clearly show a faulty spark plug, observe for the following:
   a. Faulty ignition cables.
   b. Point arcing.

c. Cross fire, due to cracked or carbon tracked cap or rotor.

d. If above steps do not locate the source of trouble, the problem can be traced to one of the following areas and should be determined by proper diagnosis, not be repairing and replacing items until the problem has been found. They are listed below with the most commonly occurring problems at the top, and the least common toward the bottom.
 1. Spark plugs.
 2. Spark plug cables and coil cable resistance.
 3. Excessive point resistance or arcing.
 4. Distributor cap and rotor cracks and carbon tracks.
 5. Moisture inside the distributor cap or on the cables.
 6. Extremely incorrect dwell angle or point gap.
 7. Low coil output voltage.
 8. Low primary voltage supplied to the coil.
 9. Loose wire connections such as distributor plate ground or coil to point wire connections.

3. Always make the basic idle adjustments of ignition dwell and timing, idle speed and air fuel ratio to complete repair.

| REPORT FORM NO. 6 | | | |
|---|---|---|---|
| | IDLE | LOW CRUISE | HIGH CRUISE |
| CO HC | FAIL | PASS or FAIL | FAIL |

USUAL CAUSES

The most probable cause is ignition misfire as described on Chart No. 5.

SERVICE STEPS

1. Refer to Chart No. 5 and repair accordingly.
2. In RARE cases, it may be necessary to refer also to CHART No. 4 when repair, as prescribed by Chart No. 5, does not bring Idle Hydrocarbons within a reasonable limit.
3. Always make the basic idle adjustments of ignition dwell and timing, idle speed and air fuel ratio to complete repair.

The above report forms are based on data derived from many vehicles which have failed the CO and HC test during the various test modes and have then been analyzed to determine where the malfunctions existed and the best procedure to make the necessary repairs and/or adjustments. Additional report forms may be employed to provide diagnostic and repair guidelines for excessive $NO_x$ and $O_2$ as more data becomes available.

DESCRIPTION OF A GAS STABILIZER FOR USE IN THE CIRCUIT OF FIG. 21

Referring now to FIGS. 31 and 32, one type of gas stabilizer circuit for use in FIG. 21 is illustrated. This circuit is of the analog type and includes a pair of operational amplifiers 632 and 634. An analog voltage representing the measured speed is applied to one input of each amplifier 632 and 634. Analog voltages representing the upper and lower speed limits are applied to the other inputs of the amplifiers 632 and 634 as shown. Each amplifier provides a low level output signal when the measured speed signal falls between the upper and lower speed limit signals and one of the amplifiers provides a high level output signal when the measured speed signal is above or below the limits. The outputs of the amplifiers 632 and 634 are applied through a NOR gate 635 to a timing circuit including an operational amplifier 636, a capacitor 637, a pair of resistors and a diode as shown. When each input signal to the NOR gate 635 is low, the gate provides a high level output which starts charging the capacitor 637. One input to the amplifier 636 is coupled to the capacitor 637 and the other input 638 is connected to a suitable reference voltage.

The amplifier 636 provides a low level output signal until the input signal supplied by the capacitor 637 is equal to the reference voltage and at that time the output of the amplifier goes to a high level. The time delay between a high level signal appearing at the output of the NOR gate 635 and a high level signal appearing at the output of the amplifier 636 is determined by the magnitude of the reference voltage supplied to terminal 638. The time delay is thus adjustable and may be conveniently set for an appropriate time period (e.g. two seconds) to insure that the vehicle speed has stabilized. The high level output of the amplifier 636 is referred to as the speed enabling signal and is applied by an inverter 639 to one input 640 of a flip-flop 641.

The gas stabilizer circuit for CO which includes the remaining components in FIG. 31 will now be described. This circuit transfers the measured CO signal to a comparator circuit which compares the measured CO signal with its acceptable limit when one of three following conditions exist:
 1. The measured CO signal has quit changing within specified rate of change limits at least momentarily and a preset time period has elapsed, e.g., 10 seconds.
 2. The measured CO signal has ceased varying within specified rate of change limits for a predetermined time interval, e.g. 3 seconds.
 3. The measured CO signal has decreased below the acceptable limit at a given high rate of change and remained at the given rate of change for a short preset time period, e.g. 500 milliseconds.

The condition no. 1 above covers those cases where the gas signal remains fluctuating and provides a gas signal to the comparator which is averaged over a long time period, e.g. 10 seconds, to insure that an average value will be used in the comparison. The condition no. 2 above covers those cases where the gas signal remains stable within narrow rate of change limits which permits the gas signal to be averaged over a short time period, e.g., 3 seconds. The condition no. 3 covers those cases where the gas signal is decreasing at a rapid rate and falls below the acceptable limit thereby providing confidence that the gas signal will remain below the limit.

The purpose of the three conditions is to reduce the total test time period to a minimum, yet provide data valid for the purpose intended. When, for example, in-use vehicles are to be merely passed or failed, the three conditions would be used. However, where measured gas values are to be accumulated for statistical evaluation of emission control strategies, only condition no. 1 should be used.

To determine whether the gas signal has ceased fluctuating within specified limits, the measured CO signal in analog form is applied through a capacitor 643 to one input of an amplifier 644. The output signal from the amplifier 644 is an analog signal which represents the rate of change of the measured CO signal. The rate of change or differentiated CO signal from the amplifier 644 is applied to one input of a pair of operational amplifiers 647 and 648 as illustrated. An upper rate of change reference voltage is applied to the other input of amplifier 647 and a lower rate of change reference voltage is applied to the other input of amplifier 648. The amplifier 647 provides a low level output signal when the reference voltage is more positive than the differentiated CO signal. Amplifier 648 provides a low level output signal when the reference voltage applied thereto is more negative than the differentiated CO signal.

The low level speed enabling signal from inverter 639 is applied to one input of a NOR gate 650. The amplifiers 647 and 648 also apply low level signals to the NOR gate 650 when the differentiated CO signal remains between the upper and lower rate of change limits. The three low level inputs to NOR gate 650 provides a high level output signal to the other input terminal 651 of the flip-flop 641. This high level signal on terminal 651 triggers the flip-flop 641 which produces a high level signal at its output terminal 652.

The high level output signal from the flip-flop 641 is applied to a first gas timing circuit including an operational amplifier 654 and a capacitor 655 and the resistors and diode as illustrated. A reference voltage is applied to terminal 656 of the amplifier 654 and the magnitude of this reference determines the time delay between a high level output appearing at the output terminal 652 and at the output terminal 657 of the amplifier 654. This time delay for example may be 10 seconds. A high level output signal from the amplifier 654 closes a FET switch 658. The switch 658 when closed connects the measured CO signal on lead 230 and a signal averaging circuit 659 in series with one input of an operational amplifier 660. The other input of the operational amplifier 660 is connected to an analog signal representing the acceptable value of CO for the particular test mode. The amplifier 660 provides a high level output signal on output lead 661 when the averaged CO signal is below the acceptable limit and produces a low output signal on output lead 661 when the averaged value of CO exceeds acceptable limit. The output signal from the amplifier 660 is applied through a gating circuit 662 to pass and fail indicating lamps marked P and F discussed previously, which inform the operator whether or not the measured CO signal has remained below or exceeded the acceptable CO limit.

The timing circuit including amplifier 654 thus connects the measured CO signal through the averaging circuit 659 to the comparator a given time interval after the measured CO signal has ceased fluctuating at least momentarily within a rate of change determined by the upper and lower rate of change limit signals applied to the amplifiers 647 and 648. If the measured CO signal falls within the upper and lower rate of change limits momentarily and then exceeds either of such limits the output of the NOR gate 650 will go low. This low level signal will not change the state of the flip-flop 641 thus permitting the switch 658 to close after the time delay (e.g. 10 seconds) determined by the magnitude of the reference voltage at terminal 656.

The circuit for providing a stabilized gas signal under the condition no. 2 will now be explained. A high level signal at terminal 651 resulting from the measured CO signal falling within the rate of change limits starts charging a capacitor 671 which forms a second gas timing circuit with amplifier 670. The time delay of the second gas timing circuit (e.g., 3 seconds) is determined by the magnitude of the reference voltage applied to terminal 672. If the output of the NOR gate 650 remains high for the time required to charge up the capacitor 671 to the reference voltage at terminal 672 then the amplifier 670 will provide a high level output and close an FET switch 675. The closure of switch 675 connects the measured CO signal and a second signal averaging circuit 676 in series with one input of the amplifier 660 as shown. Thus if the measured CO signal remains within the upper and lower rate of change limit signals for the time required by the second gas timing circuit (e.g. 3 seconds) then the CO signal will assume to be stabilized and at that time will be compared with the CO acceptable limit. If the measured CO signal exceeds and then subsequently falls within the rate of change limits during the time delay of the second gas timing circuit then this circuit will be reset.

The circuit for providing the stabilized gas signal in accordance with condition no. 3 will now be described. This circuit includes an operational amplifier 680 which receives as on input the differentiated CO signal and compares this differentiated signal with a reference voltage applied to input terminal 681. The amplitude of the voltage applied to input terminal 681 determines the magnitude of the rate of change of the CO signal required to produce a high level output signal from an operational amplifier 684. The operational amplifier 684 compares the measured CO signal with the CO acceptable limit and produces a high level output signal when the measured CO signal has fallen below the CO acceptable limit signal. Thus the AND gate 682 produces a high level signal at its output when three conditions are met—(a) the measured value of CO has fallen below the acceptable CO limit, (b) the measured speed has remained within the upper and lower speed limit values, and (c) the measured value of CO is decreasing at a rapid rate as determined by the value of the reference voltage applied to terminal 681.

The output of the AND gate 682 is applied to a third gas timing circuit which includes an amplifier 690 and a capacitor 691. The amplitude of the reference voltage applied to terminal 692 of the amplifier 690 determines the time delay between the occurrence of a high level output signal from the AND gate 682 and a high level output signal at the output of the amplifier 690. This time delay may be for example ½ to 1 second. The high level output signal from amplifier 690 closes a third FET switch 695 which connects the measured CO signal to one input of the amplifier 660 to provide a comparison between the measured CO and acceptable CO limit signals.

It should be noted that one or more of the gas timing circuits may be used as desired. Where the actual values of the gas are to be recorded the third gas timing circuit preferably is not used.

The output signal from the amplifier 660 is applied to a gating circuit 662 for providing energization of the pass or fail indicating lamps. The gating circuit 662 is enabled a very short time interval after the stabilized gas signal has been applied to the comparative amplifier 660 to insure that the amplifier has made the comparison.

The gating circuit 662 receives an enabling signal on lead 663 from an amplifier 700 which amplifier forms a portion of a timing circuit with capacitor 702. The magnitude of a reference voltage applied to terminal 703 determines the time delay of the timing circuit as discussed previously.

An AND gate 704 produces a high level output signal to initiate the time delay for the circuit including amplifier 700 in response to the speed enabling signal (high level output from amplifier 636) and a high level output signal from any one of the amplifiers 654, 670 and 690 through an OR gate 705. Thus the gating circuit 662 is enabled a short time interval after the speed enabling has been generated and the measured CO signal stabilized as discussed previously.

The circuit of FIG. 32 operates in the same manner as the circuit just described for providing a stabilized HC signal and the corresponding components are given the same reference numerals primed. The only difference between the two circuits is the fact that AND gate 704' includes a third input which is taken from the output of amplifier 700 (FIG. 31) on lead 663. Thus the gating circuit 662 will not be enabled in the circuit of FIG. 32 until both the measured CO and measured HC signals have stabilized. The circuit of FIG. 32 may also be used to provide stabilized $NO_x$ and $O_2$ signals.

The operation of the gas stabilizer circuit of FIG. 31 is illustrated in the graph of FIG. 33. In this graph the ordinate represents the amplitude of the measured gas signal and the abscissa represents time. The curve 710 represents the gas signal which is being measured. The line 712 represents the acceptable limit for such gas signal and the lines 714 and 716 represent the upper and lower rate of change reference limits as applied to amplifiers 647 and 648. The angle between these lines is designated $\theta$. The line 714 represents the minimum rate of change reference for the high speed measurement (condition no. 3) as determined by the magnitude of the reference voltage applied to terminal 681. The angle between lines 714 and the vertical line 718 is designated $\phi$.

The measured gas signal is considered stabilized for purposes of comparing it with the acceptable limit where (a) the gas signal is decreasing at a rate within the angle $\phi$, decreases below the acceptable gas limit line 712 and continues to decrease at the acceptable rate of change for the time determined by third gas timing circuit (condition no. 3), or (b) the gas signal is not decreasing at a rate determined by the angle $\phi$ but falls within the angle $\theta$ for the time determined by the second timing circuit (condition no. 2), or (c) the gas signal momentarily falls within the angle $\theta$ and the first timing circuit runs out, e.g. 10 seconds, (condition no. 1). The signal averaging circuits 656 and 676 are provided with different time constants (e.g. 10 seconds and 3 seconds respectively) to insure that the measured signal is a time weighted average of the actual signal. If desired, the analog signals from the switches 658, 675 and 695 of FIG. 31 may be converted to digital signals by means of suitable analog-to-digital converters and applied to subtractors 380, etc. of FIG. 21 to provide a digital comparison of the measured gas values with the acceptable values as discussed previously.

There has thus been described an apparatus for providing a manual or automatic evaluation of the exhaust gas emissions of vehicles at prescribed test modes of operation designed to detect engine and/or emission control malfunctions. The several digital subtractors, dual subtractors, gating circuits, etc., which are disclosed in FIGS. 21–28 may be of the type disclosed in schematic form in the copending application, Ser. No. 382,538, supra.

It will be understood that the order of testing with the prescribed modes can be varied, but that the best results can be obtained by testing according to the order of high cruise, low cruise and then idle. Modes may be added, or the number reduced, to appropriately fit the intent of the test and changes in engine and emission control systems design and/or changes in the official test procedure.

Various modifications of the circuitry will be apparent to those skilled in the art without departing from the scope of the invention.

What is claimed is:

1. The method of evaluating engine gas emissions to determine therefrom whether they exceed prescribed permissible air pollution values for CO and HC for different prescribed test modes and whether there is a need for adjustment and/or repair of the engine to reduce air pollution, comprising: withdrawing a sample of exhaust gas from the exhaust gas system of the engine; operating the engine according to a first test mode at a first predetermined high cruise speed of about 1700 to 2200 r.p.m. and under a first predetermined load of about 35 to 60% of the engine's maximum torque capability and at which an emission-related malfunction of the engine is likely to occur; measuring the value of CO and HC in the gas sample at said first predetermined speed and load; operating the engine according to a second test mode at a second predetermined but different low cruise speed of about 1250 to 1500 r.p.m. and under a second predetermined but different load of about 3.5 to 12% of the engine's maximum torque capability and at which an emission-related malfunction of the engine is likely to occur; measuring the value of the CO and HC in the gas sample at said different speed and load; operating the engine according to a third test mode at idle speed, and measuring the value of the CO and HC in the gas sample at said idle speed; and comparing said measured values of CO and HC with the prescribed permissible values of CO and HC for said first, second and third test modes, respectively, to determine which, if any, test values are excessive and thereby indicate the occurrence of a malfunction during a particular mode of engine operation.

2. The method of evaluating the exhaust gas emissions of an engine in an automotive vehicle to ascertain whether there is need for adjustment and/or repair to reduce air pollution, comprising: withdrawing a sample of exhaust gas from the exhaust system of the vehicle; operating the engine at test KEY MODES corresponding to high cruise, low cruise, and idle, respectively, and in that order; measuring the value of CO and HC in the exhaust gas sample during each of said test modes; printing the measured value of the CO and HC for high cruise, low cruise and idle, respectively, in red on a report card having preprinted thereon permissible air pollution values for the high cruise, low cruise and idle test modes of operation, respectively, if the measured value exceeds the corresponding permissible air pollution values of CO and HC preprinted on the report card; and comparing said measured values of CO and HC with the corresponding prescribed permissible air pollution values for the respective test modes to determine the occurrence of an emission-related malfunction in engine operation at one or more of said test modes, if any.

3. The method of evaluating the exhaust gas emissions of an engine in an automotive vehicle to ascertain whether there is need for adjustment and/or repair to reduce air pollution, comprising: withdrawing a sample of exhaust gas from the exhaust system of the vehicle; operating the engine at test KEY MODES corresponding to high cruise, low cruise, and idle, respectively, and in that order; measuring the value of CO and HC in the exhaust gas sample during each of said test modes; printing the measured value of the CO and HC for high cruise, low cruise and idle test modes of operation, respectively, on a report card having preprinted thereon permissible air pollution values for high cruise, low cruise and idle test modes of operation, respectively, on said report card, but delaying printing of the measured values of CO and HC on the report card for a prescribed period of time after the start of exhaust gas sampling to enable the values to stabilize before the respective values are printed on the report card; and comparing said measured values of CO and HC with the corresponding prescribed permissible air pollution values for the respective test modes to determine the occurrence of an emission-related malfunction in engine operation at one or more of said test modes, if any.

4. The method as defined in claim 3, including recording the measured values of CO and HC on a report card having preprinted thereon permissible values for CO and HC at test modes of high cruise, low cruise and idle, respectively, for a given weight class vehicle corresponding to the vehicle being tested to facilitate said comparison.

5. The method as defined in claim 3, wherein the vehicle is equipped with speed sensitive emission control means, and including measuring the values of the particular gas in the gas sample to be controlled by said emission control means, at speeds falling on either side of the speed range wherein the speed sensitive emission control means is actuated.

6. The method defined in claim 3, wherein the vehicle includes a top gear and a lower gear, and emission control means, including measuring the values of the particular gas in the exhaust gas sample to be controlled by said emission control means both when the vehicle is in top gear and in a reduced gear where said emission control means are actuated.

7. The method as defined in claim 3, including a fourth KEY MODE test for evaluating the engine by operating the engine at full throttle opening of the engine carburetor and measuring and recording the values of CO and HC in the exhaust gas sample while operating at said full throttle opening.

8. The method of quickly testing an internal combustion engine mounted in an automotive vehicle to ascertain whether there is a need for adjustment or repair to reduce air pollution, comprising: positioning the vehicle on a chassis dynamometer with its driven wheels engaged with the rolls of the dynamometer, and wherein one of said rolls is connected with a power absorption unit that automatically applies load on the engine that varies substantially in accordance with changes in the cube of the speed of said one roll, comprising: withdrawing a sample of exhaust gas from the exhaust system of the vehicle; operating the engine for a short time interval according to a first KEY MODE wherein a first predetermined load corresponding to a given weight class vehicle is applied to the engine while operating at a first predetermined speed and at which first load and speed, emission-related engine malfunctions are likely to occur; measuring the value of the CO and HC content of the exhaust gas sample while the engine is operating at said first predetermined load and speed; operating the engine for another short time interval according to a second KEY MODE wherein a second but different predetermined load corresponding to said given weight class vehicle is applied to the engine while operating at a second but different speed and at which second load and speed emission-related engine malfunctions are likely to occur; measuring the value of the CO and HC content of the exhaust gas sample while the engine is operating at said second predetermined load and speed; operating the engine for still another short time interval according to a third KEY MODE wherein the engine is operated at its normal idle speed; measuring the value of the CO and HC content of the exhaust gas sample at said idle speed; and comparing said measured values of CO and HC content at said three KEY MODES with prescribed permissible air pollution values for said respective modes to determine whether the measured values exceed said permissible values in any of said test modes and thus reveal malfunctions in the operation of the engine, if any.

9. The method as defined in claim 8, wherein the vehicle being tested has a weight of about 3800 pounds, or above, and including operating the engine at a high cruise speed of about 48 to 50 mph while imposing a load of approximately 27 to 30 hp.

10. The method as defined in claim 8, wherein the vehicle being tested has a weight of about 3800 pounds, or above, and including operating the engine at a low cruise speed of about 32 to 35 mph while imposing a load of approximately 10 to 12 hp.

11. The method as defined in claim 8, wherein the vehicle being tested has a weight of about 2800 to 3750 pounds and including operating the engine at a high cruise speed of about 44 to 46 mph while imposing a load of about 21 to 24 hp.

12. The method as defined in claim 8, wherein the vehicle being tested weighs about 2800 to 3750 pounds and including operating the engine at a low cruise speed of about 29 to 32 mph while imposing a load of about 8 to 10 hp.

13. The method as defined in claim 8, wherein the vehicle being tested has a weight of about 1800 to 2750 pounds and including operating the engine at a high cruise speed of about 36 to 38 mph while imposing a load of about 13 to 15 hp.

14. The method as defined in claim 8, wherein the vehicle being tested weighs about 1800 to 2750 pounds and including operating the engine at a low cruise speed of about 22 to 25 mph while imposing a load of about 4 to 6 hp.

15. The method as defined in claim 8, including a fourth KEY MODE test for evaluating the engine by operating the engine for a short time interval at full throttle, measuring the value of the CO and HC content of the exhaust gas sample at said full throttle and comparing said measured values of CO and HC content at full throttle with prescribed permissible air pollution values for full throttle operation.

16. In an apparatus for evaluating the exhaust emission of an internal combustion engine to detect emission-related malfunctions, the combination which comprises:

a power absorption unit adapted to be driven by said engine for providing a selectable load to the engine for any given engine speed, an exhaust gas analyzer adapted to be coupled to the engine exhaust for providing a quantative measurement of at least one gas present in the exhaust emissions, load signal generating means for generating a load signal proportional to the load applied to the engine, comparing means coupled to the exhaust gas analyzer and responsive to the load signal for comparing the measured value of said gas with an acceptable value when the engine load falls within a preset range, and output signal generating means coupled to the comparing means for generating an output signal when the measured value of said gas remains below or exceeds said acceptable value.

17. The combination as defined in claim 16 wherein the exhaust gas analyzer is arranged to measure the CO and HC content of the exhaust gas.

18. The combination as defined in claim 16, wherein the comparing means includes means for monitoring engine load and generating a load enabling signal when the engine load remains within a predetermined range for a given time interval.

19. The combination as defined in claim 16 wherein the comparing means is arranged to compare the measured value of said one gas with acceptable values of said gas when the engine load falls within at least two separate ranges.

20. The combination as defined in claim 19 wherein the output signal generating means is arranged to generate a separate fail output signal representing an excess of said one gas for each of the load ranges.

21. The combination as defined in claim 20 including means for storing the fail output signals.

22. The combination as defined in claim 21 including means responsive to each of the stored output signals for providing an indication of engine malfunctions.

23. The combination as defined in claim 22 wherein the means responsive to the stored output signals is arranged to provide a written indication of engine malfunctions.

24. The combination as defined in claim 19 including means for varying the engine load provided by the power absorption unit at each of the load ranges in accordance with one of at least two classifications of engine sizes.

25. The combination as defined in claim 16 wherein the load signal is a speed signal proportional to engine speed and the comparing means is arranged to compare the measured value of said one gas with acceptable values of said gas when the engine speed falls within a high cruise speed range of 1700 to 3200 r.p.m., a low cruise speed range of 60 to 70% of the selected high cruise speed and an idle speed range.

26. The combination as defined in claim 25 wherein the power absorption unit is arranged to provide an engine load of 35 to 75% of the maximum engine torque capability at the high cruise speed range, and an engine load of 30 to 50% of the selected high cruise load at the low cruise speed range.

27. The combination as defined in claim 16 wherein the load signal is a speed signal proportional to engine speed and the comparing means is arranged to compare the measured value of said one gas with acceptable values of said gas when the engine speed falls with a high cruise range of 1700 to 3200 r.p.m. and an idle speed range.

28. The combination as defined in claim 16 wherein the load signal is a speed signal proportional to engine speed and the comparing means is arranged to compare the measured value of said one gas with acceptable values of said gas when the engine speed falls within a low cruise speed range of 1200 to 2200 r.p.m. and an idle speed range.

29. The combination as defined in claim 16 wherein the comparing means is arranged to compare the measured value of said one gas with acceptable values of said gas when the engine load falls within 35 to 75% of the maximum engine torque capability at high cruise range and when the engine load falls within 30 to 50% of the selected high cruise load at a low cruise range.

30. The combination as defined in claim 16 wherein the comparing means is arranged to compare the measured value of said one gas with acceptable values of said gas when the engine load falls within 35 to 75% of the maximum engine torque capability at a high cruise range and when the engine load is at an idle condition.

31. The combination as defined in claim 16 wherein the comparing means is arranged to compare the measured value of said one gas with acceptable values of said gas when the engine load falls within 18 to 40% of the maximum engine torque capability at a low cruise range and when the engine load is in an idle condition.

32. The combination as defined in claim 16 wherein the exhaust analyzer is arranged to measure the $NO_X$ content of the exhaust gas.

33. The combination as defined in claim 16 wherein the exhaust analyzer is arranged to measure the $O_2$ content of the exhaust gas.

34. The combination as defined in claim 16 including:

a load index meter having a measured load and a desired load input terminal, a scale with a central zone, an under zone and on over zone position on each side of the central zone and a movable indicator, the meter being arranged to position the indicator in the under zone, central zone and over zone when the amplitude of the signal applied to the measured load terminal is less than, within a predetermined range of and greater than the amplitude of the signal applied to the desired load terminal, respectively;

means for applying the load signal to the measured load terminal of the meter; and means for applying a signal representative of the desired load for the engine for each test mode to the desired load terminal of the meter.

35. The combination as defined in claim 34 including:

indicating means responsive to the load signal and to desired load signal for informing the operator to hold the engine load steady or to change the engine load.

36. The combination as defined in claim 16 wherein:

the exaust gas analyzer is arranged to provide a measurement of at least two gases and the comparing means is arranged to compare the measured values of said gases with acceptable values of said gases when the engine load falls within a high cruise range, low cruise range and an idle condition; and wherein the output signals generating means is arranged to generate a separate fail output signal representing an excess of each of said gases above the acceptable values for the high cruise, low cruise and idle conditions.

37. The combination as defined in claim 36 including means for storing each of the fail output signals.

38. The combination as defined in claim 37 wherein: the means for providing an indication of engine malfunction includes a matrix means arranged to select at least one of a plurality of predetermined reports in response to the stored fail output signal for each of said gases, each report containing suggested causes and guideline instructions enabling a mechanic to make the appropriate adjustments and/or repair to correct the particular engine malfunctions.

39. The combination as defined in claim 37 wherein said two gases are CO and HC and includes:
matrix means arranged to provide a first report form in response to a fail CO output signal in idle and the absence of a fail CO output signal in high cruise, a second report form in response to a fail CO output signal in high and/or low cruise and the absence of a fail CO output signal in idle, a third report form in response to a fail CO output signal in high cruise and idle, a fourth report form in response to a fail HC output signal in idle and the absence of a fail HC output signal in high cruise, a fifth report form in response to a fail HC output signal in high and/or low cruise and the absence of a fail HC output signal in idle and a sixth report form in response to a fail HC output signal in high cruise and idle.

40. In an apparatus for evaluating the exhaust gas emissions of an internal combustion engine mounted in a vehicle chassis at a plurality of prescribed test modes of engine operation with each test mode representing a different engine load, at which malfunctions are likely to be exposed, the combination which comprises:
a chassis dynamometer having at least one roll to be engaged by the driven wheels of the vehicle, the chassis dynamometer including a power absorption unit connected to the roll to provide a selectable load to the engine,
a load signal generator coupled to the dynamometer for providing a measured load signal proportional to the power absorbed by the absorption unit,
load comparing means coupled to the load signal generator for comparing the measured load signal with load signals corresponding to a pre-established range for each test mode and for generating a load enabling signal when the absorbed power falls within each of said pre-established load ranges,
an exhaust gas analyzer adapted to be coupled to the engine exhaust for providing a quantative measurement of at least two gases present in the exhaust,
first gas emission comparing means coupled to the exhaust gas analyzer and responsive to the load enabling signal for comparing the measured values of one of said gases with acceptable values at each of said test modes,
second gas emission comparing means coupled to the exhaust gas analyzer and responsive to the load enabling signal for comparing the measured values of said other gas with acceptable values at each of said test modes, and
output signal generating means coupled to the first and second gas emission comparing means for providing a separate pass or fail signal for each gas at each of the test modes when the measured value of the gas remains below or exceeds said acceptable values.

41. The combination as defined in claim 40 including engine diagnostic means responsive to the fail signals for providing an indication of malfunctions.

42. The combination as defined in claim 41 wherein the diagnostic means is arranged to provide guideline instructions for enabling a mechanic to correct the particular malfunctions indicated.

43. The combination as defined in claim 40 wherein the load comparing means includes time delay means for generating the load enabling signal only after the load signal has remained within the pre-established load ranges for a selected time interval.

44. The combination as defined in claim 43 including gas signal stabilizing means coupled between the exhaust gas analyzer and the first and second gas emission comparing means for transmitting the measurements of the gases to the respective gas emission comparing means only after the measured value of the respective gas has remained within a preset range for a given time interval.

45. The combination as defined in claim 43 including means for recording the pass or fail gas emission signals.

46. The combination as defined in claim 40 wherein the load comparing means is arranged to generate a load enabling signal for at least three separate ranges of loads corresponding to a high cruise speed and load selected from 1700 to 3200 engine r.p.m., and 35 to 75% of the maximum torque capability of the engine, a low cruise speed and load of at least 40% of the selected high cruise speed and less than 50% of the selected high cruise load and an idle condition.

47. The combination as defined in claim 40 wherein said two gases are CO and HC.

48. The combination as defined in claim 47 wherein the exhaust gas analyzer is arranged to measure the $NO_x$ content in the exhaust gas and further including third gas emission comparing means coupled to the exhaust gas analyzer and responsive to the load enabling signal during at least one test mode for comparing the measured value of $NO_x$ with an acceptable value and means for providing an $NO_x$ pass or fail signal when the measured value of $NO_x$ remains below or exceeds said acceptable value.

49. The combination as defined in claim 40 wherein $NO_x$ is one of said gases.

50. The combination as defined in claim 40 wherein $O_2$ is one of said gases.

51. The combination as defined in claim 40 including means for selectively providing different acceptable values to the gas emission comparing means for the test modes dependent upon the emission level design criteria of the vehicle under test.

52. The combination as defined in claim 40 wherein the vehicle is equipped with a $NO_x$ control device and wherein said one gas is $NO_x$ and said first gas emission comparing means includes a first input, a second input and an output, the first gas emission comparing means being arranged to provide a pass or fail output signal in the output thereof when the signal applied to the first input is less than or exceeds the signal applied to the second input thereof, respectively.

53. A combination as defined in claim 52 wherein the vehicle is equipped with a multi-gear transmission and a TSAD $NO_x$ control device and further including:

means for applying first and second signals to the first and second inputs of the first gas comparing means, the difference between the first and second signals representing a preset fraction of the difference between the measured values of $NO_x$ at a selected engine load with the transmission gear in the highest gear and in the next lower gear.

54. The combination as defined in claim 53 wherein the output signal generating means is arranged to provide a fail TSAD output signal when the measured value of $NO_x$ does not decrease by at least a preset fraction when the transmission gear is changed from the highest gear to the next lower gear.

55. The combination as defined in claim 40 wherein the engine is equipped with a SAD $NO_x$ control device including:
   means including the first gas comparing means for comparing the measured values of $NO_x$ with the SAD control device disconnected and connected at a selected engine load.

56. The combination as defined in claim 55 including:
   means coupled to the first gas comparing means for providing a fail SAD signal when the measured values of $NO_x$ with the SAD control device disconnected exceeds a preset fraction of the measured value of $NO_x$ with the SAD control device connected.

57. The combination as defined in claim 40 wherein the vehicle is equipped with a SAD $NO_x$ control device having ignition timing regulation means connected to the engine vacuum source by a vacuum line and said one gas is $NO_x$ and further including:
   means for measuring the rate of vacuum rise in the vacuum line normally connected to the regulating means;
   vacuum rise comparing means for comparing said rate of vacuum rise with a preset limit; and
   means for providing a fail SAD signal when said rate of vacuum rise is greater than said preset limit.

58. The combination as defined in claim 57 including:
   means for producing a fail SAD signal when the measured value of $NO_x$ with the SAD control device disconnected is greater than a preset fraction of the measured value of $NO_x$ with the SAD control device connected, and means for storing a signal representing whether the fail SAD signal resulted from an excess rate of vacuum rise or an excess of $NO_x$.

59. The combination as defined in claim 57 including:
   means coupled to the vacuum rise comparing means and responsive to the measured values of $NO_x$ with the SAD control device disconnected and connected at a selected engine load for producing a pass SAD signal when said rate of vacuum rise is less than said preset limit and said measured value of $NO_x$ with the SAD control device disconnected is less than a preset fraction of the measured value of $NO_x$ with the SAD control device connected.

60. The combination as defined in claim 40 wherein the vehicle is equipped with an EGR $NO_x$ control device having an EGR valve to regulate the passage of exhaust gas to the vehicle's exhaust manifold, said EGR valve being connected to the engine vacuum source by a vacuum line and said one gas is $NO_x$ and including:
   means including the first gas comparing means for comparing the measured values of $NO_x$ with the EGR control valve disconnected and connected at a selected engine load.

61. The combination as defined in claim 60 including:
   means coupled to the first gas comparing means for providing a fail EGR signal when the measured value of $NO_x$ with the EGR valve disconnected is less than a preset percentage increase of the $NO_x$ value with the EGR valve connected.

62. The combination as defined in claim 40 wherein the vehicle is equipped with a SSAD $NO_x$ control device having ignition timing regulating means connected to the engine vacuum source by a vacuum line and said one gas is $NO_x$ including:
   vacuum present signal generating means adapted to be coupled to the vacuum line connected to the ignition timing regulating means for generating a vacuum present signal when vacuum is present in said vacuum line;
   means coupled to the dynamometer for generating a measured speed signal proportional to the speed of the dynamometer roll;
   means responsive to the measured speed signal and to a pre-established SSAD speed range signal for generating an SSAD speed enabling signal when the measured speed signal has remained within the limits of said SSAD speed range signal for a given time interval; and
   means coupled to the vacuum present signal generating means and responsive to the SSAD speed enabling signal for providing an SSAD fail signal when the vacuum signal is present.

63. The combination as defined in claim 62 wherein the measured speed is increased until a vacuum is applied to said vacuum line including:
   means including the first gas comparing means for comparing the measured values of $NO_x$ before and after the vacuum present signal occurs.

64. The combination as defined in claim 63 including:
   means coupled to the first gas comparing means for providing a fail SSAD signal when the measured value of $NO_x$ does not change by a preset amount before and after the vacuum present signal occurs.

65. The combination as defined in claim 63 including:
   means coupled to the vacuum present signal generating means and responsive to the measured speed signal for providing a fail SSAD signal in the absence of a vacuum present signal when the measured speed has reached a preset limit.

66. The combination as defined in claim 65 including:
   means for storing a signal representing whether the fail SSAD signal resulted from the presence of a vacuum signal at said pre-established SSAD speed or the absence of said preset change in the values of $NO_x$ before and after the vacuum signal occurred as speed was increased or the absence of a vacuum signal when the measured speed has reached said preset limit.

67. The combination as defined in claim 40 wherein one of said test modes is an idle condition, said one gas is $O_2$ and the vehicle is equipped with an exhaust system tail pipe, the combination further including:

means responsive to a fail signal for the first gas in an idle condition for providing a pressurize tail pipe signal.

68. The combination as defined in claim 67 including:
means for comparing the measured value of $O_2$ when the tail pipe has been pressurized with the acceptable value of $O_2$ at idle and for providing an exhaust leak fail signal when the measured value of $O_2$ with the tail pipe pressurized has decreased below the acceptable limit.

69. The combination as defined in claim 68 wherein the other gas is HC and including:
means for comparing the measured value of $O_2$ when the tail pipe has been pressurized with the acceptable value at idle and responsive to the pass or fail signal for HC at idle for providing an exhaust system pass signal when the measured value of $O_2$ with the tail pipe pressurized has remained above its acceptable limit and the measured value of HC at idle has exceeded its acceptable limit.

70. The combination as defined in claim 69 including:
means responsive to the measured and acceptable values of $O_2$ with the tail pipe pressurized in the idle mode and to the pass or fail signal for HC in the idle mode for providing a retest/sampler signal when the measured value of $O_2$ exceeds its acceptable limit and the measured value of HC is below its acceptable limit, the retest/sampler signal indicating that the exhaust analyzer has a leak.

71. The combination as defined in claim 67 wherein said other gas is CO and including:
means for comparing the measured value of CO at idle with a stoichiometric percentage of CO and for providing leaner and richer than stoichiometric output signal representing engine operation when its fuel air mixture is leaner or richer than stoichiometric, respectively.

72. The combination as defined in claim 71 including:
means responsive to a leaner than stoichiometric output signal for comparing the measured value of $O_2$ with a first $O_2$ limit signal representing an acceptable percentage limit of $O_2$ when the engine is operating leaner than stoichiometric and for producing a first above or below $O_2$ signal when the measured value of $O_2$ is above or below the first $O_2$ limit, respectively.

73. The combination as defined in claim 72 wherein the vehicle is equipped with an air injection system for injecting air into the exhaust gas stream leaving the engine including:
means responsive to the first below $O_2$ signal for providing a fail air injection signal indicating that the air injection system is inoperative.

74. The combination as defined in claim 72 including:
means responsive to the first above $O_2$ signal for providing a pressurize tail pipe signal.

75. The combination as defined in claim 72 including:
$O_2$ signal comparing means for comparing the measured value of $O_2$ before and after the tail pipe has been pressurized; and
means coupled to the $O_2$ signal comparing means for providing a first $O_2$ acceptable or excess change signal when the difference between the measured values of $O_2$ before and after the tail pipe has been pressurized is less than or exceeds a preset percentage limit of the $O_2$ signal.

76. The combination as defined in claim 75 including:
means responsive to the $O_2$ acceptable change signal for providing an exhaust system leak pass signal indicating that the exhaust system is not leaking.

77. The combination as defined in claim 75 wherein the vehicle is equipped with an air injection system for injecting air into the exhaust gas stream leaving the engine including:
means responsive to the $O_2$ excess change signal for comparing the measured value of $O_2$ when the tail pipe has been pressurized with the first $O_2$ limit signal and for providing an air injection pass or fail signal when the measured value of $O_2$ with the tail pipe pressurized is greater than or less than the first $O_2$ limit signal respectively, the air injection pass and fail signals indicating that the air injection system is operative and inoperative, respectively.

78. The combination as defined in claim 75 including:
means responsive to the $O_2$ excess change signal for providing an exhaust system leak fail signal indicating that the exhaust system has a leak.

79. The combination as defined in claim 71 including:
means responsive to the richer than stoichiometric output signal for comparing the measured value of $O_2$ with a second $O_2$ limit signal representing an acceptable percentage limit of $O_2$ when the engine is operating richer than stoichiometric and for producing a second above or below $O_2$ signal when the measured value of $O_2$ is above or below the second $O_2$ limit, respectively.

80. The combination as defined in claim 79 wherein the vehicle is equipped with an air injection system for injecting air into the exhaust gas stream leaving the engine including:
means responsive to the second below $O_2$ signal for providing a fail air injection signal indicating that the air injection system is inoperative.

81. The combination as defined in claim 79 including:
means responsive to the second above $O_2$ signal for providing a pressurize tail pipe signal.

82. The combination as defined in claim 79 including:
$O_2$ signal comparing means for comparing the measured value of $O_2$ before and after the tail pipe has been pressurized; and
means coupled to the $O_2$ signal comparing means for providing an $O_2$ acceptable or excess change signal when the difference between the measured values of $O_2$ before and after the tail pipe has been pressurized is less than or exceeds a preset percentage limit of the measured $O_2$ signal.

83. The combination as defined in claim 82 including:
means responsive to the $O_2$ acceptable change signal for providing an exhaust system leak pass signal indicating that the exhaust system is not leaking.

84. The combination as defined in claim 82 wherein the vehicle is equipped with an air injection system for injecting air into the exhaust gas stream of the engine including:

means responsive to the $O_2$ excess change signal for comparing the measured value of $O_2$ when the tail pipe has been pressurized with the second $O_2$ limit signal and for providing an air injection pass or fail signal when the measured value of $O_2$ with the tail pipe pressurized is greater than or less than the second $O_2$ limit signal respectively, the air injection pass and fail signals indicating that the air injection system is operative and inoperative, respectively.

85. The combination as defined in claim 82 including:
means responsive to the $O_2$ excess change signal for providing an exhaust system leak fail signal indicating that the exhaust system has a leak.

86. The combination as defined in claim 40 including:
a load index meter having a measured load and a desired load input terminal, a scale with a central zone, an under zone and an over zone position on each side of the central zone and a movable indicator, the meter being arranged to position the indicator in the under zone, central zone and over zone when the amplitude of the signal applied to the measured load terminal is less than, within a predetermined range of and greater than the amplitude of the signal applied to the desired load terminal, respectively;
means for applying the load signal to the measured load terminal of the meter; and
means for applying a signal representative of the desired load for the engine for each test mode to the desired load terminal of the meter.

87. The combination as defined in claim 86 including:
indicating means responsive to the load signal and to desired load signal for informing the operator to hold the engine load steady or to change the engine load.

88. The combination as defined in claim 40 including:
matrix means responsive to the fail signals for each gas for selecting one or more of a plurality of predetermined reports, each report containing suggested causes and guideline instructions enabling a mechanic to make the appropriate adjustments and/or repair to correct the particular engine malfunctions.

89. In an apparatus for evaluating the exhaust gas emissions of an internal combustion engine mounted in a wheeled vehicle chassis to ascertain whether the emissions are within acceptable air pollution values for CO and HC at different prescribed test modes of engine loading, the combination which comprises:
a chassis dynamometer having at least one roll to be engaged by the driven wheels of the vehicle, the dynamometer including a power absorption unit connected to the roll to provide a selectable load to the engine;
an exhaust gas analyzer adapted to be coupled to the engine exhaust for providing CO and HC signals, each of said CO and HC signals being representative of the quantitive measurement of the CO and HC content in the exhaust emissions;
gas signal stabilizing means responsive to the CO and HC signals for producing stabilized CO and HC signals when said signals have remained within a preset range for a given time interval.

90. The combination as defined in claim 89 including:
gas signal comparing means for comparing the stabilized CO and HC signals with acceptable values of CO and HC, respectively, when the engine has been operated within each of said test modes for a preselected time interval.

91. The combination as defined in claim 90 including:
output signal generating means coupled to the gas signal comparing means for producing a separate pass or fail signal for each gas at each of the test modes when the stabilized gas signals remains below or exceed said acceptable values respectively.

92. The combination as defined in claim 91 including:
engine diagnostic means responsive to the pass or fail signals for providing a written indication of engine malfunctions.

93. The combination as defined in claim 92 including:
recording means for recording a separate fail signal identifying each gas that has exceeded the acceptable limit for each test mode and wherein the engine diagnostic means includes:
a plurality of separate prerecorded statements of engine malfunctions, each statement corresponding to a particular group of gas pass and fail signals; and
means for selecting one or more of such statements in response to the pattern of the recorded fail signals.

94. The combination as defined in claim 89 wherein the gas signal stabilizing means includes means for measuring the rate of change of the CO and HC signals.

95. The combination as defined in claim 94 wherein the gas signal stabilizing means further includes means for comparing the CO and HC signals with the acceptable values of said gases at each test mode, and producing stabilized CO and HC gas signals when said signals fall below the respective acceptable values.

96. The combination as defined in claim 94 wherein the gas stabilizing means includes means for comparing the rate of change of the CO and HC signals with a preselected range of signals for a predetermined time interval.

97. The combination as defined in claim 89 including means coupled to the power absorption unit for causing the power absorption unit to provide different loads at comparable speeds corresponding to a plurality of different vehicle classifications.

98. The combination as defined in claim 89 including means for sequentially supplying the gas signal comparing means with predetermined acceptable values of CO and HC for each test mode for engine operation.

99. The combination as defined in claim 89 including speed sensing means coupled to the dynamometer for sensing the speed of the vehicle wheels.

100. The combination as defined in claim 99 wherein the gas signal comparing means is responsive to the vehicle wheel speed for comparing the stabilized and acceptable values of CO and HC when the vehicle wheel speed is within a preset range of wheel speeds.

101. The combination as defined in claim 99 wherein the dynamometer is arranged to provide a different engine loading for each test mode corresponding to at least two separate vehicle weight classifications.

102. The combination as defined in claim 101 wherein the prescribed test modes of engine operation include a high cruise mode in which the engine is operated in the speed range of 1700 to 3200 rpm, a low cruise mode in which the engine is operated at a speed no greater than 40% of the selected high cruise speed and an idle condition.

103. The combination as defined in claim 102 wherein the dynamometer is arranged to apply a load in the range of 35 to 75% of the engine's maximum torque capability in the high cruise mode and a load of less than 50% of the selected high cruise load in the low cruise mode.

104. The combination as defined in claim 89 wherein the engine is equipped with means to control $NO_x$ and wherein the exhaust gas analyzer is arranged to provide an $NO_x$ signal representative of the quantitive measurement of the $NO_x$ content of the exhaust emission and means responsive to the $NO_x$ signal for indicating whether the $NO_x$ emission control means associated with the engine is operational.

105. The combination as defined in claim 89 including:
a load index meter with a moving indicator and a dial having a central portion representing a satisfactory load range, a lower portion representing a load below the satisfactory load range and a higher portion representing a load above the satisfactory load range, the load index meter having a reference input and a measured load input and being arranged to position the moving indicator in the central portion when the signal applied to the measured load input is within a predetermined range of the signal applied to the reference input and to position the moving indicator in the lower or upper portion when the signal applied to the measured load input is below or above the signal applied to the reference range input by a predetermined amount, respectively;
means for applying a signal to the measured load input of the meter which is representative of the load applied to the engine; and
means for sequentially applying a load signal to the reference input of the meter corresponding to the selected load for the test modes to instruct the vehicle driver as to whether the vehicle engine load is below, above or within the proper range during each test mode.

106. The combination as defined in claim 105 wherein the load signal is proportional to vehicle wheel speed.

107. The combination as defined in claim 105 wherein the load signal is proportional to the torque applied to the vehicle wheels.

108. In an apparatus for evaluating the exhaust gas emissions of an internal combustion engine mounted in wheeled vehicle to ascertain whether the emissions are within acceptable air pollution values for at least two gases at a plurality of different prescribed test modes of engine operation and whether there is need for adjustment or repair of the vehicle to reduce such emissions, the combination which comprises:
a chassis dynamometer having at least one roll to be engaged by the driven wheels of the vehicle, the dynamometer including a power absorption unit connected to the roll to provide a separate predetermined load to the engine at each test mode;
a speed signal generator coupled to the dynamometer for generating a speed signal representative of the vehicle wheel speed;
speed comparing means having a measured signal input coupled to the speed signal generator, a reference speed range input, and an output, the speed comparing means being arranged to compare the speed signal with a reference speed range signal and to produce a speed enabling signal in the output when the speed signal remains within the reference speed range for a preset time;
an exhaust gas analyzer adapted to be coupled to the engine exhaust for providing at least first and second measured gas signals, each of the first and second measured gas signals being representative of the quantitive measurement of the first and second gases in the exhaust emissions;
gas stabilizing means responsive to the first and second measured gas signals for producing stabilized first and second gas signals when the respective measured gas signals have remained within a preset range of values for a given time interval;
first gas comparing means having a measured first gas input coupled to the first gas stabilizing means, a first gas reference input, and an output, the first gas comparing means being responsive to the speed enabling signal and arranged to compare the stabilized first gas signal with a first gas reference signal applied to the reference input thereof, and to produce a first gas pass or fail signal when the stabilized first gas signal falls below or exceeds the first gas reference signal;
second gas comparing means having a measured second gas input coupled to the second gas stabilizing means, a second gas reference input, and an output, the second gas comparing means being responsive to the speed enabling signal and arranged to compare the stabilized second gas signal with a second gas reference signal applied to the reference input thereof, and to produce a second gas pass or fail signal when the stabilized second gas signal falls below or exceeds the second gas reference signal; and
automatic control means for sequentially applying preselected speed reference range signals to the speed reference input of the speed comparing means and preselected first and second gas reference signals to the reference inputs of the first and second gas comparing means to sequentially test the engine at each prescribed test mode of operation.

109. The combination as defined in claim 108 including means for recording the first and second gas pass or fail signals.

110. The combination as defined in claim 109 including engine diagnostic means responsive to pass or fail signals for providing a written indication of vehicle malfunction where the measured values of the first and second gases have exceeded the acceptable reference limits during one or more of the prescribed test modes of operation.

111. The combination as defined in claim 110 wherein the first and second gases are CO and HC, respectively.

112. The combination as defined in claim 111 wherein the exhaust gas analyzer is arranged to provide an $O_2$ gas signal representative of the quantative measurement of the $O_2$ in the exhaust emissions and the gas stabilizing means is responsive to the $O_2$ signal for producing a stabilized $O_2$ gas signal when the $O_2$ signal has remained within a preset range of values for a given time interval and further including:

$O_2$ gas comparing means having an $O_2$ gas reference input and an output, the $O_2$ gas comparing means being responsive to the speed enabling signal and arranged to compare the stabilized $O_2$ gas signal with an $O_2$ gas reference signal applied to the reference input thereof, and to produce an $O_2$ gas pass or fail signal when the stabilized $O_2$ gas signal falls below or exceeds the $O_2$ gas reference signal; and means for applying a preselected $O_2$ gas reference signal to the reference input of the $O_2$ gas comparing means during at least one of said test modes of engine operation.

113. The combination as defined in claim 111 wherein the second gas comparing means is further responsive to the stabilized CO gas signal.

114. The combination as defined in claim 108 wherein the exhaust gas analyzer is arranged to provide a $NO_x$ gas signal representative of the quantative measurement of the $NO_x$ in the exhaust emissions and the gas stabilizing means is responsive to the $NO_x$ signal for producing a stabilized $NO_x$ gas signal when the $NO_x$ signal has remained within a preset range of values for a given time interval and further including:

$NO_x$ gas comparing means having a $NO_x$ gas input coupled to the $NO_x$ gas stabilizing means a $NO_x$ gas reference input and an output, the $NO_x$ gas comparing means being responsive to the speed enabling signal and arranged to compare the stabilized $NO_x$ gas signal with a $NO_x$ gas reference signal applied to the reference input thereof and to produce a $NO_x$ gas pass or fail signal when the stabilized $NO_x$ gas signal falls below or exceeds the $NO_x$ gas reference signal; and means for applying a preselected $NO_x$ gas reference signal to the reference input of the $NO_x$ gas comparing means during at least one of said test modes of engine operation.

115. In an apparatus for evaluating the exhaust gas emissions of an internal combustion engine mounted in wheeled vehicle to ascertain whether the emissions are within acceptable air pollution values for at least one gas at a plurality of different prescribed test modes of engine operation, the combination which comprises:

a chassis dynamometer having at least one roll to be engaged by the driven wheels of the vehicle, the dynamometer including a power absorption unit connected to the roll to provide a selected load to the engine during at least one test mode;

a load signal generator coupled to the dynamometer for generating a load signal representative of the load applied to the vehicle;

load comparing means having a measured load input coupled to the load signal generator, a reference load range input, and an output, the load comparing means being arranged to compare measured load signal with a reference load range signal applied to the reference input and to produce a load enabling signal in the output when the measured load signal remains within the reference load range for a preset time;

an exhaust gas analyzer adapted to be coupled to the engine exhaust for providing at least one measured gas signal representative of the quantitive measurement of said one gas in the exhaust emissions;

gas stabilizing means responsive to the measured gas signal for producing a stabilized gas signal when the measured gas signal has remained within a preset range of values for a given time interval;

gas comparing means having a measured gas input coupled to the gas stabilizing means, a gas reference input, and an output, the gas comparing means being responsive to the load enabling signal and arranged to compare the stabilized gas signal with a gas reference signal applied to the reference input thereof, and to produce a gas pass or fail signal when the stabilized gas signal falls below or exceeds the gas reference signal;

automatic control means for applying a different gas reference signal to the reference input of the gas comparing means during each of at least two test modes and to apply a selected load reference range signal to the reference input of the load comparing means during one of said test modes to sequentially test the engine at prescribed test modes of operations.

116. The combination as defined in claim 115 including means for recording the gas pass or fail signals.

117. The combination as defined in claim 116 including engine diagnostic means responsive to pass or fail signals for providing a written indication of vehicle malfunction where the measured value of the gas has exceeded the acceptable reference limits during one or more of the prescribed test modes of operation.

118. The combination as defined in claim 115 wherein the gas is CO.

119. The combination as defined in claim 115 wherein the gas is HC.

120. The combination as defined in claim 115 wherein the gas is $NO_x$.

121. The combination as defined in claim 115 wherein the gas is $O_2$.

122. The combination as defined in claim 115 wherein the exhaust gas analyzer is arranged to provide a $NO_x$ gas signal representative of the quantitive measurement of the $NO_x$ in the exhaust emissions and the gas stabilizing means is responsive to the $NO_x$ signal for producing a stabilized $NO_x$ gas signal when the $NO_x$ signal has remained within a preset range of values for a given time interval and further including:

$NO_x$ gas comparing means having a $NO_x$ gas input coupled to the $NO_x$ gas stabilizing means, a $NO_x$ gas reference input and an output, the $NO_x$ gas comparing means being responsive to the load enabling signal and arranged to compare the stabilized $NO_x$ gas signal with a $NO_x$ gas reference signal applied to the reference input thereof and to produce a $NO_x$ gas pass or fail signal when the stabilized $NO_x$ gas signal falls below or exceeds the $NO_x$ gas reference signal; and means for applying a preselected $NO_x$ gas reference signal to the reference input of the $NO_x$ gas comparing means during at least one of said test modes of engine operation.

123. The method of evaluating the operability of a TSAD $NO_x$ control device installed on a motor vehicle comprising:

operating the engine at a selected load greater than idle;

measuring the value of $NO_x$ in the exhaust at said selected engine load with the transmission gear in the highest and next lower gear; and comparing said measured values of $NO_x$ to determine whether the value of $NO_x$ in the lower gear has decreased below a preset fraction of the value of $NO_x$ in the highest gear.

124. The method of evaluating the operability of a SAD $NO_x$ control device installed on a motor vehicle having ignition timing regulating means connected to the engine vacuum source by a vacuum line comprising:
- operating the engine at a selected load greater than idle;
- measuring the value of $NO_x$ in the exhaust with the SAD control device connected and disconnected at said selected engine load;
- measuring the rate of vacuum rise in the vacuum line normally connected to the regulating means;
- comparing the measured values of $NO_x$ with the SAD control device connected and disconnected to determine whether the value of $NO_x$ with the SAD control device disconnected exceeds a preset fraction of the measured value of $NO_x$ with the SAD control device connected; and
- comparing the rate of vacuum rise with a preset limit.

125. The method of evaluating the operability of an EGR $NO_x$ control device installed in a motor vehicle, comprising:
- operating the engine at a selected load above idle;
- measuring the value of $NO_x$ in the exhaust with the ERG control device connected and disconnected at said selected load; and
- comparing the measured values of $NO_x$ to determine whether the value of $NO_x$ with the EGR control device disconnected has increased a preset percentage above the value of $NO_x$ with the EGR control device connected.

126. The method of evaluating the operability of an SSAD $NO_x$ control device installed on a motor vehicle, the SSAD control device including an ignition timing regulating means connected to the engine vacuum source by a vacuum line, comprising:
- operating the engine at a selected load above idle;
- measuring the speed of the vehicle;
- monitoring the presence or absence of vacuum in said vacuum line when the vehicle speed has reached a first preset limit to determine whether the SSAD control device is operative at said speed;
- increasing the vehicle speed until a vacuum is present in said vacuum line or until a second preset speed is reached;
- measuring the value of $NO_x$ in the vehicle exhaust at a vehicle speed when vacuum is first detected in said vacuum line with the SSAD control device operative and inoperative; and
- comparing the measured values of $NO_x$ with the SSAD control device operative and inoperative to determine whether the value of $NO_x$ decreased a preset percentage after the SSAD control device was rendered operative.

127. The method of evaluating the integrity of the exhaust system of a motor vehicle, comprising:
- operating the engine of the motor vehicle;
- measuring the value of CO in the vehicle exhaust;
- comparing the measured value of CO with a preset limit to determine whether the engine is operating richer or leaner than stoichiometric;
- pressurizing the exhaust system when the measured value of $O_2$ exceeds the respective first or second preset limits; and
- comparing the measured values of $O_2$ before and after pressurization of the exhaust system to determine whether the value of $O_2$ after pressurization has decreased by a predetermined percentage from the value of $O_2$ before pressurization to thereby ascertain whether air is leaking into the exhaust system when the system is not pressurized.

128. The method as defined in claim 127 wherein the vehicle is equipped with an air injection system for injecting air into the exhaust gas stream leaving the engine, and including:
- comparing the measured value of $O_2$ when the exhaust system is pressurized with the respective first or second preset limits to determine whether the air injection system is operative.

* * * * *